US012074398B2

(12) United States Patent
Johnescu et al.

(10) Patent No.: US 12,074,398 B2
(45) Date of Patent: Aug. 27, 2024

(54) HIGH SPEED CONNECTOR

(71) Applicant: FCI USA LLC, Etters, PA (US)

(72) Inventors: Douglas M. Johnescu, York, PA (US); Gregory A. Hull, York, PA (US); Mark E. Lauermann, Harrisburg, PA (US); Scott Martin, Manchester, PA (US); Jason John Ellison, Dillsburg, PA (US); Jan De Geest, Wetteren (BE); Charles Copper, Hummelstown, PA (US); Mark R. Gray, York, PA (US); William Tanis, Mechanicsburg, PA (US); Steven E. Minich, York, PA (US)

(73) Assignee: FCI USA LLC, Etters, PA (US)

( * ) Notice: Subject to any disclaimer, the term of this patent is extended or adjusted under 35 U.S.C. 154(b) by 0 days.

(21) Appl. No.: 18/465,351

(22) Filed: Sep. 12, 2023

(65) Prior Publication Data

US 2024/0006822 A1 Jan. 4, 2024

Related U.S. Application Data

(63) Continuation of application No. 17/902,342, filed on Sep. 2, 2022, now Pat. No. 11,799,246, which is a (Continued)

(51) Int. Cl.

*H01R 13/6587* (2011.01)
*H01R 12/71* (2011.01)

(Continued)

(52) U.S. Cl.

CPC ....... *H01R 13/6587* (2013.01); *H01R 12/716* (2013.01); *H01R 13/502* (2013.01);

(Continued)

(58) Field of Classification Search

CPC ............ H01R 13/6585; H01R 13/6587; H01R 13/502; H01R 13/6477; H01R 13/518;

(Continued)

(56) References Cited

U.S. PATENT DOCUMENTS

| | | | |
|---|---|---|---|
| 7,309,257 | B1 | 12/2007 | Minich |
| 7,485,012 | B2 | 2/2009 | Daugherty et al. |

(Continued)

FOREIGN PATENT DOCUMENTS

| | | | |
|---|---|---|---|
| CN | 201222548 | Y | 4/2009 |
| CN | 201252183 | Y | 6/2009 |

(Continued)

OTHER PUBLICATIONS

International Search Report and Written Opinion mailed Jul. 1, 2021 in connection with International Application No. PCT/US2021/015048.

(Continued)

*Primary Examiner* — Khiem M Nguyen
(74) *Attorney, Agent, or Firm* — Wolf, Greenfield & Sacks, P.C.

(57) ABSTRACT

Electrical connectors for very high speed signals, including signals at or above 112 Gbps. Effectiveness of shielding along the signal paths through the mating electrical connectors may be enhanced through the use of one or more techniques, including enabling two-sided shielding, connections between shield members and between shield members and grounded structures of printed circuit boards to which the connectors are mounted, and selective positioning of lossy material. Such techniques may be simply and reliably implemented in high density connector using one or more techniques. An electrical connector may include core members held by a housing together with leadframe assemblies attached to the core members. The core members may (Continued)

include features that would be difficult to mold in a housing and may include both shields and lossy materials in locations that would be difficult to incorporate in a leadframe assembly.

20 Claims, 51 Drawing Sheets

Related U.S. Application Data continuation of application No. 17/158,214, filed on Jan. 26, 2021, now Pat. No. 11,469,553.

(60) Provisional application No. 63/076,692, filed on Sep. 10, 2020, provisional application No. 62/966,528, filed on Jan. 27, 2020.

(51) Int. Cl.

*H01R 12/72* (2011.01)
*H01R 12/73* (2011.01)
*H01R 13/502* (2006.01)
*H01R 13/6477* (2011.01)
*H01R 13/518* (2006.01)
*H01R 13/6594* (2011.01)

(52) U.S. Cl.

CPC ....... *H01R 13/6477* (2013.01); *H01R 12/724* (2013.01); *H01R 12/737* (2013.01); *H01R 13/518* (2013.01); *H01R 13/6594* (2013.01)

(58) Field of Classification Search

CPC ......................... H01R 13/6594; H01R 12/716; H01R 12/724; H01R 12/737
USPC ..................................................... 439/607.11
See application file for complete search history.

(56) References Cited

U.S. PATENT DOCUMENTS

| | | | |
|---|---|---|---|
| 7,494,383 | B2 | 2/2009 | Cohen et al. |
| 7,534,142 | B2 | 5/2009 | Avery et al. |
| 7,540,781 | B2 | 6/2009 | Kenny et al. |
| 7,549,897 | B2 | 6/2009 | Fedder et al. |
| 7,554,096 | B2 | 6/2009 | Ward et al. |
| 7,581,990 | B2 | 9/2009 | Kirk et al. |
| 7,585,186 | B2 | 9/2009 | McAlonis et al. |
| 7,588,464 | B2 | 9/2009 | Kim |
| 7,588,467 | B2 | 9/2009 | Chang |
| 7,594,826 | B2 | 9/2009 | Kobayashi et al. |
| 7,604,490 | B2 | 10/2009 | Chen et al. |
| 7,604,502 | B2 | 10/2009 | Pan |
| 7,613,011 | B2 | 11/2009 | Grundy et al. |
| 7,621,779 | B2 | 11/2009 | Laurx et al. |
| 7,652,381 | B2 | 1/2010 | Grundy et al. |
| 7,654,831 | B1 | 2/2010 | Wu |
| 7,658,654 | B2 | 2/2010 | Ohyama et al. |
| 7,674,133 | B2 | 3/2010 | Fogg et al. |
| 7,686,659 | B2 | 3/2010 | Peng |
| 7,690,930 | B2 | 4/2010 | Chen et al. |
| 7,690,946 | B2 | 4/2010 | Knaub et al. |
| 7,699,644 | B2 | 4/2010 | Szczesny et al. |
| 7,699,663 | B1 | 4/2010 | Little et al. |
| 7,713,077 | B1 | 5/2010 | McGowan et al. |
| 7,719,843 | B2 | 5/2010 | Dunham |
| 7,722,401 | B2 | 5/2010 | Kirk et al. |
| 7,731,537 | B2 | 6/2010 | Amleshi et al. |
| 7,744,414 | B2 | 6/2010 | Scherer et al. |
| 7,753,731 | B2 | 7/2010 | Cohen et al. |
| 7,758,357 | B2 | 7/2010 | Pan et al. |
| 7,771,233 | B2 | 8/2010 | Gailus |
| 7,775,802 | B2 | 8/2010 | Defibaugh et al. |
| 7,789,676 | B2 | 9/2010 | Morgan et al. |
| 7,794,240 | B2 | 9/2010 | Cohen et al. |
| 7,794,278 | B2 | 9/2010 | Cohen et al. |
| 7,806,729 | B2 | 10/2010 | Nguyen et al. |
| 7,811,129 | B2 | 10/2010 | Glover et al. |
| 7,819,675 | B2 | 10/2010 | Ko et al. |
| 7,824,197 | B1 | 11/2010 | Westman et al. |
| 7,828,595 | B2 | 11/2010 | Mathews |
| 7,833,068 | B2 | 11/2010 | Bright et al. |
| 7,857,630 | B2 | 12/2010 | Hermant et al. |
| 7,862,344 | B2 | 1/2011 | Morgan et al. |
| 7,871,296 | B2 | 1/2011 | Fowler et al. |
| 7,874,873 | B2 | 1/2011 | Do et al. |
| 7,887,371 | B2 | 2/2011 | Kenny et al. |
| 7,887,379 | B2 | 2/2011 | Kirk |
| 7,906,730 | B2 | 3/2011 | Atkinson et al. |
| 7,914,304 | B2 | 3/2011 | Cartier et al. |
| 7,927,143 | B2 | 4/2011 | Helster et al. |
| 7,967,637 | B2 | 6/2011 | Fedder et al. |
| 7,976,318 | B2 | 7/2011 | Fedder et al. |
| 7,985,097 | B2 | 7/2011 | Gulla |
| 8,002,581 | B1 | 8/2011 | Whiteman, Jr. et al. |
| 8,016,616 | B2 | 9/2011 | Glover et al. |
| 8,018,733 | B2 | 9/2011 | Jia |
| 8,036,500 | B2 | 10/2011 | McColloch |
| 8,057,267 | B2 | 11/2011 | Johnescu |
| 8,083,553 | B2 | 12/2011 | Manter et al. |
| 8,100,699 | B1 | 1/2012 | Costello |
| 8,157,573 | B2 | 4/2012 | Tanaka |
| 8,162,675 | B2 | 4/2012 | Regnier et al. |
| 8,167,631 | B2 | 5/2012 | Ito et al. |
| 8,167,651 | B2 | 5/2012 | Glover et al. |
| 8,182,289 | B2 | 5/2012 | Stokoe et al. |
| 8,192,222 | B2 | 6/2012 | Kameyama |
| 8,197,285 | B2 | 6/2012 | Farmer |
| 8,210,877 | B2 | 7/2012 | Droesbeke |
| 8,215,968 | B2 | 7/2012 | Cartier et al. |
| 8,216,001 | B2 | 7/2012 | Kirk |
| 8,226,441 | B2 | 7/2012 | Regnier et al. |
| 8,251,745 | B2 | 8/2012 | Johnescu |
| 8,267,721 | B2 | 9/2012 | Minich |
| 8,272,877 | B2 | 9/2012 | Stokoe et al. |
| 8,308,491 | B2 | 11/2012 | Nichols et al. |
| 8,308,512 | B2 | 11/2012 | Ritter et al. |
| 8,328,565 | B2 | 12/2012 | Westman et al. |
| 8,337,243 | B2 | 12/2012 | Elkhatib et al. |
| 8,338,713 | B2 | 12/2012 | Fjelstad et al. |
| 8,348,701 | B1 | 1/2013 | Lan et al. |
| 8,371,875 | B2 | 2/2013 | Gailus |
| 8,371,876 | B2 | 2/2013 | Davis |
| 8,382,524 | B2 | 2/2013 | Khilchenko et al. |
| 8,398,433 | B1 | 3/2013 | Yang |
| 8,419,472 | B1 | 4/2013 | Swanger et al. |
| 8,439,704 | B2 | 5/2013 | Reed |
| 8,449,312 | B2 | 5/2013 | Lang et al. |
| 8,449,330 | B1 | 5/2013 | Schroll et al. |
| 8,465,302 | B2 | 6/2013 | Regnier et al. |
| 8,469,745 | B2 | 6/2013 | Davis et al. |
| 8,475,209 | B1 | 7/2013 | Whiteman, Jr. et al. |
| 8,535,065 | B2 | 9/2013 | Costello |
| 8,540,525 | B2 | 9/2013 | Regnier et al. |
| 8,545,240 | B2 | 10/2013 | Casher et al. |
| 8,550,861 | B2 | 10/2013 | Cohen et al. |
| 8,553,102 | B2 | 10/2013 | Yamada |
| 8,556,657 | B1 | 10/2013 | Nichols |
| 8,588,561 | B2 | 11/2013 | Zbinden et al. |
| 8,588,562 | B2 | 11/2013 | Zbinden et al. |
| 8,597,055 | B2 | 12/2013 | Regnier et al. |
| 8,657,627 | B2 | 2/2014 | McNamara et al. |
| 8,662,924 | B2 | 3/2014 | Davis et al. |
| 8,672,707 | B2 | 3/2014 | Nichols et al. |
| 8,678,860 | B2 | 3/2014 | Minich et al. |
| 8,690,604 | B2 | 4/2014 | Davis |
| 8,715,003 | B2 | 5/2014 | Buck et al. |
| 8,715,005 | B2 | 5/2014 | Pan |
| 8,740,644 | B2 | 6/2014 | Long |
| 8,753,145 | B2 | 6/2014 | Lang et al. |
| 8,758,051 | B2 | 6/2014 | Nonen et al. |
| 8,764,460 | B2 | 7/2014 | Smink et al. |
| 8,764,488 | B2 | 7/2014 | Zeng |
| 8,771,016 | B2 | 7/2014 | Atkinson et al. |

(56) References Cited

U.S. PATENT DOCUMENTS 8,787,711 B2 7/2014 Zbinden et al.
8,804,342 B2 8/2014 Behziz et al.
8,814,595 B2 8/2014 Cohen et al.
8,845,364 B2 9/2014 Wanha et al.
8,864,521 B2 10/2014 Atkinson et al.
8,888,531 B2 11/2014 Jeon
8,888,533 B2 11/2014 Westman et al.
8,911,255 B2 12/2014 Scherer et al.
8,926,377 B2 1/2015 Kirk et al.
8,944,831 B2 2/2015 Stoner et al.
8,944,863 B1 2/2015 Yang
8,992,236 B2 3/2015 Wittig et al.
8,992,237 B2 3/2015 Regnier et al.
8,998,642 B2 4/2015 Manter et al.
9,004,942 B2 4/2015 Paniauqa
9,011,177 B2 4/2015 Lloyd et al.
9,022,806 B2 5/2015 Cartier, Jr. et al.
9,028,201 B2 5/2015 Kirk et al.
9,028,281 B2 5/2015 Kirk et al.
9,035,183 B2 5/2015 Kodama et al.
9,040,824 B2 5/2015 Guetig et al.
9,065,230 B2 6/2015 Milbrand, Jr.
9,071,001 B2 6/2015 Scherer et al.
9,077,115 B2 7/2015 Yang
9,083,130 B2 7/2015 Casher et al.
9,118,151 B2 8/2015 Tran et al.
9,119,292 B2 8/2015 Gundel
9,124,009 B2 9/2015 Atkinson et al.
9,142,896 B2 9/2015 Wickes et al.
9,142,921 B2 9/2015 Wanha et al.
9,166,317 B2 10/2015 Briant et al.
9,203,171 B2 12/2015 Yu et al.
9,214,768 B2 12/2015 Pao et al.
9,219,335 B2 12/2015 Atkinson et al.
9,225,083 B2 12/2015 Krenceski et al.
9,225,085 B2 12/2015 Cartier, Jr. et al.
9,232,676 B2 1/2016 Sechrist et al.
9,246,251 B2 1/2016 Regnier et al.
9,257,778 B2 2/2016 Buck et al.
9,257,794 B2 2/2016 Wanha et al.
9,300,074 B2 3/2016 Gailus
9,312,618 B2 4/2016 Regnier et al.
9,350,108 B2 5/2016 Long
9,356,401 B1 5/2016 Horning et al.
9,362,678 B2 6/2016 Wanha et al.
9,373,917 B2 6/2016 Sypolt et al.
9,374,165 B2 6/2016 Zbinden et al.
9,385,455 B2 7/2016 Regnier et al.
9,391,407 B1 7/2016 Bucher et al.
9,401,570 B2 7/2016 Phillips et al.
9,413,112 B2 8/2016 Helster et al.
9,450,344 B2 9/2016 Cartier, Jr. et al.
9,461,378 B1 10/2016 Chen
9,484,674 B2 11/2016 Cartier, Jr. et al.
9,490,558 B2 11/2016 Wanha et al.
9,490,585 B2 11/2016 Yang
9,490,587 B1 11/2016 Phillips et al.
9,509,101 B2 11/2016 Cartier, Jr. et al.
9,520,689 B2 12/2016 Cartier, Jr. et al.
9,531,133 B1 12/2016 Horning et al.
9,543,676 B2 1/2017 Evans et al.
9,553,381 B2 1/2017 Regnier
9,559,446 B1 1/2017 Wetzel et al.
9,564,696 B2 2/2017 Gulla
9,608,348 B2 3/2017 Wanha et al.
9,634,432 B2 4/2017 Su et al.
9,651,752 B2 5/2017 Zbinden et al.
9,660,364 B2 5/2017 Wig et al.
9,666,961 B2 5/2017 Horning et al.
9,685,736 B2 6/2017 Gailus et al.
9,692,183 B2 6/2017 Phillips
9,692,188 B2 6/2017 Godana et al.
9,705,218 B2 7/2017 Ito
9,705,255 B2 7/2017 Atkinson et al.
9,728,903 B2 8/2017 Long et al.
9,742,132 B1 8/2017 Hsueh
9,748,698 B1 8/2017 Morgan et al.
9,774,144 B2 9/2017 Cartier, Jr. et al.
9,801,301 B1 10/2017 Costello
9,831,588 B2 11/2017 Cohen
9,841,572 B2 12/2017 Zbinden et al.
9,843,135 B2 12/2017 Guetig et al.
9,876,319 B2 1/2018 Zhao et al.
9,899,774 B2 2/2018 Gailus
9,923,309 B1 3/2018 Aizawa et al.
9,929,512 B1 3/2018 Trout et al.
9,972,945 B1 5/2018 Huang et al.
9,979,136 B1 5/2018 Wu et al.
9,985,367 B2 5/2018 Wanha et al.
9,985,389 B1 5/2018 Morgan et al.
10,038,284 B2 7/2018 Krenceski et al.
10,056,706 B2 8/2018 Wanha et al.
10,062,984 B2 8/2018 Regnier
10,069,225 B2 9/2018 Wanha et al.
10,096,921 B2 10/2018 Johnescu et al.
10,096,945 B2 10/2018 Cartier, Jr. et al.
10,122,129 B2 11/2018 Milbrand, Jr. et al.
10,148,025 B1 12/2018 Trout et al.
10,170,869 B2 1/2019 Gailus et al.
10,181,663 B2 1/2019 Regnier
10,186,814 B2 1/2019 Khilchenko et al.
10,205,286 B2 2/2019 Provencher et al.
10,211,577 B2 2/2019 Milbrand, Jr. et al.
10,243,304 B2 3/2019 Kirk et al.
RE47,342 E 4/2019 Lloyd et al.
10,270,191 B1 4/2019 Li et al.
10,283,910 B1 5/2019 Chen et al.
10,283,914 B1 5/2019 Morgan et al.
10,305,224 B2 5/2019 Girard, Jr.
10,348,040 B2 7/2019 Cartier, Jr. et al.
10,355,416 B1 7/2019 Pickel et al.
10,381,767 B1 8/2019 Milbrand, Jr. et al.
10,431,936 B2 10/2019 Horning et al.
10,446,983 B2 10/2019 Krenceski et al.
10,511,128 B2 12/2019 Kirk et al.
10,601,181 B2 3/2020 Lu et al.
10,651,603 B2 5/2020 Kurudamannil et al.
10,686,282 B1 6/2020 McCarthy et al.
10,720,735 B2 7/2020 Provencher et al.
RE48,230 E 9/2020 Lloyd et al.
10,777,921 B2 9/2020 Lu et al.
10,797,417 B2 10/2020 Scholeno et al.
10,826,245 B2 11/2020 Chen et al.
10,847,936 B2 11/2020 Tang et al.
10,916,894 B2 2/2021 Kirk et al.
10,931,050 B2 2/2021 Cohen
10,931,062 B2 2/2021 Cohen et al.
10,938,162 B2 3/2021 Lin
10,965,063 B2 3/2021 Krenceski et al.
11,189,971 B2 11/2021 Lu
11,251,558 B1 2/2022 Lee
11,316,307 B2 4/2022 Chen et al.
11,381,039 B2 7/2022 Hsiao et al.
11,387,609 B2 7/2022 Provencher et al.
11,469,553 B2 10/2022 Johnescu et al.
11,469,554 B2 10/2022 Ellison et al.
11,522,310 B2 12/2022 Cohen
11,539,171 B2 12/2022 Kirk et al.
11,600,950 B2 3/2023 Takai et al.
11,715,914 B2 8/2023 Cartier, Jr. et al.
11,742,620 B2 8/2023 Cohen et al.
11,757,224 B2 9/2023 Milbrand, Jr. et al.
11,791,585 B2 10/2023 Muha et al.
11,799,246 B2 * 10/2023 Johnescu ........... H01R 13/6598
11,817,655 B2 11/2023 Liu et al.
11,817,657 B2 11/2023 Ellison et al.
2003/0008562 A1 1/2003 Yamasaki
2006/0110977 A1 5/2006 Matthews
2009/0011641 A1 1/2009 Cohen et al.
2009/0011643 A1 1/2009 Amleshi et al.
2009/0011645 A1 1/2009 Laurx et al.
2009/0011664 A1 1/2009 Laurx et al.
2009/0017682 A1 1/2009 Amleshi et al.
2009/0023330 A1 1/2009 Stoner et al.

(56) References Cited

U.S. PATENT DOCUMENTS

| | | | |
|---|---|---|---|
| 2009/0029602 | A1 | 1/2009 | Cohen et al. |
| 2009/0035955 | A1 | 2/2009 | McNamara |
| 2009/0051558 | A1 | 2/2009 | Dorval |
| 2009/0061661 | A1 | 3/2009 | Shuey et al. |
| 2009/0098767 | A1 | 4/2009 | Long |
| 2009/0117386 | A1 | 5/2009 | Vacanti et al. |
| 2009/0124101 | A1 | 5/2009 | Minich et al. |
| 2009/0130913 | A1 | 5/2009 | Yi et al. |
| 2009/0130918 | A1 | 5/2009 | Nguyen et al. |
| 2009/0149045 | A1 | 6/2009 | Chen et al. |
| 2009/0166082 | A1 | 7/2009 | Liu et al. |
| 2009/0176400 | A1 | 7/2009 | Davis et al. |
| 2009/0203259 | A1 | 8/2009 | Nguyen et al. |
| 2009/0205194 | A1 | 8/2009 | Semba et al. |
| 2009/0215309 | A1 | 8/2009 | Mongold et al. |
| 2009/0227141 | A1 | 9/2009 | Pan |
| 2009/0239395 | A1 | 9/2009 | Cohen et al. |
| 2009/0247012 | A1 | 10/2009 | Pan |
| 2009/0258516 | A1 | 10/2009 | Hiew et al. |
| 2009/0291593 | A1 | 11/2009 | Atkinson et al. |
| 2009/0305530 | A1 | 12/2009 | Ito et al. |
| 2009/0305533 | A1 | 12/2009 | Feldman et al. |
| 2009/0305553 | A1 | 12/2009 | Thomas et al. |
| 2009/0311908 | A1 | 12/2009 | Fogg et al. |
| 2010/0009571 | A1 | 1/2010 | Scherer et al. |
| 2010/0048058 | A1 | 2/2010 | Morgan et al. |
| 2010/0081302 | A1 | 4/2010 | Atkinson et al. |
| 2010/0099299 | A1 | 4/2010 | Moriyama et al. |
| 2010/0112850 | A1 | 5/2010 | Rao et al. |
| 2010/0144167 | A1 | 6/2010 | Fedder et al. |
| 2010/0144168 | A1 | 6/2010 | Glover et al. |
| 2010/0144175 | A1 | 6/2010 | Helster et al. |
| 2010/0144201 | A1 | 6/2010 | Defibaugh et al. |
| 2010/0144203 | A1 | 6/2010 | Glover et al. |
| 2010/0144204 | A1 | 6/2010 | Knaub et al. |
| 2010/0177489 | A1 | 7/2010 | Yagisawa |
| 2010/0183141 | A1 | 7/2010 | Arai et al. |
| 2010/0197149 | A1 | 8/2010 | Davis et al. |
| 2010/0203768 | A1 | 8/2010 | Kondo et al. |
| 2010/0221951 | A1 | 9/2010 | Pepe et al. |
| 2010/0221959 | A1 | 9/2010 | Pan |
| 2010/0273359 | A1 | 10/2010 | Walker et al. |
| 2010/0291806 | A1 | 11/2010 | Minich et al. |
| 2010/0294530 | A1 | 11/2010 | Atkinson et al. |
| 2011/0003509 | A1 | 1/2011 | Gailus |
| 2011/0067237 | A1 | 3/2011 | Cohen et al. |
| 2011/0074213 | A1 | 3/2011 | Schaffer et al. |
| 2011/0104948 | A1 | 5/2011 | Girard, Jr. et al. |
| 2011/0130038 | A1 | 6/2011 | Cohen et al. |
| 2011/0177699 | A1 | 7/2011 | Crofoot et al. |
| 2011/0212632 | A1 | 9/2011 | Stokoe et al. |
| 2011/0212633 | A1 | 9/2011 | Regnier et al. |
| 2011/0212649 | A1 | 9/2011 | Stokoe et al. |
| 2011/0212650 | A1 | 9/2011 | Amleshi et al. |
| 2011/0223807 | A1 | 9/2011 | Jeon et al. |
| 2011/0230095 | A1 | 9/2011 | Atkinson et al. |
| 2011/0230096 | A1 | 9/2011 | Atkinson et al. |
| 2011/0230104 | A1 | 9/2011 | Lang et al. |
| 2011/0256739 | A1 | 10/2011 | Toshiyuki et al. |
| 2011/0263156 | A1 | 10/2011 | Ko |
| 2011/0287663 | A1 | 11/2011 | Gailus et al. |
| 2011/0300757 | A1 | 12/2011 | Regnier et al. |
| 2012/0003848 | A1 | 1/2012 | Casher et al. |
| 2012/0034820 | A1 | 2/2012 | Lang et al. |
| 2012/0077369 | A1 | 3/2012 | Andersen |
| 2012/0077380 | A1 | 3/2012 | Minich et al. |
| 2012/0094536 | A1 | 4/2012 | Khilchenko et al. |
| 2012/0115371 | A1 | 5/2012 | Chuang et al. |
| 2012/0135643 | A1 | 5/2012 | Lange et al. |
| 2012/0156929 | A1 | 6/2012 | Manter et al. |
| 2012/0184136 | A1 | 7/2012 | Ritter |
| 2012/0184154 | A1 | 7/2012 | Frank et al. |
| 2012/0202363 | A1 | 8/2012 | McNamara et al. |
| 2012/0202386 | A1 | 8/2012 | McNamara et al. |
| 2012/0202387 | A1 | 8/2012 | McNamara |
| 2012/0214343 | A1 | 8/2012 | Buck et al. |
| 2012/0214344 | A1 | 8/2012 | Cohen et al. |
| 2012/0329294 | A1 | 12/2012 | Raybold et al. |
| 2013/0012038 | A1 | 1/2013 | Kirk et al. |
| 2013/0017715 | A1 | 1/2013 | Laarhoven et al. |
| 2013/0017733 | A1 | 1/2013 | Kirk et al. |
| 2013/0052843 | A1 | 2/2013 | Johnescu et al. |
| 2013/0065454 | A1 | 3/2013 | Milbrand Jr. |
| 2013/0078870 | A1 | 3/2013 | Milbrand, Jr. |
| 2013/0078871 | A1 | 3/2013 | Milbrand, Jr. |
| 2013/0089993 | A1 | 4/2013 | Jeon |
| 2013/0090001 | A1 | 4/2013 | Kagotani |
| 2013/0092429 | A1 | 4/2013 | Ellison |
| 2013/0109232 | A1 | 5/2013 | Paniaqua |
| 2013/0143442 | A1 | 6/2013 | Cohen et al. |
| 2013/0178107 | A1 | 7/2013 | Costello et al. |
| 2013/0196553 | A1 | 8/2013 | Gailus |
| 2013/0210246 | A1 | 8/2013 | Davis et al. |
| 2013/0217263 | A1 | 8/2013 | Pan |
| 2013/0223036 | A1 | 8/2013 | Herring et al. |
| 2013/0225006 | A1 | 8/2013 | Khilchenko et al. |
| 2013/0237092 | A1 | 9/2013 | Rubens |
| 2013/0273781 | A1 | 10/2013 | Buck et al. |
| 2013/0288513 | A1 | 10/2013 | Masubuchi et al. |
| 2013/0288521 | A1 | 10/2013 | McClellan et al. |
| 2013/0288525 | A1 | 10/2013 | McClellan et al. |
| 2013/0288539 | A1 | 10/2013 | McClellan et al. |
| 2013/0316590 | A1 | 11/2013 | Hon |
| 2013/0340251 | A1 | 12/2013 | Regnier et al. |
| 2014/0004724 | A1 | 1/2014 | Cartier, Jr. et al. |
| 2014/0004726 | A1 | 1/2014 | Cartier, Jr. et al. |
| 2014/0004746 | A1 | 1/2014 | Cartier, Jr. et al. |
| 2014/0041937 | A1 | 2/2014 | Lloyd et al. |
| 2014/0057493 | A1 | 2/2014 | De Geest et al. |
| 2014/0057494 | A1 | 2/2014 | Cohen |
| 2014/0057498 | A1 | 2/2014 | Cohen |
| 2014/0065883 | A1 | 3/2014 | Cohen et al. |
| 2014/0073174 | A1 | 3/2014 | Yang |
| 2014/0073181 | A1 | 3/2014 | Yang |
| 2014/0080331 | A1 | 3/2014 | Jeon |
| 2014/0194004 | A1 | 7/2014 | Pickel et al. |
| 2014/0242844 | A1 | 8/2014 | Wanha et al. |
| 2014/0273551 | A1 | 9/2014 | Resendez et al. |
| 2014/0273557 | A1 | 9/2014 | Cartier, Jr. et al. |
| 2014/0273627 | A1 | 9/2014 | Cartier, Jr. et al. |
| 2014/0287627 | A1 | 9/2014 | Cohen |
| 2014/0308852 | A1 | 10/2014 | Gulla |
| 2014/0322974 | A1 | 10/2014 | Chang et al. |
| 2014/0335707 | A1 | 11/2014 | Johnescu et al. |
| 2014/0335736 | A1 | 11/2014 | Regnier et al. |
| 2015/0031238 | A1 | 1/2015 | Davis et al. |
| 2015/0056856 | A1 | 2/2015 | Atkinson et al. |
| 2015/0079829 | A1 | 3/2015 | Brodsgaard |
| 2015/0079845 | A1 | 3/2015 | Wanha et al. |
| 2015/0111427 | A1 | 4/2015 | Wu et al. |
| 2015/0180578 | A1 | 6/2015 | Leigh et al. |
| 2015/0188250 | A1 | 7/2015 | Liu et al. |
| 2015/0194751 | A1 | 7/2015 | Herring |
| 2015/0200496 | A1 | 7/2015 | Simpson et al. |
| 2015/0207247 | A1 | 7/2015 | Regnier et al. |
| 2015/0236450 | A1 | 8/2015 | Davis |
| 2015/0236451 | A1 | 8/2015 | Cartier, Jr. et al. |
| 2015/0236452 | A1 | 8/2015 | Cartier, Jr. et al. |
| 2015/0255926 | A1 | 9/2015 | Paniagua |
| 2015/0280351 | A1 | 10/2015 | Bertsch |
| 2015/0303608 | A1 | 10/2015 | Zerebilov et al. |
| 2015/0357736 | A1 | 12/2015 | Tran et al. |
| 2015/0357761 | A1 | 12/2015 | Wanha et al. |
| 2015/0380868 | A1 | 12/2015 | Chen et al. |
| 2016/0000616 | A1 | 1/2016 | Lavoie |
| 2016/0013594 | A1 | 1/2016 | Costello et al. |
| 2016/0013596 | A1 | 1/2016 | Regnier |
| 2016/0028189 | A1 | 1/2016 | Resendez et al. |
| 2016/0104956 | A1 | 4/2016 | Santos et al. |
| 2016/0111825 | A1 | 4/2016 | Wanha et al. |
| 2016/0134057 | A1 | 5/2016 | Buck et al. |
| 2016/0141807 | A1 | 5/2016 | Gailus et al. |
| 2016/0149343 | A1 | 5/2016 | Atkinson et al. |
| 2016/0149362 | A1 | 5/2016 | Ritter et al. |

(56) References Cited

U.S. PATENT DOCUMENTS

| | | | |
|---|---|---|---|
| 2016/0150633 A1 | 5/2016 | Cartier, Jr. | |
| 2016/0150639 A1 | 5/2016 | Gailus et al. | |
| 2016/0150645 A1 | 5/2016 | Gailus et al. | |
| 2016/0156133 A1 | 6/2016 | Masubuchi et al. | |
| 2016/0172794 A1 | 6/2016 | Sparrowhawk et al. | |
| 2016/0181713 A1 | 6/2016 | Peloza et al. | |
| 2016/0181732 A1 | 6/2016 | Laurx et al. | |
| 2016/0190747 A1 | 6/2016 | Regnier et al. | |
| 2016/0197423 A1 | 7/2016 | Regnier | |
| 2016/0211618 A1 | 7/2016 | Gailus | |
| 2016/0218455 A1 | 7/2016 | Sayre et al. | |
| 2016/0233598 A1 | 8/2016 | Wittig | |
| 2016/0240946 A1 | 8/2016 | Evans et al. | |
| 2016/0268714 A1 | 9/2016 | Wanha et al. | |
| 2016/0274316 A1 | 9/2016 | Verdiell | |
| 2016/0308296 A1 | 10/2016 | Pitten et al. | |
| 2016/0315409 A1 | 10/2016 | Horning et al. | |
| 2016/0322770 A1 | 11/2016 | Zerebilov | |
| 2016/0344141 A1 | 11/2016 | Cartier, Jr. et al. | |
| 2017/0025783 A1 | 1/2017 | Astbury et al. | |
| 2017/0033478 A1 | 2/2017 | Wanha et al. | |
| 2017/0042070 A1 | 2/2017 | Baumler et al. | |
| 2017/0047692 A1 | 2/2017 | Cartier, Jr. et al. | |
| 2017/0077643 A1 | 3/2017 | Zbinden et al. | |
| 2017/0093093 A1 | 3/2017 | Cartier, Jr. et al. | |
| 2017/0098901 A1 | 4/2017 | Regnier | |
| 2017/0162960 A1 | 6/2017 | Wanha et al. | |
| 2017/0294743 A1 | 10/2017 | Gailus et al. | |
| 2017/0302011 A1 | 10/2017 | Wanha et al. | |
| 2017/0338595 A1 | 11/2017 | Girard, Jr. | |
| 2017/0352970 A1 | 12/2017 | Liang et al. | |
| 2017/0365942 A1 | 12/2017 | Regnier | |
| 2017/0365943 A1 | 12/2017 | Wanha et al. | |
| 2018/0006416 A1 | 1/2018 | Lloyd et al. | |
| 2018/0034175 A1 | 2/2018 | Lloyd et al. | |
| 2018/0034190 A1 | 2/2018 | Ngo | |
| 2018/0040989 A1 | 2/2018 | Chen | |
| 2018/0062323 A1 | 3/2018 | Kirk et al. | |
| 2018/0109043 A1 | 4/2018 | Provencher et al. | |
| 2018/0138620 A1 | 5/2018 | Horning et al. | |
| 2018/0145438 A1 | 5/2018 | Cohen | |
| 2018/0166828 A1 | 6/2018 | Gailus | |
| 2018/0198220 A1 | 7/2018 | Sasame et al. | |
| 2018/0205177 A1 | 7/2018 | Zhou et al. | |
| 2018/0212376 A1 | 7/2018 | Wang et al. | |
| 2018/0219331 A1 | 8/2018 | Cartier, Jr. et al. | |
| 2018/0219332 A1 | 8/2018 | Brungard et al. | |
| 2018/0269607 A1 | 9/2018 | Wu et al. | |
| 2018/0366880 A1 | 12/2018 | Zerebilov et al. | |
| 2019/0013625 A1 | 1/2019 | Gailus et al. | |
| 2019/0020155 A1 | 1/2019 | Trout et al. | |
| 2019/0036256 A1 | 1/2019 | Martens et al. | |
| 2019/0044284 A1 | 2/2019 | Dunham | |
| 2019/0052019 A1 | 2/2019 | Huang et al. | |
| 2019/0067854 A1 | 2/2019 | Ju et al. | |
| 2019/0131743 A1 | 5/2019 | Hsu et al. | |
| 2019/0157812 A1 | 5/2019 | Gailus et al. | |
| 2019/0173209 A1 | 6/2019 | Lu et al. | |
| 2019/0173232 A1 | 6/2019 | Lu et al. | |
| 2019/0173236 A1 | 6/2019 | Provencher et al. | |
| 2019/0221973 A1 | 7/2019 | Kirk et al. | |
| 2019/0296469 A1 | 9/2019 | Stokoe et al. | |
| 2019/0312389 A1 | 10/2019 | Little | |
| 2019/0334292 A1 | 10/2019 | Cartier, Jr. et al. | |
| 2020/0021052 A1 | 1/2020 | Milbrand, Jr. et al. | |
| 2020/0076132 A1 | 3/2020 | Yang et al. | |
| 2020/0161811 A1 | 5/2020 | Lu | |
| 2020/0194940 A1 | 6/2020 | Cohen et al. | |
| 2020/0212632 A1 | 7/2020 | Liong et al. | |
| 2020/0220289 A1 | 7/2020 | Scholeno et al. | |
| 2020/0235529 A1 | 7/2020 | Kirk et al. | |
| 2020/0251841 A1 | 8/2020 | Stokoe et al. | |
| 2020/0259294 A1 | 8/2020 | Lu | |
| 2020/0266584 A1 | 8/2020 | Lu | |
| 2020/0266585 A1 | 8/2020 | Paniagua et al. | |
| 2020/0303879 A1 | 9/2020 | Provencher et al. | |
| 2020/0315027 A1 | 10/2020 | Muronoi et al. | |
| 2020/0350717 A1 | 11/2020 | Dong et al. | |
| 2020/0350732 A1 | 11/2020 | Hsueh et al. | |
| 2020/0395698 A1 | 12/2020 | Hou et al. | |
| 2020/0403350 A1 | 12/2020 | Hsu | |
| 2020/0412060 A1 | 12/2020 | Hsieh et al. | |
| 2021/0036465 A1 | 2/2021 | Tang et al. | |
| 2021/0050683 A1 | 2/2021 | Sasame et al. | |
| 2021/0159643 A1 | 5/2021 | Kirk et al. | |
| 2021/0175670 A1 | 6/2021 | Cartier, Jr. et al. | |
| 2021/0184404 A1 | 6/2021 | Cohen et al. | |
| 2021/0194187 A1 | 6/2021 | Chen et al. | |
| 2021/0203096 A1 | 7/2021 | Cohen | |
| 2021/0234314 A1 | 7/2021 | Johnescu et al. | |
| 2021/0234315 A1 | 7/2021 | Ellison et al. | |
| 2021/0242632 A1 | 8/2021 | Trout et al. | |
| 2021/0320461 A1 | 10/2021 | Buck et al. | |
| 2021/0336362 A1 | 10/2021 | Shen et al. | |
| 2022/0094099 A1 | 3/2022 | Liu et al. | |
| 2022/0102916 A1 | 3/2022 | Liu et al. | |
| 2022/0329015 A1 | 10/2022 | Provencher et al. | |
| 2022/0399663 A1 | 12/2022 | Chang et al. | |
| 2022/0407269 A1 | 12/2022 | Ellison et al. | |
| 2023/0026708 A1 | 1/2023 | Carbaugh et al. | |
| 2023/0062661 A1 | 3/2023 | Johnescu et al. | |
| 2023/0099389 A1 | 3/2023 | Cohen | |
| 2023/0107361 A1 | 4/2023 | Muha et al. | |
| 2023/0128519 A1 | 4/2023 | Kirk et al. | |
| 2023/0238745 A1 | 7/2023 | Cohen et al. | |
| 2023/0378695 A1 | 11/2023 | Zeng | |
| 2024/0006822 A1* | 1/2024 | Johnescu | H01R 13/6477 |

FOREIGN PATENT DOCUMENTS

| | | | |
|---|---|---|---|
| CN | 101471515 | A | 7/2009 |
| CN | 101552410 | A | 10/2009 |
| CN | 101600293 | A | 12/2009 |
| CN | 201374433 | Y | 12/2009 |
| CN | 101752700 | A | 6/2010 |
| CN | 101783449 | A | 7/2010 |
| CN | 101790818 | A | 7/2010 |
| CN | 201562814 | U | 8/2010 |
| CN | 101854748 | A | 10/2010 |
| CN | 101120490 | B | 11/2010 |
| CN | 101964463 | A | 2/2011 |
| CN | 101124697 | B | 3/2011 |
| CN | 201846527 | U | 5/2011 |
| CN | 102106041 | A | 6/2011 |
| CN | 102157860 | A | 8/2011 |
| CN | 102195173 | A | 9/2011 |
| CN | 201966361 | U | 9/2011 |
| CN | 102232259 | A | 11/2011 |
| CN | 102239605 | A | 11/2011 |
| CN | 102282731 | A | 12/2011 |
| CN | 102292881 | A | 12/2011 |
| CN | 102299429 | A | 12/2011 |
| CN | 102427178 | A | 4/2012 |
| CN | 101600293 | B | 5/2012 |
| CN | 102570100 | A | 7/2012 |
| CN | 102598430 | A | 7/2012 |
| CN | 101258649 | B | 9/2012 |
| CN | 102738621 | A | 10/2012 |
| CN | 102176586 | B | 11/2012 |
| CN | 102782955 | A | 11/2012 |
| CN | 102859805 | A | 1/2013 |
| CN | 102882097 | A | 1/2013 |
| CN | 202678544 | U | 1/2013 |
| CN | 202695788 | U | 1/2013 |
| CN | 202695861 | U | 1/2013 |
| CN | 102986091 | A | 3/2013 |
| CN | 103036081 | A | 4/2013 |
| CN | 103124030 | A | 5/2013 |
| CN | 202930673 | U | 5/2013 |
| CN | 103151651 | A | 6/2013 |
| CN | 103594871 | A | 2/2014 |
| CN | 103915727 | A | 7/2014 |

(56) References Cited

FOREIGN PATENT DOCUMENTS

| | | | |
|---|---|---|---|
| CN | 104241973 | A | 12/2014 |
| CN | 204190038 | U | 3/2015 |
| CN | 104577577 | A | 4/2015 |
| CN | 205212085 | U | 5/2016 |
| CN | 102820589 | B | 8/2016 |
| CN | 106067610 | A | 11/2016 |
| CN | 106099546 | A | 11/2016 |
| CN | 107069274 | A | 8/2017 |
| CN | 107069293 | A | 8/2017 |
| CN | 304240766 | S | 8/2017 |
| CN | 304245430 | S | 8/2017 |
| CN | 206712089 | U | 12/2017 |
| CN | 207677189 | U | 7/2018 |
| CN | 108832338 | A | 11/2018 |
| CN | 109728456 | A | 5/2019 |
| CN | 109994892 | A | 7/2019 |
| CN | 110212332 | A | 9/2019 |
| CN | 111555069 | A | 8/2020 |
| CN | 112134095 | A | 12/2020 |
| CN | 212342862 | U | 1/2021 |
| CN | 213636403 | U | 7/2021 |
| EP | 2169770 | A2 | 3/2010 |
| EP | 2262061 | A1 | 12/2010 |
| EP | 2388867 | A2 | 11/2011 |
| EP | 2390958 | A1 | 11/2011 |
| EP | 2405537 | A1 | 1/2012 |
| EP | 1794845 | B1 | 3/2013 |
| EP | 2811589 | A1 | 12/2014 |
| JP | 2009-043717 | A | 2/2009 |
| JP | 2009-110956 | A | 5/2009 |
| JP | 2011-018651 | A | 1/2011 |
| JP | 2012-516021 | A | 7/2012 |
| JP | 2016-528688 | A | 9/2016 |
| TW | M357771 | U | 5/2009 |
| TW | 200926536 | A | 6/2009 |
| TW | M403141 | U | 5/2011 |
| TW | M494411 | U | 1/2015 |
| TW | I475770 | B | 3/2015 |
| TW | M509998 | U | 10/2015 |
| TW | M518837 | U | 3/2016 |
| TW | M558481 | U | 4/2018 |
| TW | M558482 | U | 4/2018 |
| TW | M558483 | U | 4/2018 |
| TW | M559006 | U | 4/2018 |
| TW | M559007 | U | 4/2018 |
| TW | M560138 | U | 5/2018 |
| TW | 201820724 | A | 6/2018 |
| TW | M562507 | U | 6/2018 |
| TW | M565894 | Y | 8/2018 |
| TW | M565895 | Y | 8/2018 |
| TW | M565899 | Y | 8/2018 |
| TW | M565900 | Y | 8/2018 |
| TW | M565901 | Y | 8/2018 |
| TW | M623128 | U | 2/2022 |
| WO | WO 2009/111283 | A2 | 9/2009 |
| WO | WO 2010/030622 | A1 | 3/2010 |
| WO | WO 2010/039188 | A1 | 4/2010 |
| WO | WO 2011/060236 | A1 | 5/2011 |
| WO | WO 2011/090634 | A2 | 7/2011 |
| WO | WO 2011/100740 | A2 | 8/2011 |
| WO | WO 2011/106572 | A2 | 9/2011 |
| WO | WO 2011/139946 | A1 | 11/2011 |
| WO | WO 2011/140438 | A2 | 11/2011 |
| WO | WO 2011/140438 | A3 | 12/2011 |
| WO | WO 2012/078434 | A2 | 6/2012 |
| WO | WO 2012/106554 | A2 | 8/2012 |
| WO | WO 2013/006592 | A2 | 1/2013 |
| WO | WO 2013/059317 | A1 | 4/2013 |
| WO | WO 2015/013430 | A1 | 1/2015 |
| WO | WO 2015/112717 | A1 | 7/2015 |
| WO | WO 2016/008473 | A1 | 1/2016 |
| WO | WO 2018/039164 | A1 | 3/2018 |

OTHER PUBLICATIONS

[No Author Listed], Amphenol TCS expands the Xcede Platform with 85 Ohm Connectors and High-Speed Cable Solutions. Press Release. Published Feb. 25, 2009. http://www.amphenol.com/about/news_archive/2009/58 [Retrieved on Mar. 26, 2019 from Wayback Machine]. 4 pages.

[No Author Listed], AGILENT. Designing Scalable 10G Backplane Interconnect Systems Utilizing Advanced Verification Methodologies. White Paper, Published May 5, 2012. 24 pages.

[No Author Listed], Cable Systems. Samtec. Aug. 2010. 148 pages.

[No Author Listed], Common Management Interface Specification. Rev 4.0. MSA Group. May 8, 2019. 265 pages.

[No Author Listed], Electronics Connector Overview. FCI. Sep. 23, 2009. 78 pages.

[No Author Listed], EMI Shielding Compounds Instead of Metal. RTP Company. Last Accessed Apr. 30, 2021. 2 pages.

[No Author Listed], EMI Shielding Solutions and EMC Testing Services from Laird Technologies. Laird Technologies. Last accessed Apr. 30, 2021. 1 page.

[No Author Listed], FCI—High Speed Interconnect Solutions, Backpanel Connectors. FCI. [last accessed Apr. 30, 2021). 2 pages.

[No Author Listed], Hitachi Cable America Inc. Direct Attach Cables. 8 pages. Retrieved Aug. 10, 2017 from http://www.hca.hitachi-cable.com/products/hca/catalog/pdfs/direct-attach-cable-assemblies.pdf [last accessed Mar. 6, 2019].

[No Author Listed], HOZOX EMI Absorption Sheet and Tape. Molex. Laird Technologies. 2013. 2 pages.

[No Author Listed], OSFP MSA Specification for OSFP Octal Small Form Factor Pluggable Module. Revision 3.0 OSFP MSA. Mar. 14, 2020. 99 pages.

[No Author Listed], Photograph of Molex Connector. Oct. 2021. 1 page.

[No Author Listed], Photograph of TE Connector. Oct. 2021. 1 page.

[No Author Listed], Pluggable Input/Output Solutions. Tyco Electronics Catalog 1773408-1. Revised Feb. 2009. 40 pages.

[No Author Listed], QSFP-DD MSA QSFP-DD Hardware Specification for QSFP Double Density 8X Pluggable Transceiver. Revision 5.1. QSFP-DD MSA. Aug. 7, 2020. 84 pages.

[No Author Listed], QSFP-DD Specification for QSFP Double Density 8X Pluggable Transceiver Specification, Rev. 2.0. QSFP-DD MSA. Mar. 13, 2017. 106 pages.

[No Author Listed], RTP Company—EMI/RFI Shielding Compounds (Conductive) Data Sheets. RTP Company. Last accessed Apr. 30, 2021. 4 pages.

[No Author Listed], SFF Committee SFF-8436 Specification for QSFP+ 4X 10 Gb/s Pluggable Transceiver. Revision 4.9. SFF Committee. Aug. 31, 2018. 88 pages.

[No Author Listed], SFF Committee SFF-8665 Specification for QSFP+ 28 Gb/s 4X Pluggable Transceiver Solution (QSFP28). Revision 1.9. SFF Committee. Jun. 29, 2015. 14 pages.

[No Author Listed], SFF-8431 Specifications for Enhanced Small Form Factor Pluggable Module SFP+. Revision 4.1. SFF Committee. Jul. 6, 2009. 132 pages.

[No Author Listed], SFF-8432 Specification for SFP+ Module and Cage. Rev 5.1. SFF Committee. Aug. 8, 2012. 18 pages.

[No Author Listed], SFF-8433 Specification for SFP+ Ganged Cage Footprints and Bezel Openings. Rev 0.7. SFF Committee. Jun. 5, 2009. 15 pages.

[No Author Listed], SFF-8477 Specification for Tunable XFP for ITU Frequency Grid Applications. Rev 1.4. SFF Committee. Dec. 4, 2009. 13 pages.

[No Author Listed], SFF-8672 Specification for QSFP+ 4x 28 Gb/s Connector (Style B). Revision 1.2. SNIA. Jun. 8, 2018. 21 pages.

[No Author Listed], SFF-8679 Specification for QSFP+ 4X Base Electrical Specification. Rev 1.7. SFF Committee. Aug. 12, 2014. 31 pages.

[No Author Listed], SFF-8682 Specification for QSFP+ 4X Connector. Rev 1.1. SNIA SFF TWG Technology Affiliate. Jun. 8, 2018. 19 pages.

[No Author Listed], Shielding Theory and Design. Laird Technologies. Last accessed Apr. 30, 2021. 1 page.

(56) References Cited

OTHER PUBLICATIONS

[No Author Listed], Shielding Theory and Design. Laird Technologies. Last accessed Apr. 30, 2021. 2 pages. URL:web.archive.org/web/20030226182710/http://www.lairdtech.com/catalog/staticdata/shieldingtheorydesign/std_3.htm.

[No Author Listed], Shielding Theory and Design. Laird Technologies. Last accessed Apr. 30, 2021. 2 pages. URL:web.archive.org/web/20021223144443/http://www.lairdtech.com/catalog/staticdata/shieldingtheorydesign/std_2.htm.

[No Author Listed], Typical conductive additives—Conductive Compounds. RTP Company. https://www.rtpcompany.com/products/conductive/additives.htm. Last accessed Apr. 30, 2021. 2 pages.

[No Author Listed], Z-Pack HM-Zd Connector, High Speed Backplane Connectors. Tyco Electronics. Catalog 1773095. 2009;5-44.

Atkinson et al., High Frequency Electrical Connector, U.S. Appl. No. 15/645,931, filed Jul. 10, 2017.

Cartier et al., High Speed, High Density Electrical Connector With Shielded Signal Paths, U.S. Appl. No. 18/335,472, filed Jun. 15, 2023.

Decision Invalidating CN Patent Application No. 201610952606.4 dated Sep. 18, 2021, which issued as CN Utility Model Patent No. 107069274B, and Certified Translation.

Do et al., A Novel Concept Utilizing Conductive Polymers on Power Connectors During Hot Swapping in Live Modular Electronic Systems. IEEE Xplore 2005; downloaded Feb. 18, 2021;340-345.

In re Certain Electrical Connectors and Cages, Components Thereof, and Prods. Containing the Same, Inv. No. 337-TA-1241, Order No. 31 (Oct. 19, 2021): Construing Certain Terms of the Asserted Claims of the Patents at Issue.

In re Matter of Certain Electrical Connectors and Cages, Components Thereof, and Products Containing the Same, Inv. No. 337-TA-1241, Complainant Amphenol Corporation's Corrected Initial Post-Hearing Brief. Public Version. Jan. 5, 2022. 451 pages.

In re Matter of Certain Electrical Connectors and Cages, Components Thereof, and Products Containing the Same, Inv. No. 337-TA-1241, Complainant Amphenol Corporation's Post-Hearing Reply Brief. Public Version. Dec. 6, 2021. 159 pages.

In re Matter of Certain Electrical Connectors and Cages, Components Thereof, and Products Containing the Same, Inv. No. 337-TA-1241, Luxshare Respondents' Initial Post-Hearing Brief. Public Version. Nov. 23, 2021. 348 pages.

In re Matter of Certain Electrical Connectors and Cages, Components Thereof, and Products Containing the Same, Inv. No. 337-TA-1241, Luxshare Respondents' Reply Post-Hearing Brief. Public Version. Dec. 6, 2021. 165 pages.

In re Matter of Certain Electrical Connectors and Cages, Components Thereof, and Products Containing the Same, Inv. No. 337-TA-1241, Notice of Prior Art. Jun. 3, 2021. 319 pages.

In re Matter of Certain Electrical Connectors and Cages, Components Thereof, and Products Containing the Same, Inv. No. 337-TA-1241, Respondents' Pre-Hearing Brief. Redacted. Oct. 21, 2021. 219 pages.

In the Matter of Certain Electrical Connectors and Cages, Components Thereof, and Products Containing the Same, Inv. No. 337-TA-1241, Final Initial Determination on Violation of Section 337. Public Version. Mar. 11, 2022. 393 pages.

Invalidity Claim Charts Based on CN 201112782Y ("Cai"). Luxshare Respondents' Supplemental Responses to Interrogatories Nos. 13 and 14, Exhibit 25. May 7, 2021. 147 pages.

Invalidity Claim Charts Based on U.S. Pat. No. 6,179,651 ("Huang"). Luxshare Respondents' Supplemental Responses to Interrogatories Nos. 13 and 14, Exhibit 26. May 7, 2021. 153 pages.

Invalidity Claim Charts Based on U.S. Pat. No. 7,261,591 ("Korsunsky"). Luxshare Respondents' Supplemental Responses to Interrogatories Nos. 13 and 14, Exhibit 27. May 7, 2021. 150 pages.

Milbrand et al., High Performance Cable Connector, U.S. Appl. No. 18/449,520, filed Aug. 14, 2023.

Petition for Inter Partes Review. *Luxshare Precision Industry Co., Ltd* v. *Amphenol Corp.* U.S. Pat. No. 10,381,767. IPR2022-00132. Nov. 4, 2021. 112 pages.

* cited by examiner

HIGH SPEED CONNECTOR

RELATED APPLICATIONS

This patent application is a continuation of U.S. patent application Ser. No. 17/902,342, filed on Sep. 2, 2022, and entitled "HIGH SPEED CONNECTOR," now U.S. Pat. No. 11,799,246, which is a continuation of U.S. patent application Ser. No. 17/158,214, now U.S. Pat. No. 11,469,553, filed on Jan. 26, 2021 and entitled "HIGH SPEED CONNECTOR," which claims priority to and the benefit of U.S. Provisional Patent Application No. 63/076,692, filed on Sep. 10, 2020, and entitled "HIGH SPEED CONNECTOR." U.S. patent application Ser. No. 17/158,214 also claims priority to and the benefit of U.S. Provisional Patent Application Ser. No. 62/966,528, filed on Jan. 27, 2020, and entitled "HIGH SPEED CONNECTOR." The contents of these applications are hereby incorporated herein by reference in their entirety.

TECHNICAL FIELD

This patent application relates generally to interconnection systems, such as those including electrical connectors, used to interconnect electronic assemblies.

BACKGROUND

Electrical connectors are used in many electronic systems. It is generally easier and more cost effective to manufacture a system as separate electronic assemblies, such as printed circuit boards ("PCBs"), which may be joined together with electrical connectors. A known arrangement for joining several printed circuit boards is to have one printed circuit board serve as a backplane. Other printed circuit boards, called "daughterboards" or "daughtercards," may be connected through the backplane.

A known backplane is a printed circuit board onto which many connectors may be mounted. Conducting traces in the backplane may be electrically connected to signal conductors in the connectors so that signals may be routed between the connectors. Daughtercards may also have connectors mounted thereon. The connectors mounted on a daughtercard may be plugged into the connectors mounted on the backplane. In this way, signals may be routed among the daughtercards through the backplane. The daughtercards may plug into the backplane at a right angle. The connectors used for these applications may therefore include a right angle bend and are often called "right angle connectors."

In other system configurations, signals may be routed between parallel boards, one above the other. Connectors used in these applications are often called "stacking connectors" or "mezzanine connectors." In yet other configurations, orthogonal boards may be aligned with edges facing each other. Connectors used in these applications are often called "direct mate orthogonal connectors." In yet other system configurations, cables may be terminated to a connector, sometimes referred to as a cable connector. The cable connector may plug into a connector mounted to a printed circuit board such that signals that are routed through the system by the cables are connected to components on the printed circuit board.

Regardless of the exact application, electrical connector designs have been adapted to mirror trends in the electronics industry. Electronic systems generally have gotten smaller, faster, and functionally more complex. Because of these changes, the number of circuits in a given area of an electronic system, along with the frequencies at which the circuits operate, have increased significantly in recent years. Current systems pass more data between printed circuit boards and require electrical connectors that are electrically capable of handling more data at higher speeds than connectors of even a few years ago.

In a high density, high speed connector, electrical conductors may be so close to each other that there may be electrical interference between adjacent signal conductors. To reduce interference, and to otherwise provide desirable electrical properties, shield members are often placed between or around adjacent signal conductors. The shields may prevent signals carried on one conductor from creating "crosstalk" on another conductor. The shield may also impact the impedance of each conductor, which may further contribute to desirable electrical properties.

Other techniques may be used to control the performance of a connector. For instance, transmitting signals differentially may also reduce crosstalk. Differential signals are carried on a pair of conducting paths, called a "differential pair." The voltage difference between the conductive paths represents the signal. In general, a differential pair is designed with preferential coupling between the conducting paths of the pair. For example, the two conducting paths of a differential pair may be arranged to run closer to each other than to adjacent signal paths in the connector. No shielding is desired between the conducting paths of the pair, but shielding may be used between differential pairs. Electrical connectors can be designed for differential signals as well as for single-ended signals.

In an interconnection system, connectors are attached to printed circuit boards. Typically, a printed circuit board is formed as a multi-layer assembly manufactured from stacks of dielectric sheets, sometimes called "prepreg." Some or all of the dielectric sheets may have a conductive film on one or both surfaces. Some of the conductive films may be patterned, using lithographic or laser printing techniques, to form conductive traces that are used to make interconnections between components mounted to the printed circuit board. Others of the conductive films may be left substantially intact and may act as ground planes or power planes that supply the reference potentials. The dielectric sheets may be formed into an integral board structure by heating and pressing the stacked dielectric sheets together.

To make electrical connections to the conductive traces or ground/power planes, holes may be drilled through the printed circuit board. These holes, or "vias", are filled or plated with metal such that a via is electrically connected to one or more of the conductive traces or planes through which it passes.

To attach connectors to the printed circuit board, contact "tails" from the connectors may be inserted into the vias or attached to conductive pads on a surface of the printed circuit board that are connected to a via.

SUMMARY

Embodiments of a high speed, high density interconnection system are described.

Some embodiments relate to a subassembly for an electrical connector. The subassembly includes a leadframe assembly comprising a leadframe housing, and a plurality of conductive elements held by the leadframe housing and disposed in a column, each conductive element comprising a mating end, a mounting end opposite the mating end, and an intermediate portion extending between the mating end and the mounting end; and a core member comprising a body and a mating portion extending from the body, the body and mating portion comprising insulative material, the mating portion further comprising lossy material. A first portion of the plurality of conductive elements are configured as ground conductors and a second portion of the plurality of conductive elements are configured as signal conductors. The leadframe assembly is attached to a first side of the core member such that the conductive elements configured as ground conductors are coupled to each other through the lossy material.

Some embodiments relate to an electrical connector. The connector includes a plurality of leadframe assemblies, each leadframe assembly comprising a column of conductive elements held by insulative material, each conductive element comprising a mating end, a mounting end opposite the mating end, and an intermediate portion extending between the mating end and the mounting end; a plurality of core members, wherein at least one of the plurality of leadframe assemblies is attached to each of the plurality of core members; and a housing comprising a first outer wall and a second outer wall opposite the first inner wall and a plurality of inner walls extending between the first outer wall and the second outer wall. The plurality of core members are inserted into the housing such that the inner walls are between leadframe assemblies attached to adjacent core members of the plurality of core members.

Some embodiments relate to a method of manufacturing an electrical connector. The method includes molding a connector housing in a mold having a first opening/closing direction such that the housing comprises at least one opening extending in a first direction through the housing parallel to the first opening/closing direction; molding a plurality of core members in a mold having a second opening/closing direction such that each of the plurality of core member comprises a body and features extending from the body in a second direction parallel to the second opening/closing direction; attaching one or more leadframe assemblies to a core member of the plurality of core members with contact portions of leads of the one or more leadframe assemblies adjacent the features of the core member; and inserting at least a portion of the plurality of core members and the contact portions of the leads of the attached leadframe assemblies into the at least one opening in housing such that the second direction is orthogonal to the first direction.

Some embodiments relate to an electrical connector. The connector includes a housing comprising a first portion and a second portion, the second portion comprising a mating face of the housing; and at least one conductive element held by the first portion of the housing, the at least one conductive element comprising a cantilevered mating end extending from the first portion of the housing towards the mating face. The mating end comprises a convex surface facing away from the housing and a distal tip inclined towards the housing. The second portion of the housing comprises a projection between the distal tip and the mating face.

Some embodiments relate to a method of operating a first electrical connector to mate the first electrical connector with a second electrical connector. The method includes moving the first electrical connector in a mating direction relative to the second electrical connector with a first plurality of conductive elements of the first electrical connector aligned, in a direction perpendicular to the mating direction, with a second plurality of conductive elements of the second electrical connector. The moving includes, in sequence, engaging convex surfaces of mating portions of the first plurality of conductive elements with at least one member extending from a housing of the second connector in a direction perpendicular to the mating direction; riding the at least one member over the convex surfaces to apexes of the convex surfaces such that the mating portions of the first plurality of conductive elements are deflected in the direction perpendicular to the mating direction away from mating portions of the second plurality of conductive elements, and the distal tips of the first plurality of conductive elements overlap, in the mating direction, distal tips of the second plurality of conductive elements by at least a predetermined amount; riding the at least one member over surfaces of mating portions of the first plurality of conductive elements past the apexes of the convex surfaces such that the mating portions of the first plurality of conductive elements spring back towards surfaces of the second plurality of conductive elements; and engaging the first plurality of conductive elements with respective conducive elements of the second plurality of conductive elements.

Some embodiments relate to an electrical connector. The connector includes a leadframe assembly comprising a leadframe housing, and a plurality of conductive elements held by the leadframe housing and disposed in a plane, each conductive element comprising a mating end, a mounting end opposite the mating end, and an intermediate portion extending between the mating end and the mounting end, wherein the mounting ends are arranged in a column extending in a column direction; a ground shield comprising a portion parallel to the plane and attached to the leadframe housing; and a plurality of shielding interconnects extending from the ground shield, the plurality of shielding interconnects configured to be adjacent and/or make contact with a ground plane on a surface of a board to which the electrical connector is mounted.

Some embodiments relate to an electrical connector. The connector includes a housing; an organizer; a plurality of leadframe assemblies held by the housing. Each leadframe assembly includes a column of conductive elements held by insulative material, each conductive element comprising a mating end, a mounting end opposite the mating end, and an intermediate portion extending between the mating end and the mounting end; a first shield comprising a planar portion disposed on a first side of the column, and a plurality of shielding interconnects extending from the planar portion; a second shield comprising a planar portion disposed on a second side of the column, opposite the first side of the column, such that the intermediate portions are between the first shield and the second shield, and a plurality of shielding interconnects extending from the planar portion. The mounting ends of the conductive elements and the plurality of shielding interconnects of the first shield and the second shield of the plurality of leadframe assemblies extend through the organizer so as to form a mounting interface of the electrical connector. The plurality of shielding interconnects of the first shield and the second shield each comprises a compressible member at the mounting interface.

Some embodiments relate to a subassembly for a cable connector. The subassembly includes a leadframe assembly comprising a leadframe housing, and a plurality of conductive elements held by the leadframe housing and disposed in a column, each conductive element comprising a mating end, a mounting end opposite the mating end, and an intermediate portion extending between the mating end and the mounting end, the mounting ends of the plurality of conductive elements comprising signal ends and ground ends; a plurality of cables, each cable comprising a pair of wires and a cable shield disposed around the pair of wires, the pair of wires being attached to respective signal ends of the plurality of conductive elements; and a conductive hood comprising a first hood portion and a second hood portion. The first hood portion is attached to the second hood portion with ground ends of the plurality of conductive elements electrically and mechanically connected therebetween. The plurality of cables pass through openings in the conductive hood with the conductive hood making an electrical connection with the cable shields of the plurality of cables.

Some embodiments relate to a subassembly for a cable connector, the subassembly includes a core member comprising a body and a mating portion extending from the body, the body and mating portion comprising insulative material, the mating portion further comprising lossy material; a first leadframe assembly comprising a first leadframe housing, and a first plurality of conductive elements held by the first leadframe housing and disposed in a first column, each conductive element comprising a mating end, a mounting end opposite the mating end, and an intermediate portion extending between the mating end and the mounting end, wherein the first plurality of conductive elements comprise ground conductors and signal conductors; and a first plurality of cables comprising wires terminated to the mounting ends of the signal conductors of the first plurality of conductive elements; a first overmold covering a portion of the first plurality of cables and a portion of the first leadframe assembly; a second leadframe assembly comprising a second leadframe housing, and a second plurality of conductive elements held by the second leadframe housing and disposed in a second column, each conductive element comprising a mating end, a mounting end opposite the mating end, and an intermediate portion extending between the mating end and the mounting end, wherein the second plurality of conductive elements comprise ground conductors and signal conductors; a second plurality of cables comprising wires terminated to the mounting ends of the signal conductors of the second plurality of conductive elements; and a second overmold covering a portion of the second plurality of cables and a portion of the second leadframe assembly. The first leadframe assembly is attached to a first side of the core member with the mating ends of the first plurality of conductive elements adjacent the mating portion of the core member. The second leadframe assembly is attached to a second side of the core member with the mating ends of the second plurality of conductive elements adjacent the mating portion of the core member. The first overmold and the second overmold comprise complementary, interlocking features.

Some embodiments relate to a cable connector. The connector includes a housing comprising a cavity and a plurality of walls surrounding the cavity; and a plurality of cable assemblies held in the cavity of the housing. Each cable assembly includes a leadframe assembly comprising a leadframe housing, and a plurality of conductive elements held by the leadframe housing and disposed in a column, each conductive element comprising a mating end, a mounting end opposite the mating end, and an intermediate portion extending between the mating end and the mounting end, the mounting ends of the plurality of conductive elements comprising signal ends and ground ends; a plurality of cables, each cable comprising a pair of wires and a cable shield disposed around the pair of wires, the pair of wires being attached to respective signal ends of the plurality of conductive elements; and a conductive hood comprising a first hood portion and a second hood portion. The ground ends of the plurality of conductive elements comprise holes. The first hood portion and/or the second hood portion comprise posts. The first hood portion is attached to the second hood portion with the posts extending through the holes. The conductive hood comprises a cavity between the first hood portion and the second hood portion with attachments between the pairs of wires of the plurality of cables and the respective signal ends of the plurality of conductive elements disposed within the cavity.

Some embodiments relate to a connector assembly. The connector assembly includes a leadframe housing; and a plurality of conductive elements held by the leadframe housing and disposed in a column, each conductive element comprising a mating end, a mounting end opposite the mating end, and an intermediate portion extending between the mating end and the mounting end. The plurality of conductive elements comprise signal conductive elements and ground conductive elements, and the mounting ends of the ground conductive elements comprise flexible beams.

These techniques may be used alone or in any suitable combination. The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1B:
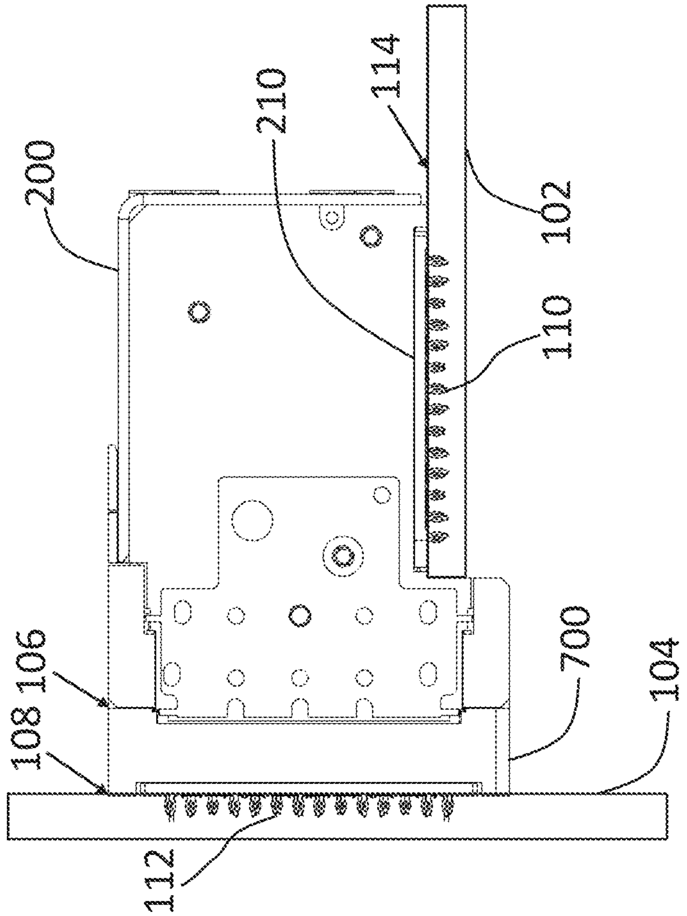
FIG. 1B is a side view of two printed circuit boards electrically connected through the connectors of FIG. 1A, according to some embodiments.

The inventors have recognized and appreciated connector designs that increase performance of a high density interconnection system, particularly those that carry very high frequency signals that are necessary to support high data rates. The connector designs may be simply constructed, using conventional molding processes for the connector housing, yet be mechanically robust and provide desirable performance at very high frequencies to support high data rates, including at 112 Gbps and above, using PAM4 modulation.

As one example, the inventors have recognized and appreciated techniques to incorporate conductive shielding and lossy material in locations that enable operation at very high frequencies to support high data rates, for example, at or above 112 Gbps. To enable effective isolation of the signal conductors at very high frequencies, the connector may include conductive material coupled to selectively positioned lossy material. The conductive material may provide effective shielding in a mating region where two connectors are mated. When the two connectors are mated, the mating interface shielding may be disposed between mated portions of conductive elements carrying separate signals. The mating interface shielding of the connector may overlap with internal ground shielding of a mating connector and provide consistent shielding from the bodies of the connectors to their mating interface, which further reduces cross talk.

The inventors have further recognized techniques to connect shields within a connector to a ground plane of a printed circuit board to which the connector is mounted so as to reduce resonances and increase the integrity of signals passing through a connector. The connection may be made through mounting interface shielding, which may be compressible. The mounting interface shielding may include compressible members at selected, discrete locations. The compressible members may be configured to make physical contact with a flooded ground plane of a PCB. In some embodiments, the mounting interface shielding may be integrally formed with internal ground shields of the connector. As a specific example, mounting interface shielding suppresses a resonance that occurs at about 35 GHz, thereby increasing the frequency range of the connector.

The inventors have also recognized techniques to reduce resonances and increase the integrity of signals passing through a connector that are attached with cables. The technique may include connecting shields within a connector to shields of cables that are attached to the connector. The connection may be made through flexible structures extending from ground contacts and/or shields of the connector and configured to directly or indirectly press against cable shields. Additionally or alternatively, the technique may include features that reduce impedance discontinuity at the attachments between connector contacts and cable conductors.

The connector may include housing features configured to avoid mechanical stubbing of conductive elements of a connector with those in a mating connector. Each connector may have projections that, during a mating sequence, engages and deflects the tip of a conductive element from the mating connector. Such deflection increases the separation between the tips of the conductive elements to be mated, reducing the risk that those tips will mechanically stub, even with variability in position of those tips that might arise in the manufacture or use of the connectors. Further, this technique enables the tips to have only short segments between a contact point and the distal end of the conductive element, which provides for only a short stub extending past the contact point. As a stub might impact signal integrity at frequencies inversely proportional to its length, providing for a short stub ensures that any impact on signal integrity is at a high frequency, thereby providing for a large operating frequency range of the connector.

The connector may include contact tails configured for stably and precisely mounting to a printed circuit board with a high density footprint. A connector may have ground contact tails disposed between groups of signal contact tails. The signal contact tails may have smaller dimensions than the ground contact tails. Such configuration may provide benefits including, for example, reducing parasitic capacitance, providing a desired impedance of signal vias within the printed circuit board, and also reducing the size of the connector footprint. On the other hand, relatively larger ground contact tails may assist with precisely aligning the contact tails with corresponding contact holes on a printed circuit board and retaining the connector to the printed circuit board with sufficient attachment force.

In some embodiments, a connector may include conductive elements held in columns as leadframe assemblies. The leadframe assemblies may be aligned in a row direction. The leadframe assemblies may be attached to core members before inserting into a housing. The core member may include features that would be difficult to mold in an interior portion of a housing, including relatively fine features that are conventionally included at the mating interface of a connector. Such a design may enable the housing to have substantially uniform walls without complex and thin sections required by conventional connector housing to hold mating portions of conductive elements. Such a design may also allow using materials that previously would not have filled a conventional housing mold that includes the complex and thin geometry. Further, such a design may allow additional features that cannot be practically achieved with front-to-back coring used in molding of conventional connectors, such as a recess extending in a direction perpendicular to the columns and configured to protect contact tips.

The core member may have a body portion and a top portion. Body portions of leadframe assemblies may be attached to the body portions of the core members. A column of contact portions of the conductive elements, extending from the body portions of a leadframe assembly, may parallel the top portion of the core member. The top portion may be molded with fine features, including a long thin edge paralleling the tips of the conductive elements, which would be difficult to reliably mold as part of the housing.

In some embodiments, high frequency performance may be enabled by shielding throughout two mated connectors, which may both be formed with leadframe assemblies attached to core members. That shielding may extend from the mounting interfaces of a first connector to a first circuit board to which a first connector is mounted, through the first connector, through a mating interface to a second connector, through the body of the second connector and through a mounting interface of the second connector to a second circuit board to which the second connector is mounted. Shielding within the body portions of the leadframe assembly may be provided by shields attached to sides of the leadframe assemblies. At the mating interface, a shield may be in the interior of the top portion of the core member.

Effectiveness of the shielding may be increased by features that electrically connect the shield in the top portion of the core member to the shields of the leadframe assemblies. Further, features may be included to electrically couple the shields of the leadframe assemblies to ground planes on a surface of the printed circuit boards to which the connectors are mounted. In some embodiments, that electrical coupling may be formed with tines extending toward the printed circuit board and that are selectively positioned in regions of high electromagnetic radiation.

For example, in some embodiments, each leadframe assembly may include a signal leadframe and at least one ground plate. In some embodiments, the leadframe may be sandwiched by two ground plates. The mounting interface shielding for the connector may be formed by compressible members extending from the ground plates. The signal leadframe may include pairs of signal conductive elements. The compressible members extending from the ground plates may be positioned in groups. Each group of compressible members may at least partially surround a pair of signal conductive elements.

Further, the shield in the top portion of the core member may be electrically coupled to ground conductive elements in the leadframe assemblies. This coupling may be made through lossy material, which suppresses resonances that might otherwise occur as a result of distal ends of the top shields, away from connections to other grounded structures.

In some embodiments, intermediate portions of signal conductive elements within the bodies of the leadframe assemblies are shielded on two sides by leadframe assembly shields but contact portions are adjacent to only one top shield within the top portion of the core member. However, two-sided shielding may be provided throughout the signal path through two mated connectors. At the mating interface, mated contact portions of two mating connectors will be bounded on each of two sides by a top portion of the core members of one of the connectors. Thus, each contact portion will be bounded on two sides by a top shield, one from the connector of which it is a part and one from the connector to which it is mated. Providing shielding in the same configuration, such as two-sided shielding, throughout the signal path enables high integrity signal interconnects, as mode conversions and other effects that can degrade signal integrity at the transition between shielding configurations are avoided.

Such shielding may be simply and reliably formed in each of the multiple regions of the interconnection system. In some embodiments, a core member may be formed by a two-shot process. In the first shot, lossy material may be molded. In some embodiments, the lossy material may be selectively molded over conductive material. In the second shot, the lossy material may be selectively over molded with insulative material.

The foregoing techniques may be used singly or together in any suitable combination.

Figure 1A:
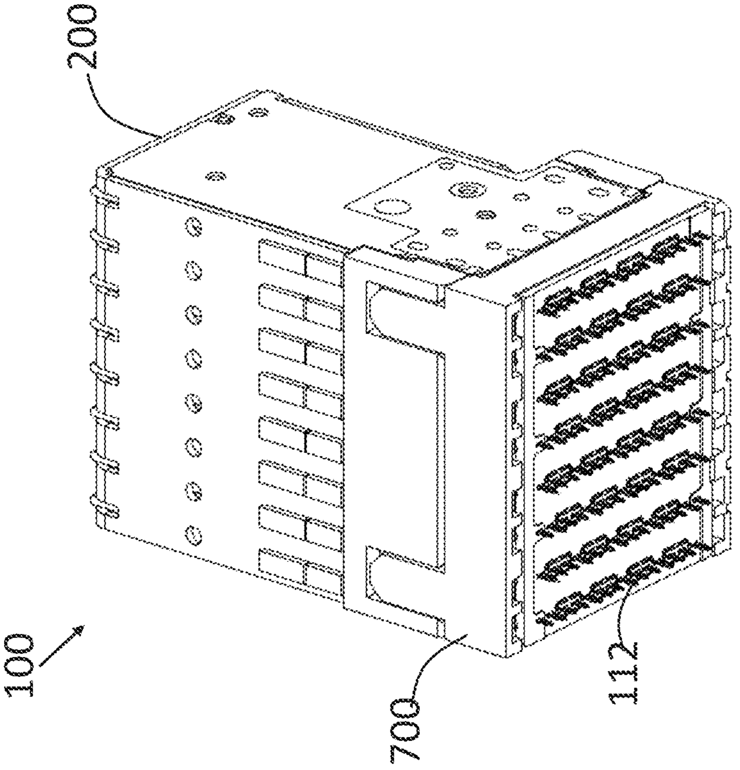
FIG. 1A is a perspective view of a header connector mated to a complementary right angle connector, according to some embodiments.

An exemplary embodiment of such connectors is illustrated in FIGS. 1A and 1B. FIGS. 1A and 1B depict an electrical interconnection system 100 of the form that may be used in an electronic system. Electrical interconnection system 100 may include two mating connectors, here illustrated as a right angle connector 200 and a header connector 700.

In the illustrated embodiment, the right angle connector 200 is attached to a daughtercard 102 at a mounting interface 114, and mated to the header connector 700 at a mating interface 106. The header connector 700 may be attached to a backplane 104 at a mounting interface 108. At the mounting interfaces, conductive elements, acting as signal conductors, within the connectors may be connected to signal traces within the respective printed circuit boards. At the mating interfaces, the conductive elements in each connector make mechanical and electrical connections such that the conductive traces in the daughtercard 102 may be electrically connected to conductive traces in the backplane 104 through the mated connectors. Conductive elements acting as ground conductors within each connector may be similarly connected, such that the ground structures within the daughtercard 102 similarly may be electrically connected to ground structures in the backplane 104.

To support mounting of the connectors to respective printed circuit boards, right angle connector 200 may include contact tails 110 configured to attach to the daughtercard 102. The header connector 700 may include contact tails 112 configured to attach to the backplane 104. In the illustrated embodiment, these contact tails form one end of conductive elements that pass through the mated connectors. When the connectors are mounted to printed circuit boards, these contact tails will make electrical connection to conductive structures within the printed circuit board that carry signals or are connected to a reference potential. In the example illustrated, the contact tails are press fit, "eye of the needle (EON)," contacts that are designed to be pressed into vias in a printed circuit board, which in turn may be connected to signal traces, ground planes or other conductive structures within the printed circuit board. However, other forms of contact tails may be used, for example, surface mount contacts, or pressure contacts.

Figure 2B:
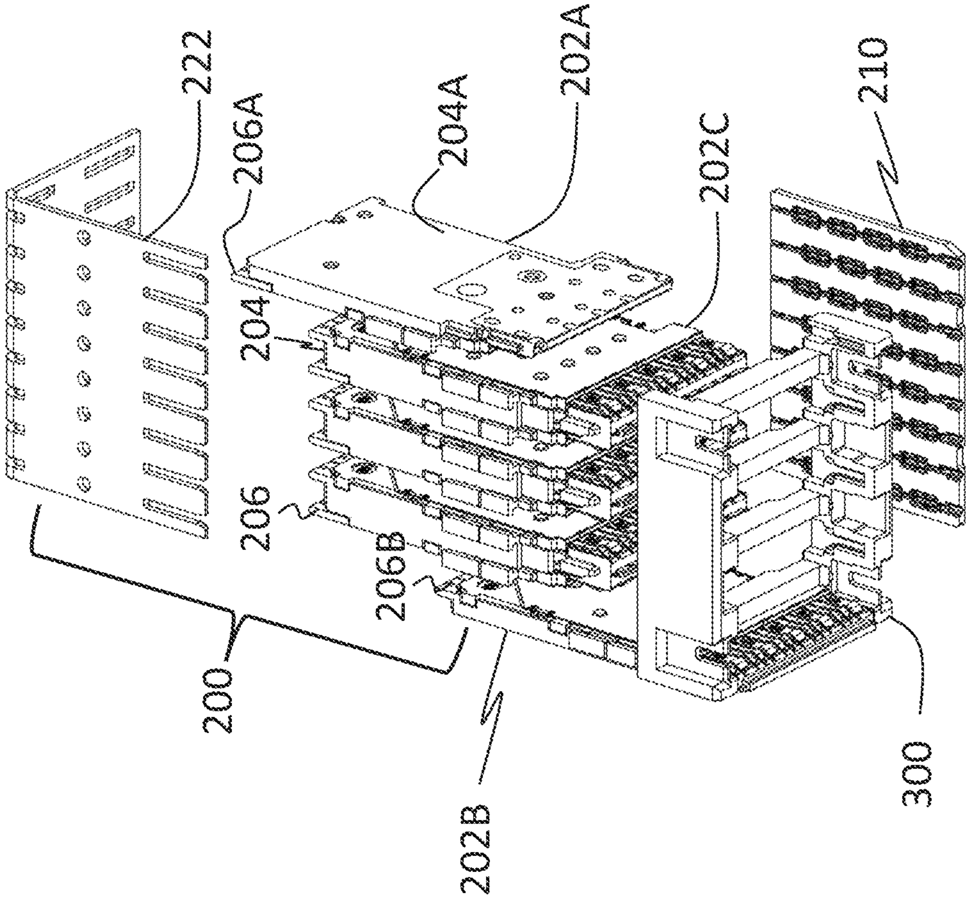
FIG. 2B is an exploded view of the right angle connector of FIG. 2A, according to some embodiments.
Figure 2A:
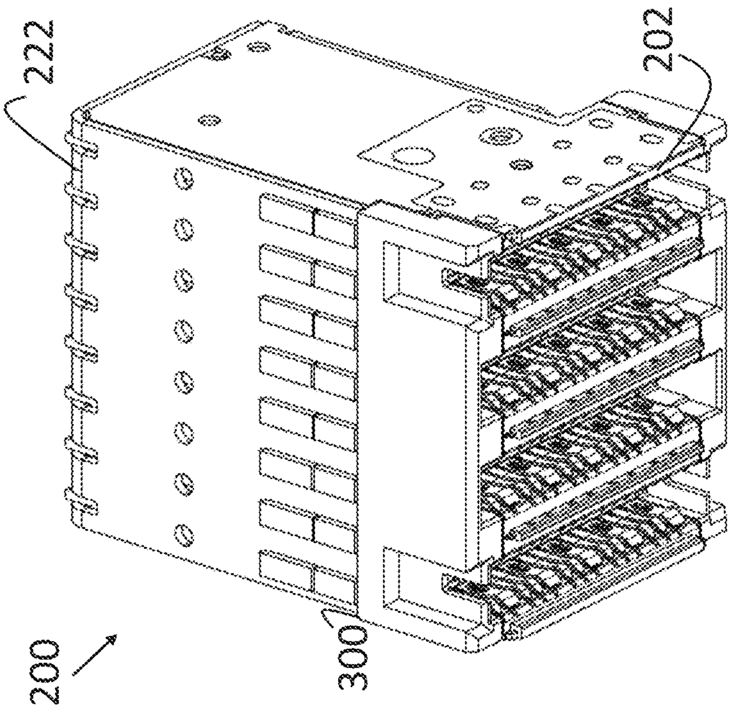
FIG. 2A is a perspective view of the right angle connector of FIG. 1A, according to some embodiments.

FIGS. 2A and 2B depict a perspective view and exploded view, respectively, of the right angle connector 200, according to some embodiments. The right angle connector 200 may be formed from multiple subassemblies, which in this example are T-Top assemblies, aligned side-by-side in a row. A T-Top assembly may include a core member 204 and at least one leadframe assembly 206 attached to the core member. These components may be configured individually for simple manufacture and to provide high frequency operation when assembled, as described in more detail below.

In the example of FIG. 2B, three types of T-Top assemblies are illustrated. T-Top assembly 202A is at a first end of the row, and T-Top assembly 202B is at a second end of the row. A plurality of a third type of T-Top assemblies 202C are positioned within the row between the T-Top assemblies 202A and 202B. The types of T-Top assemblies may differ in the number and configuration of leadframe assemblies.

A leadframe assembly may hold a column of conductive elements forming signal conductors. In some embodiments, the signal conductors may be shaped and spaced to form single ended signal conductors (e.g., 208A in FIG. 2C). In some embodiments, the signal conductors may be shaped and spaced in pairs to provide pairs of differential signal conductors (e.g., 208B in FIG. 2C). In the embodiment illustrated, each column has four pairs and one single-ended conductor, but this configuration is illustrative and other embodiments may have more or fewer pairs and more or fewer single ended conductors.

The column of signal conductors may include or be bounded by conductive elements serving as ground conductors (e.g., 212). It should be appreciated that ground conductors need not be connected to earth ground, but are shaped to carry reference potentials, which may include earth ground, DC voltages or other suitable reference potentials. The "ground" or "reference" conductors may have a shape different than the signal conductors, which are configured to provide suitable signal transmission properties for high frequency signals.

In the embodiment illustrated, signal conductors within a column are grouped in pairs positioned for edge-coupling to support a differential signal. In some embodiments, each pair may be adjacent at least one ground conductor and in some embodiments, each pair may be positioned between adjacent ground conductors. Those ground conductors may be within the same column as the signal conductors.

In some embodiments, a T-Top assembly may alternatively or additionally include ground conductors that are offset from the column of signal conductors in a row direction, which is orthogonal to the column direction. Such ground conductors may have planar regions, which may separate adjacent columns of signal conductors. Such ground conductors may act as electromagnetic shields between columns of signal conductors.

Conductive elements may be made of metal or any other material that is conductive and provides suitable mechanical properties for conductive elements in an electrical connector. Phosphor-bronze, beryllium copper and other copper alloys are non-limiting examples of materials that may be used. The conductive elements may be formed from such materials in any suitable way, including by stamping and/or forming.

The insert molded leadframe assemblies may be constructed by stamping conductive elements from a sheet of metal. Curves and other features of the conductive elements may also be formed, as part of the stamping operation or in a separate operation. The signal conductors and ground conductors of a column may be stamped from a sheet of metal, for example. In the stamping operation, portions of the metal sheet, serving as tie bars between the conductive elements, may be left to hold the conductive elements in position. The conductive elements may be overmolded by plastic, which in this example is insulative and serves as a portion of the connector housing, which holds the conductive elements in position. The tie bars may then be severed.

In some embodiments, the signal and ground conductors of the leadframe may be held stable by pinch pins. The pinch pins may extend from the surfaces of a mold used in the insert molding operation. In a conventional insert molding operation, pinch pins from opposing sides of a mold may pinch signal conductors and ground conductors between them. In this way, the position of the signal and ground conductors with respect to the insulative housing molded over them is controlled. When the mold is opened, and the IMLA is removed, holes (e.g., holes 550 in FIG. 5P) in the insulative housing in the locations of the pinch pins remain. These holes are generally regarded as non-functional for the completed IMLA as they are made with pins that are of small enough diameter that they do not materially impact the electrical properties of the signal conductors.

In some embodiments, however, the number of pinch pins pinching each signal conductor may be selected so as to provide a functional benefit. As a specific example, in a conventional connector the number of pinch pins, and the resulting number of pinch pin holes, may be the same for each signal conductors of a pair of adjacent signal conductors. In some connectors, such as right angle connectors, one of the signal conductors of a pair may be longer than the other. More pinch pins may be used for the longer signal conductor of each pair. More pinch pins results in more pinch pin holes and a lower effective dielectric constant of the housing along the length of the longer signal conductor, as compared to the shorter. This configuration may result in more pinch pin holes along the longer conductor than is needed, but may also reduce intrapair skew and otherwise improve performance of the connector.

In some embodiments, the conductive elements in different ones of the leadframe assemblies may be configured differently. In this example, there are two types of leadframes assemblies, differing in the position of the signal and ground conductors within the column such that, when the two types of leadframe assemblies are positioned side by side, a ground conductive element in one leadframe assembly (e.g., Type-A IMLA 206A) is adjacent a signal conductive element in the other leadframe assembly (e.g., Type-B IMLA 206B). In the illustrated example, Type-A IMLAs are positioned to the left of a core member (when the connector is viewed from a perspective looking toward the mating interface). Type-B IMLAs are positioned to the right of a core member. This configuration may reduce the column-to-column cross talk between leadframe assemblies.

In the illustrated embodiment, the right angle connector 200 includes a single Type-A IMLA T-Top assembly 202A at a first end of a row that the T-Top assemblies 202 align along, a single Type-B IMLA T-Top assembly 202B at a second end of the row, opposite the first end of the row, and multiple dual IMLA T-Top assemblies 202C between the first and second ends. The Type-A IMLA T-Top assembly 202A has a single leadframe assembly 206A attached to a core member. The Type-B IMLA T-Top assembly 202B has a single leadframe assembly 206B attached to a core member. Accordingly, each of the Type-A IMLA T-Top assembly and the Type-B IMLA T-Top assembly has a side not attached with a leadframe assembly. This configuration allows using the open sides of the core members of the Type-A IMLA T-Top assembly 202A and the Type-B IMLA T-Top assembly 202B as part of the connector housing.

A core member of a dual IMLA T-Top assembly 202C may have two leadframe assemblies, here a Type-A IMLA and a Type-B IMLA, attached to opposite sides of the core member. In some embodiments, the conductive elements in the two leadframe assemblies may be configured the same.

One or more members may hold the T-Top assemblies in a desired position. For example, a support member 222 may hold top and rear portions, respectively, of multiple T-Top assemblies in a side-by-side configuration. The support member 222 may be formed of any suitable material, such as a sheet of metal stamped with tabs, openings or other features that engage corresponding features on the individual T-Top assemblies. As another example, support members may be molded from plastic and may hold other portions of the T-Top assemblies and serve as a portion of the connector housing, such as front housing 300.

Figure 2D:
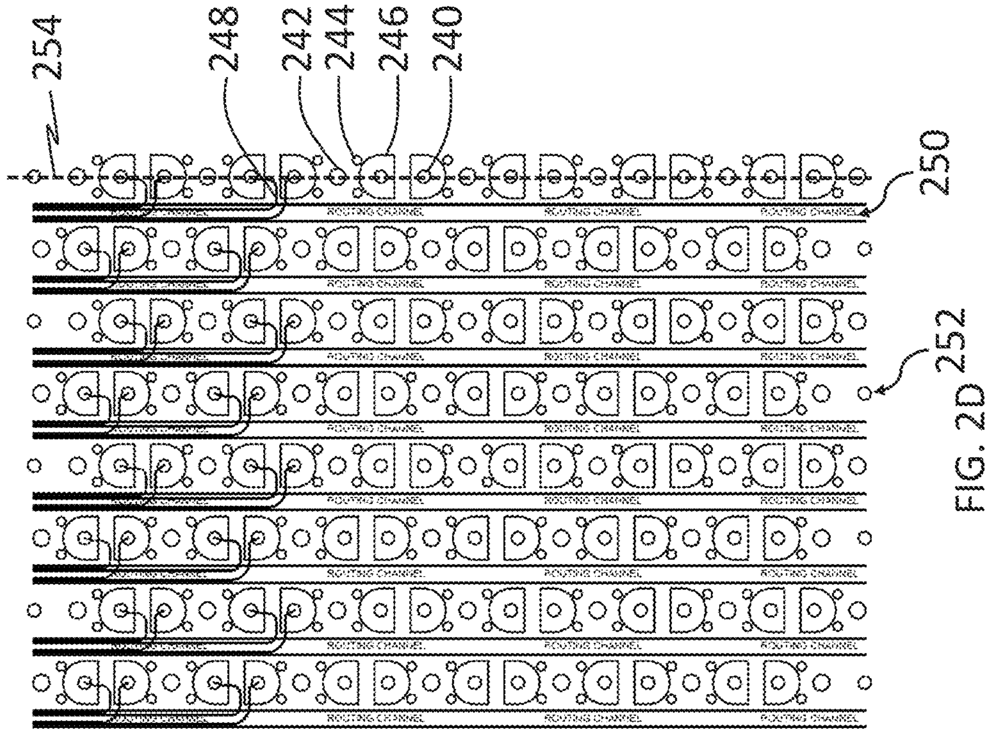
FIG. 2D is a top, plan view of a complementary footprint for the right angle connector of FIG. 2C, according to some embodiments.
Figure 2C:
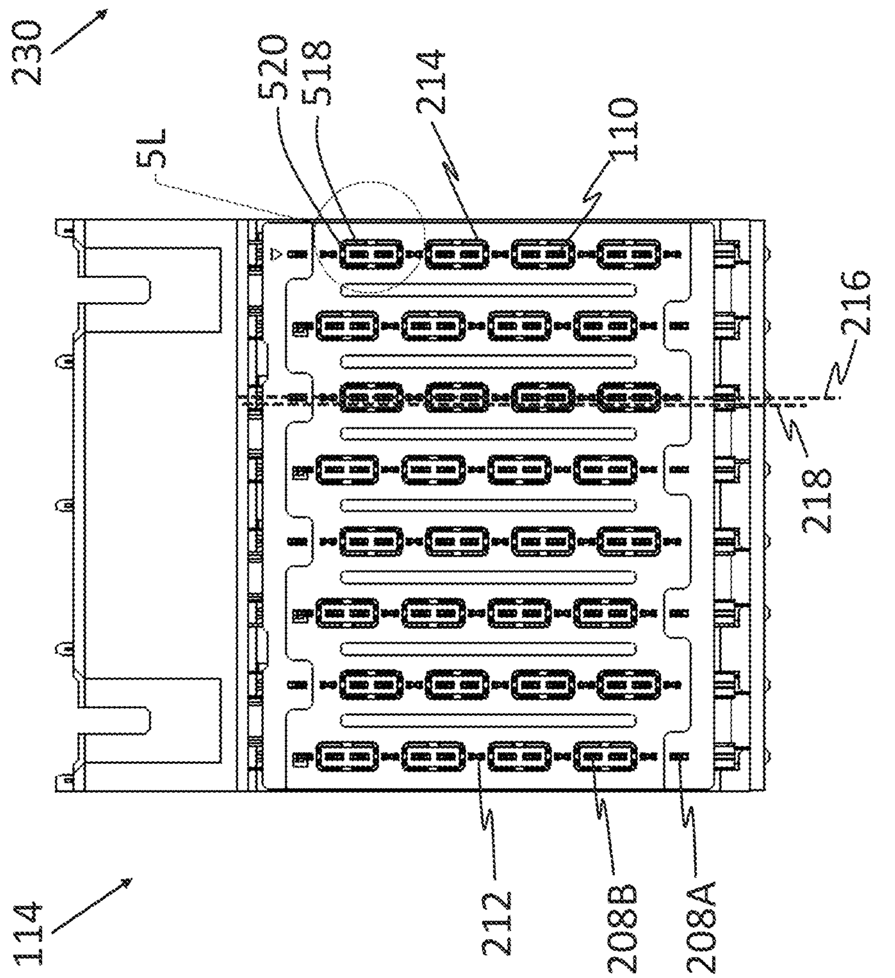
FIG. 2C is a plan view of the right angle connector of FIG. 2A, illustrating a mounting interface of the right angle connector, according to some embodiments.

FIG. 2C depicts the mounting interface 114 of the right angle connector 200, according to some embodiments. The contact tails 110 of the connector 200 may be arranged in an array including multiple parallel columns 216, offset from one another in a row direction, perpendicular to the column direction. Each column 216 of contact tails 110 may include ground contact tails 212 disposed between pairs of signal contacts 208B. In some embodiments, all or a portion of the signal contacts 208B may be manufactured thinner than the ground contacts. Thinner signal contacts may provide a desired impedance for the signal contacts. The ground contact tails 212 may be thicker in order to provide good mechanical strength.

In some embodiments, the signal contacts may be formed in the same leadframe by stamping a sheet of metal into the desired shape. Nonetheless, all or portions of the signal contacts may be thinner than the ground contacts by reducing their thickness, such as by coining the signal contacts. In some embodiments, the signal contacts may be between 75 and 95% of the thickness of the ground contacts. In other embodiments, the signal contacts may be between 80% and 90% of the thickness of the ground contacts.

In some embodiments, intermediate portions of the signal contacts may be the same thickness as intermediate portions of the ground contacts. The tails of the signal contacts nonetheless may be of reduced thickness. In an embodiment in which the tails of the signal contacts are configured for press fit mounting, such a configuration may enable the tails of the signal contacts to fit within relatively small holes. The holes, for example, may be formed with a drill of 0.3 mm to 0.4 mm diameter, or 0.32 mm to 0.37 mm, such as a 0.35 mm drill. The finished hole size may be 0.26 mm+/−10%. In contrast, the ground tails may be inserted into a larger hole. For example, the hole might be formed with a 0.4 mm to 0.5 mm drill, such as a 0.45 mm drill, with a finished diameter of 0.31 mm to 0.41 mm, for example. The contact tails may be configured with a width larger than the finished diameter of the respective holes into which they are inserted and to be compressible to a width that is the same as or smaller than the finished hole diameter.

Forming contact tails with these dimensions may reduce parasitic capacitance between signal conductors and adjacent grounds in an assembly in which such a connector is used, for example. Nonetheless, the grounds may provide sufficient attachment force to retain the connector on a printed circuit board to which the connector is mounted. Further, by stamping the signals and grounds, though of different finished thicknesses, from the same sheet of metal, precise positioning of the signal tails relative to ground tails may be provided. Positions of the signal contact tails, for example, may be within 0.1 mm or less of their designed position, as measured relative to position of the tails of the ground contacts. Such a configuration simplifies attachment of the connector to the printed circuit board. The more robust ground contact tails may be used to align the connector with respect to the printed circuit board by engaging their respective holes. The signal contact tails will then be sufficiently aligned with their respective holes to enter the holes with little risk of damage when the connector is pressed into the board. As a result, the connector may be mounted with a simple tool that presses the connector perpendicularly with respect to the printed circuit board, without the need for expensive fixtures or other tooling.

The ground contact tails and/or signal contact tails may be configured to support mounting of the connector to a printed circuit board in this way. As is visible, for example in FIG. 5I, the ground contacts tails, may be longer than the signal contact tails. The ground contacts may be longer by an amount such that they enter their respective holes in the printed circuit board before the tips of the signal contacts reach a plane parallel to the surface of the printed circuit board. In the embodiment illustrated, the contact tails taper towards the tips. In the illustrated embodiment, the ground contact tails have a body with an opening therethrough, which enables compression of the tail upon insertion into a hole. The distal portion of the tail is elongated such that it is narrower than the body and may readily enter a hole on a printed circuit board. The signal contacts have a shorter elongated portion at their distal ends.

The connector 200 may include a mounting interface shielding interconnects 214 configured to make electrical connections, for at least high frequency signals, between the ground conductors acting as shields between columns of signal conductors within the connector and ground structures with the PCB to which the connector is mounted. Shielding interconnects 214 are adjacent to and/or make contact with a flooded ground plane of the daughtercard 102. In this example, the mounting interface shielding interconnects 214 include a plurality of tines 520 configured to be adjacent to and/or make physical contact with the flooded ground plane of the daughtercard.

The tines 520 may be positioned to also reduce radiated emissions at the mounting interface 114. In some embodiments, the tines 520 may be arranged in an array including columns 218. Neighboring columns 216 of the contact tails 110 may be separated by one or more columns 218 of the tines 520 of the interface shielding interconnect 214. The tines 520 may have a portion in a same plane as a body of a ground conductor acting as a shield between columns within the connector. Accordingly, a portion of the tines 520 may be offset from the contact tails 110 in a row direction that is perpendicular to the column direction. Additionally, each of the tines may include a portion that is bent out of that plane towards to column of signal conductors. That portion of the tines 520 may be positioned between a ground contact tail 212 and a signal contact tail 208B.

In some embodiments, the mounting interface shielding interconnect 214 may be compressible. A compressible interconnect may generate a force that makes a reliable contact to the ground plane on the printed circuit board, such as by generating contact force and/or enabling contact to be made despite tolerance in the position of the connector with respect to the surface of the printed circuit board. In some embodiments, some or all of the tines 214 may make physical contact with the daughtercard 102 when the connector 200 is mounted to the daughtercard 102. Alternatively or additionally, some or all of the tines 214 may be capacitively coupled to the ground plane on daughtercard 102 without physical contact and/or a sufficient number of the tines 214 may be coupled to the ground plane to achieve the desired effect.

Figure 5B:
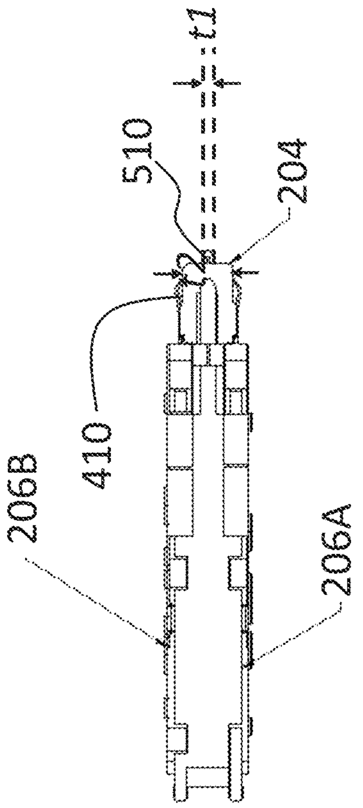
FIG. 5B is a top view of the dual IMLA assembly of FIG. 5A, illustrating Type-A and Type-B IMLAs attached to opposite sides of a core member, according to some embodiments.
Figure 5A:
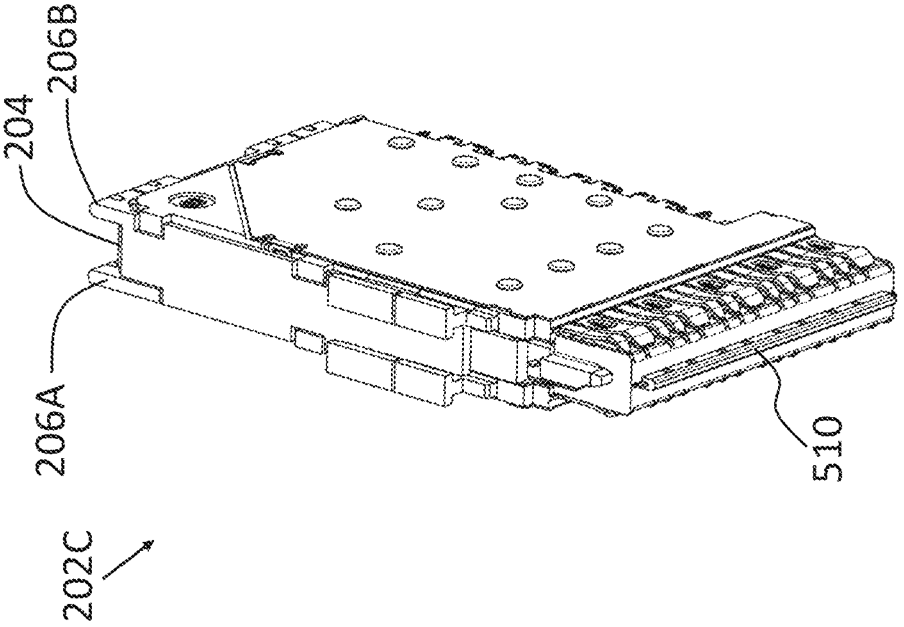
FIG. 5A is a perspective view of a dual insert-molded-leadframe-assembly (IMLA) assembly, according to some embodiments.

In some embodiments, the mounting interface shielding interconnect 214 may extend from internal shields of the connector 200 and may be formed integrally with the internal shields of the connector 200. In some embodiments, the mounting interface shielding interconnect 214 may be formed by compressible members extending from internal shields of the leadframe assemblies 206, for example, compressible members 518 illustrated in FIG. 5T and/or may be a separate compressible member.

FIG. 2D depicts, partially schematically, a top view of a footprint 230 on the daughtercard 102 for the right angle connector 200, according to some embodiments. The footprint 230 may include columns of footprint patterns 252 separated by routing channels 250. A footprint pattern 252 may be configured to receive mounting structures of a leadframe assembly (e.g., contacts tails 110 and compressible members 518 of a leadframe assembly 206).

The footprint pattern 252 may include signal vias 240 aligned in a column 254 and ground vias 242 aligned to the column 254. The ground vias 242 may be configured to receive contact tails from ground conductive elements (e.g., 212). The signal vias 240 may be configured to receive contact tails of signal conductive elements (e.g., 208A, 208B). As illustrated, the ground vias 242 may be larger than the signal vias 240. When a connector is being mounted to a board, larger and more robust ground contact tails may align the connector with the bigger ground vias. This aligns the signal contact tails with the smaller signal vias. This configuration may increase the economics of an electronic assembly by, for example, enabling a conventional mounting method such as press fit with flat-rock tooling, and avoiding expensive special tooling that might otherwise be necessary to mount the connector to the printed circuit board without damage to the thinner signal contact tails that might otherwise be susceptible to damage.

The signal vias 240 may be positioned in respective anti-pads 246. The printed circuit board may have layers containing large conductive regions interspersed with layers patterned with conductive traces. The traces may carry signals and the layers that predominately sheets of conductive material may serve as grounds. Anti-pads 246 may be formed as openings in the ground layers such that the electrically conductive material of a ground layer of the PCB is not connected to the signal vias. In some embodiments, a differential pair of signal conductive elements may share one anti-pad.

The via pattern 252 may include ground vias 244 for the compressible members 518 of the mounting interface shielding interconnect 214. In some embodiments, the ground vias 244 may be shadow vias configured to enhance electrical connection between internal shields of the connector to the PCB, without receiving ground contact tails. In some embodiments, the shadow vias may be below and/or be compressed against by the compressible members 518, for example, by the tines 520 of the compressible members 518 (FIG. 5K). The ground vias 244 may be sized and positioned to provide enough space between footprint patterns 252 such that traces 248 can run in the routing channel 250. In some embodiments, the ground vias 244 may be offset from the column 254. In some embodiments, the ground vias 244 may be within a width of the anti-pads 246 such that the width of the anti-pads 246 defines the width of the column footprint pattern 252.

It should be appreciated that although some structures such as the traces 248 are illustrated for some of the signal vias, the present application is not limited in this regard. For example, each signal via may have corresponding breakouts such as traces 248.

FIG. 2D shows some of the structures that may be in a PCB, including structures that might be visible on the surface of the printed circuit board and some that might be in the interior layers of the PCB. For example, the anti-pads 246 may be formed in a ground plane on a surface of a printed circuit board and/or may be formed in some or all of the ground planes in the inner layers of the PCB. Moreover, even if formed on the surface of the PCB, the ground plane might be covered by a solder mask or coating such that it is not visible. Likewise, traces 248 may be on one or more inner layers.

Referring back to FIG. 1B and FIG. 2B, the connector 200 may include an organizer 210, which may be configured to hold the contact tails 110 in an array. The organizer 210 may include a plurality of openings that are sized and arranged for some or all of the contact tails 110 to pass through them. In some embodiments, the organizer 210 may be made of a rigid material and may facilitate alignment of the contact tails in a predetermined pattern. In some embodiments, the organizer may reduce the risk of damage to contact tails when the connector is mounted to a printed circuit board by limiting variations in the positions of the contact tails to the locations of the slots, which may be reliably positioned.

An organizer may be used in conjunction with thin and/or narrow signal contact tails, as described elsewhere herein. In some embodiments, the organizer may be used in conjunction with a leadframe in which ground contact tails position are used to position the leadframe with respect to a printed circuit board. In the illustrated embodiment, the openings are elongated in a column direction. The openings may be sized to provide greater limitation on movement of the contact tails in a direction perpendicular to the column direction than in the column direction. The openings may ensure alignment, in a direction perpendicular to the column direction, of the contact tails with openings in the printed circuit board. As described above, alignment of the ground contacts in a leadframe assembly with holes in the printed circuit board may lead to alignment in the column direction of all of the contact tails in the leadframe assembly. In combination, these two techniques may provide accurate alignment in two dimensions of the contact tails with holes of the printed circuit board, enabling thin and narrow signal contact tails, with correspondingly small diameter signal holes in the printed circuit board with low risk of damage.

In some embodiments, the organizer may reduce airgaps between the connector and the board, which can cause undesirable changes in impedance along the length of conductive elements. An organizer may also reduce relative movement among the T-Top assemblies 202. In some embodiments, the organizer 210 may be made of an insulative material and may support the contact tails 110 as a connector is being mounted to a printed circuit board or keep the contact tails 110 from being shorted together. In some embodiments, the organizer 210 may include lossy material to reduce degradation in signal integrity for signals passing through the mounting interface of the connector. The lossy material may be positioned to be connected to or preferentially couple to ground conductive elements passing from the connector to the board. In some embodiments, the organizer may have a dielectric constant that matches the dielectric constant of a material used in the front housing 300 and/or the core member 204 and/or the leadframe assemblies 206.

Figure 2E:
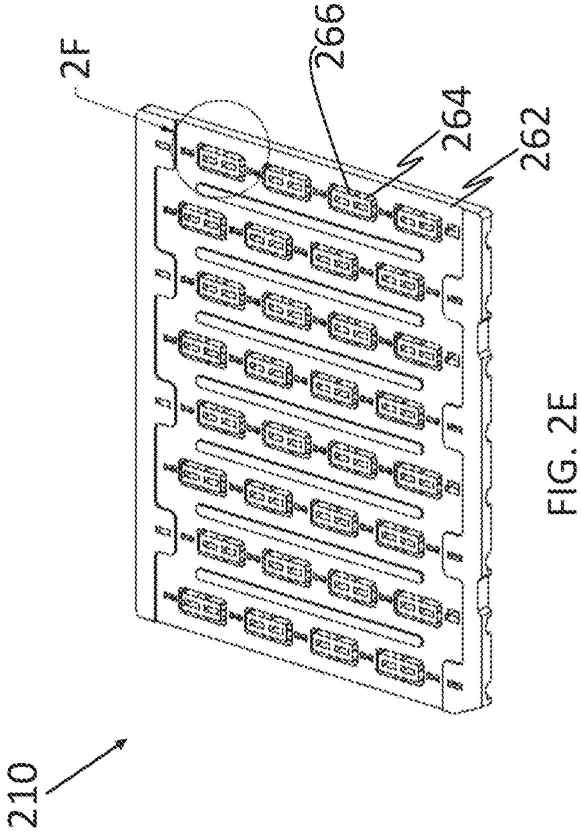
FIG. 2E is a perspective view of an organizer of the right angle connector of FIG. 2A, showing a board mounting face, according to some embodiments.
Figure 2F:
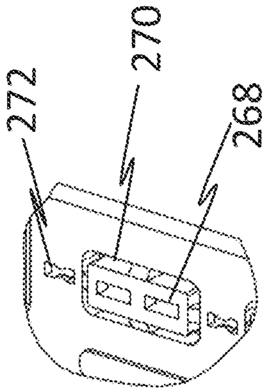
FIG. 2F is an enlarged view of the portion of the organizer within the circle marked as "2F" in FIG. 2E, according to some embodiments.
Figure 2G:
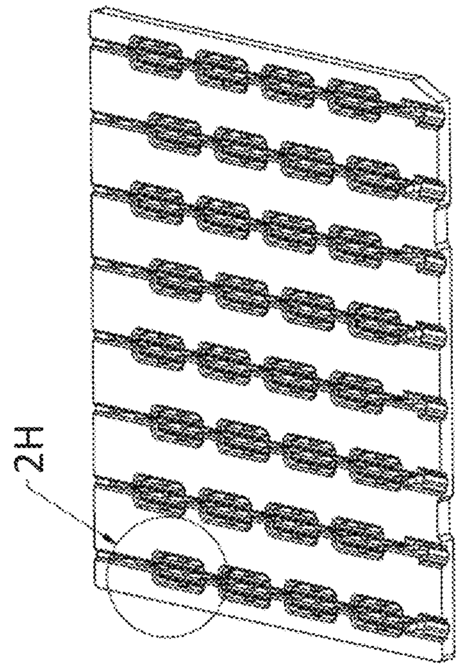
FIG. 2G is a perspective view of the organizer of FIG. 2E, showing a connector attaching face, according to some embodiments.
Figure 2H:
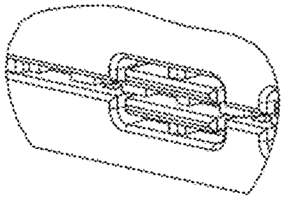
FIG. 2H is an enlarged view of the portion of the organizer within the circle marked as "2H" in FIG. 2G, according to some embodiments.

In the embodiment illustrated in FIG. 1B, the organizer is configured to occupy space between the T-Top assemblies 202 and the surface of the daughtercard 102. To provide such a function, for example, the organizer 210 may have a flat surface for mounting against the daughtercard 102. An opposing surface, facing the T-Top assemblies 202, may have projections of any other suitable profile to match a profile of the T-Top assemblies. In this way, the organizer 210 may contribute to a uniform impedance along signal conductive elements passing through the connector 200 and into the daughtercard 102. According to some embodiments, FIG. 2E and FIG. 2G are perspective views of the organizer 210 of the right angle connector 200, showing a board mounting face and a connector attaching face, respectively. FIG. 2F and FIG. 2H are enlarged views of the portions of the organizer 210 within the circle marked as "2F" in FIG. 2E and the circle marked as "2H" in FIG. 2G, respectively.

The organizer 210 may include a body 262 and islands 264 physically connected to the body 262 by bridges 266. The islands 264 may include slots 268 sized and positioned for signal contact tails to pass therethrough. Slots 270 for interface shielding interconnects 214 to pass therethrough are formed between the body 262 and the islands 264 and separated by the bridges 266. The body 262 may include slots 272 between adjacent islands configured for ground contact tails to pass therethrough.

A front housing 300 may be configured to hold mating regions of the T-Top assemblies. A method of assembling the right angle connector 200 may include inserting the T-Top assemblies 206 into the front housing 300 from the back as illustrated in FIG. 2B. FIGS. 3A-3E depict views of the front housing 300 from various perspectives, according to some embodiments. The front housing 300 may include inner walls 304 configured to separate adjacent T-Top assemblies, and outer walls 306 extending substantially perpendicular to the length of the inner walls and connecting the inner walls. The inner walls 304 may extend between an upper outer wall and a lower outer wall. The outer walls 306 may have alignment features 302 between adjacent inner walls. The alignment features 302 are in pairs and configured to engage matching features of the core members. The T-Top assemblies 206 may be held in the front housing 300 through the alignment features 302, which enables the inner walls and outer walls having substantially similar thickness and simplifies the housing mold, compared to conventional connectors, which include thin inner walls and complex, thin features to hold mating portions of conductive elements.

The front housing may be formed of a dielectric material such as plastic or nylon. Examples of suitable materials include, but are not limited to, liquid crystal polymer (LCP), polyphenylene sulfide (PPS), high temperature nylon or polyphenylenoxide (PPO) or polypropylene (PP). Other suitable materials may be employed, as aspects of the present disclosure are not limited in this regard.

Figure 4B:
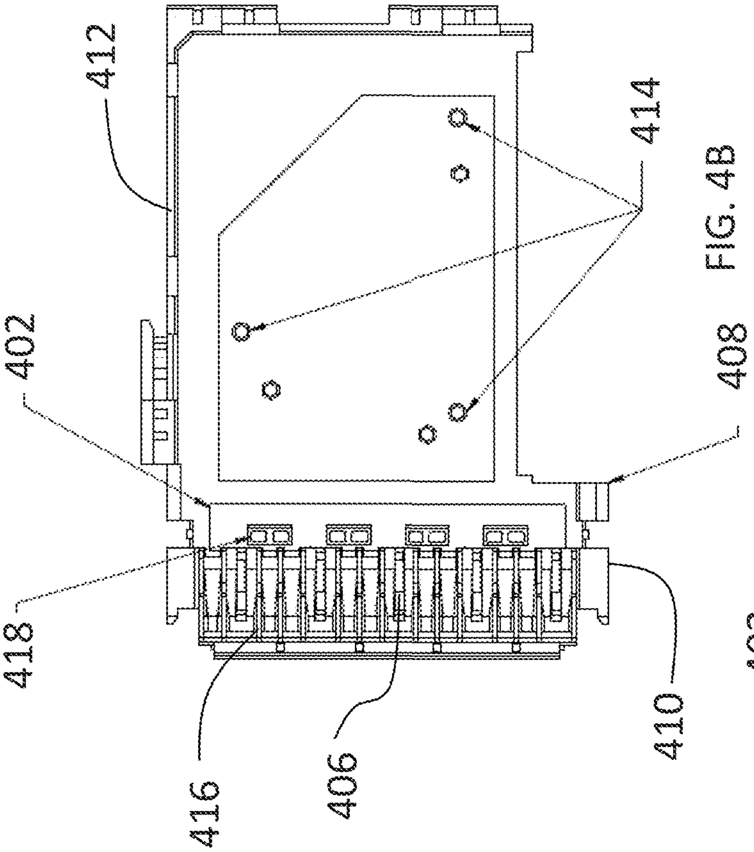
FIG. 4B is a side view of the core member of FIG. 4A, according to some embodiments.
Figure 4C:
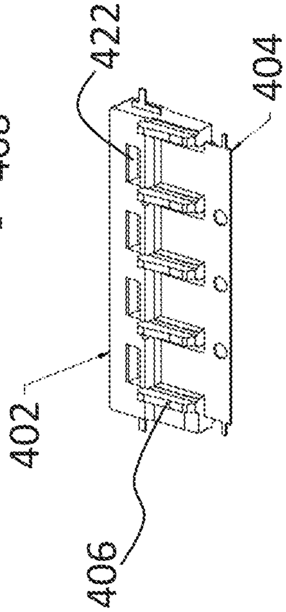
FIG. 4C is a perspective view of the core member of FIG. 4A after a first shot of lossy material and before a second shot of insulative material, according to some embodiments.
Figure 4A:
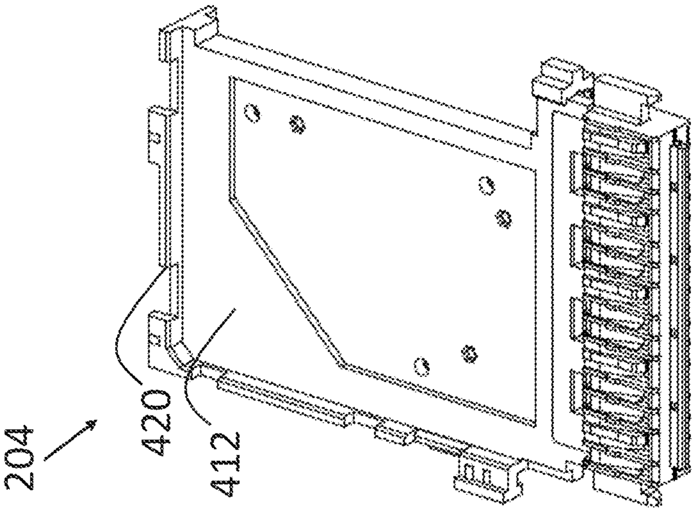
FIG. 4A is a perspective view of a core member, according to some embodiments.

FIGS. 4A-4B depict a core member 204, according to some embodiments. In the illustrated embodiment, core member 204 is made of three components: a metal shield, lossy material and insulative material. FIG. 4C depicts an intermediate state of the core member 204, which is after a first shot of lossy material and before a second shot of insulative material, according to some embodiments.

In some embodiments, the core member 204 may be formed by a two-shot process. In a first shot, lossy material 402 may be selectively molded over a T-Top interface shield 404. The lossy material 402 may form ribs 406 configured to provide connection between the ground conductive elements in the leadframe assemblies attached to the core member by, for example, physically contacting the ground conductive elements as illustrated in FIG. 5E. In conventional connectors without the core members, the housings are made by molding insulative material, without thin features of lossy material such as the ribs 406. The lossy material 402 may include slots 418, by which portions of the interface shield 404 may be exposed. This configuration may enable shields within the leadframe assemblies to be connected to the interface shield 404, such as by beams passing through the slots 418.

In a second shot, insulative material 408 may be selectively molded over the lossy material 402 and T-Top interface shield 404, forming a T-Top region 410 of the core member. The T-Top region 410 may be configured to hold the mating portions of the conductive elements of leadframe assemblies. The insulative material of the T-Top region may provide isolation between signal conductive elements of the leadframe assemblies and also mechanical support for the conductive elements by, for example, forming ribs 416.

In some embodiments, the shot for the lossy material 402 may be completed in multiple shots (e.g., 2 shots) for higher reliability in filling the mold. Similarly, the shot for the insulative material 408 may be completed in multiple shots (e.g., 2 shots).

The components of the T-Top assembly may be configured for simple and low cost molding. In conventional connectors without the core members, the mating interface portion of the connector includes a housing molded with walls between mating contact portions of conductive elements that are intended to be electrically separate. Other fine details, such as a preload shelf might similarly be molded in the housing to support proper operation of the connector when IMLAs are inserted into the housing.

The ease with which such features can reliably be molded depends, at least in part, on the size and shape of the features as well as their location relative to other features in the part to be molded. The shape of a molded part is defined by recesses and projections on the interior surfaces of mold halves that are closed to encircle a cavity in which the molded part is formed. The part is formed by injecting molding material, such as molten plastic, into the cavity. During molding, the molding material is intended to flow throughout the cavity, so as to fill the cavity and create a molded part in the shape of the cavity. Features that are formed in portions of the mold cavity that molding material can reach only after flowing through relatively narrow passages are difficult to reliably fill, as there is a possibility that insufficient molding material will flow into those sections of the mold. That possibility might be avoided by using higher pressure during molding or creating more inlets into the mold cavity into which molding material can be injected. However, such counter measures increase the complexity of the molding process, and may still leave an unacceptable risk of defective parts.

Further, it is desirable in a molding operation for the molded part to be easily released from the mold when the mold halves are opened. Features in a molded part formed by projections or recesses that extend parallel to the direction in which the molded halves move when opened or closed can move, unobstructed by the molded part, when the mold opens.

In contrast, features formed by portions of the mold that project in an orthogonal direction contribute to added complexity, because those projections are inside an opening, or coring, of the molded part at the end of the molding operation. To remove the molded part from the mold, those projecting portions of the mold might be retracted. Molding operations can be performed with retractable projections, but retractable projections increase the cost of a mold. Thus, the cost and/or complexity of molding a connector housing may depend on the direction in which corings extend into the molded part with respect to the direction in which the mold halves move when opened or closed.

The inventors have recognized and appreciated connector designs that simplify the molding operation, reducing cost and manufacturing defects. In the embodiment illustrated, the mating interface is more simply formed using a combination of features in front housing 300 and core members 204, both of which may be shaped so as to avoid portions that are filled in a mold only through relatively long and narrow portions of the mold cavity.

For example, front housing 300 includes relatively large openings 312 housing the mating interface of the connector. Openings 312 are bounded by walls having relatively few features such that portions of the mold in which those walls are formed may be reliably filled in a molding operation. Further, housing 300 has features that can be formed by projections in a mold with halves that move in a direction perpendicular to the top and bottom orientations of FIGS. 3C and 3D. There may be few, if any, corings in locations that require moving parts in the mold.

Some fine features, including features that support reliable operation of the connector, may be formed in core members 204. While those features might increase molding complexity or have a risk of manufacturing defects if formed in a conventional connector housing, those features may be reliably formed in a simple molding operation. For example, the ribs 416, which extend outwards from a relatively large body portion 412 are easier to form than complex and thin sections inside a conventional connector housing.

Nonetheless, the ribs 416 may extend to a length that is sufficient for providing isolation between the mating contact portions of the adjacent conductive elements, but are not filled through relatively long and narrow passages in a mold cavity.

Moreover, these features are on an exterior surface of a part in a mold that opens or closes in a direction perpendicular to the surface of body 412. As can be seen in FIG. 4A, features such as ribs 416 and border 420 extend perpendicularly from the surface of body 412. In this way, the use of moving parts in the mold can be reduced or eliminated.

The insulative material 408 may extend beyond the T-Top region 410 to form a body 412 of the core member. The IMLAs may be attached to the body 412. The body 412 may include retention features 414 configured to secure the leadframe assemblies attached to the core member, such as posts that fit into holes in the IMLAs or holes that receive posts from the IMLAs.

The T-Top interface shield 404 may be made of metal or any other material that is fully or partially conductive and provides suitable mechanical properties for shields in an electrical connector. Phosphor-bronze, beryllium copper and other copper alloys are non-limiting examples of materials that may be used. The interface shields may be formed from such materials in any suitable way, including by stamping and/or forming.

In the embodiment illustrated, the shield 404 is molded over with lossy material and a second shot of insulative material is then over molded on that structure to form both the insulative portions of T-Top region 410 and body 412. When IMLAs are attached to core member 204, shield 404 is positioned adjacent the mating contact portions of the conductive elements of the IMLAs. For a dual IMLA assembly 202C, shield 404 is positioned between, and therefore adjacent, the mating contact portions of the signal conductors of both IMLAs attached to the core. Positioning shield 404 adjacent the mating contact portions and parallel to the column of mating contact portions may reduce degradation in signal integrity at the mating interface of the connector, such as by reducing cross talk from one column to the next and/or changes of impedance along the length of signal conductors at the mating interface. Lossy material electrically coupled to shield 404 may also reduce degradation of signal integrity.

Any suitable lossy material may be used for the lossy material 402 of the T-Top region 410 and other structures that are "lossy." Materials that conduct, but with some loss, or material which by another physical mechanism absorbs electromagnetic energy over the frequency range of interest are referred to herein generally as "lossy" materials. Electrically lossy materials can be formed from lossy dielectric and/or poorly conductive and/or lossy magnetic materials. Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Practical lossy magnetic materials or mixtures containing lossy magnetic materials may also exhibit useful amounts of dielectric loss or conductive loss effects over portions of the frequency range of interest. Electrically lossy material can be formed from material traditionally regarded as dielectric materials, such as those that have an electric loss tangent greater than approximately 0.05 in the frequency range of interest. The "electric loss tangent" is the ratio of the imaginary part to the real part of the complex electrical permittivity of the material. Electrically lossy materials can also be formed from materials that are generally thought of as conductors, but are either relatively poor conductors over the frequency range of interest, contain conductive particles or regions that are sufficiently dispersed that they do not provide high conductivity or otherwise are prepared with properties that lead to a relatively weak bulk conductivity compared to a good conductor such as copper over the frequency range of interest.

Electrically lossy materials typically have a bulk conductivity of about 1 Siemen/meter to about 10,000 Siemens/meter and preferably about 1 Siemen/meter to about 5,000 Siemens/meter. In some embodiments, material with a bulk conductivity of between about 10 Siemens/meter and about 200 Siemens/meter may be used. As a specific example, material with a conductivity of about 50 Siemens/meter may be used. However, it should be appreciated that the conductivity of the material may be selected empirically or through electrical simulation using known simulation tools to determine a suitable conductivity that provides a suitably low cross talk with a suitably low signal path attenuation or insertion loss.

Electrically lossy materials may be partially conductive materials, such as those that have a surface resistivity between 1 Ω/square and 100,000 Ω/square. In some embodiments, the electrically lossy material has a surface resistivity between 10 Ω/square and 1000 Ω/square. As a specific example, the material may have a surface resistivity of between about 20 Ω/square and 80 Ω/square.

In some embodiments, electrically lossy material is formed by adding to a binder a filler that contains conductive particles. In such an embodiment, a lossy member may be formed by molding or otherwise shaping the binder with filler into a desired form. Examples of conductive particles that may be used as a filler to form an electrically lossy material include carbon or graphite formed as fibers, flakes, nanoparticles, or other types of particles. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake. The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

Also, while the above described binder materials may be used to create an electrically lossy material by forming a binder around conducting particle fillers, the invention is not so limited. For example, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Preferably, the fillers will be present in a sufficient volume percentage to allow conducting paths to be created from particle to particle. For example, when metal fiber is used, the fiber may be present in about 3% to 40% by volume. The amount of filler may impact the conducting properties of the material.

Filled materials may be purchased commercially, such as materials sold under the trade name Celestran® by Celanese Corporation which can be filled with carbon fibers or stainless steel filaments. A lossy material, such as lossy conductive carbon filled adhesive preform, such as those sold by Techfilm of Billerica, Massachusetts, US may also be used. This preform can include an epoxy binder filled with carbon fibers and/or other carbon particles. The binder surrounds carbon particles, which act as a reinforcement for the preform. Such a preform may be inserted in a connector wafer to form all or part of the housing. In some embodiments, the preform may adhere through the adhesive in the preform, which may be cured in a heat treating process. In some embodiments, the adhesive may take the form of a separate conductive or non-conductive adhesive layer. In some embodiments, the adhesive in the preform alternatively or additionally may be used to secure one or more conductive elements, such as foil strips, to the lossy material.

Various forms of reinforcing fiber, in woven or non-woven form, coated or non-coated may be used. Non-woven carbon fiber is one suitable material. Other suitable materials, such as custom blends as sold by RTP Company, can be employed, as the present invention is not limited in this respect.

In some embodiments, a lossy portion may be manufactured by stamping a preform or sheet of lossy material. For example, a lossy portion may be formed by stamping a preform as described above with an appropriate pattern of openings. However, other materials may be used instead of or in addition to such a preform. A sheet of ferromagnetic material, for example, may be used.

However, lossy portions also may be formed in other ways. In some embodiments, a lossy portion may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together. As a further alternative, lossy portions may be formed by plating plastic or other insulative material with a lossy coating, such as a diffuse metal coating.

Figure 4E:
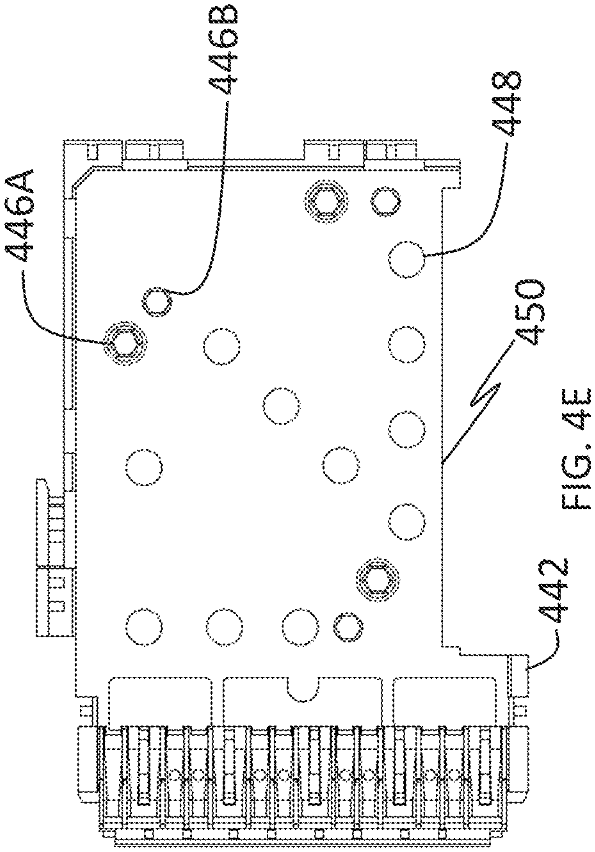
FIG. 4E is a side view of the core member of FIG. 4D, according to some embodiments.
Figure 4F:
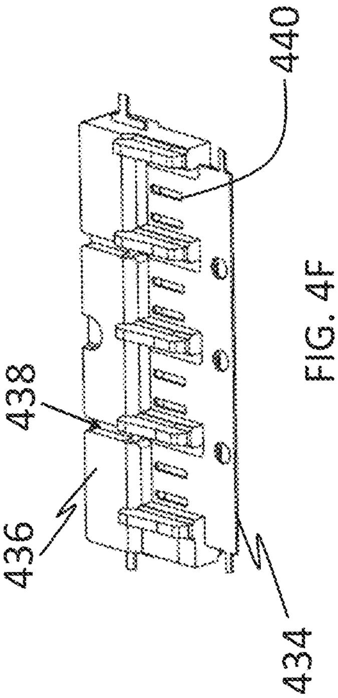
FIG. 4F is a perspective view of the core member of FIG. 4D after a first shot of lossy material and before a second shot of insulative material, according to some embodiments.
Figure 4D:
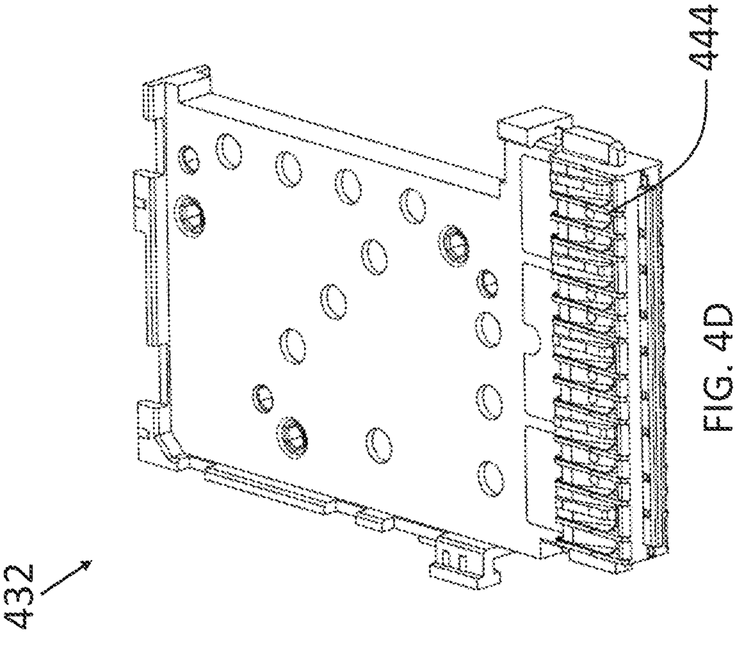
FIG. 4D is a perspective view of a core member, according to some embodiments.

FIGS. 4D-4F depict another embodiment of a core member. FIG. 4D is a perspective view of a core member 432. FIG. 4E is a side view of the core member 432. FIG. 4F is a perspective view of the core member 432 after a first shot of lossy material and before a second shot of insulative material. The core member 432 may include a T-Top interface shield 434 having through holes 440, lossy material 436 selectively molded over the T-Top interface shield 434, and insulative material 442 molded over exposed portions of the T-Top interface shield 434 and forming a body 450. Portions of the lossy material 436 may be separated by gaps 438, from which the T-Top interface shield 434 may be exposed. The insulative material 442 may be molded over areas of the T-Top interface shield 434 that are exposed, fill the through holes 440 and form ribs 444. The insulative material 442 may fill the gaps 438 between the portions of the lossy material 436 so as to provide mechanical strength between the body 450 of the core member and the T-Top interface shield 434. As the body 412 illustrated in FIG. 4B, the body 450 may include retention features 446A for a Type-A IMLA and retention features 446B for a Type-B IMLA. Additionally, the body 450 may include openings 448, which may be sized and positioned according to openings 452 of shields 502 (See, e.g., FIG. 5N). The openings 448 may enable electrical connections between the shields 502 of the Type-A and Type-B IMLAs attached to the core member 432. Fully or partially electrically conductive members may pass through the openings to make such connections. For example, the openings may be filled with lossy material. As another example, conductive fingers from the shields 502 may pass through the openings. Such configuration may reduce crosstalk, for example, between IMLAs.

FIGS. 5A-5D depict a dual IMLA assembly 202C, according to some embodiments. The dual IMLA assembly 202C may include a core member 204. A type-A IMLA 206A may be attached to one side of the core member 204. A Type-B IMLA 206B may be attached to the other side of the core member 204. Each IMLA may include a column of conductive elements shaped and positioned for signal and ground, respectively. In the illustrated example, ground conductive elements are wider than signal conductive elements. The mating contact portions of the ground conductive elements may include openings 530 shaped and positioned to provide a mating force approximating that of the mating contact portions of the signal conductive elements. The ribs 406 of the lossy material 402 of the core member 204 may be positioned such that, when the IMLA is attached to the core member, the ground conductive elements of the IMLA are electrically coupled to the lossy material 402 through ribs 406. In some operating states, the ground conductive elements may press against the ribs 406 and/or may be close enough to capacitively couple to them.

The T-Top interface shield 404 of the core member 204 may include an extension 510. The extension 510 may extend beyond the mating face 536 of the IMLA such that the extension 510 of the interface shield 404 may extend into a mating connector. Such a configuration may enable the interface shield 404 to overlap internal shields of a mating connector as illustrated in an exemplary embodiment of FIGS. 11A-11B. The extension 510 of the interface shield 404 may be molded over with the insulative material 408 by a thickness t1, which may be smaller than a thickness t2 of the insulative material over molding the body of the T-Top region 410. In some embodiments, the thickness t1 may be less than 20% of the thickness t2, or less than 15%, or less than 10%.

In addition to extending a ground reference provided by shield 404 through the mating interface, a relatively thin extension 510 may contribute to mechanical robustness of the interconnection system. This configuration allows inserting the extension 510 of the interface shield into a matching slot in a housing of a mating connector, which may be formed with only a small impact on the mechanical structure of the housing of the mating connector. In the illustrated embodiment, the mating connectors have similar mating interfaces. Accordingly, front housing 300 of connector 200 (FIG. 3A), illustrates certain features that are also present in a mating connector, e.g., the header connector 700. One such feature is slots 310 configured to receive the extensions 510 at the distal ends of the T-Top regions.

If the core member 204 did not have this extension 510, but a substantially uniform thickness in a shape of, for example, a rectangle at the distal end, a receiving housing wall of the mating connector would be reduced to accommodate the extension 510, which would reduce the robustness of the mechanical structure of the connector housing.

FIG. 5E depicts a front view of the dual IMLA assembly 202C, partially cut away, according to some embodiments. As can be seen in the cutaway section, ribs 406 of lossy material 402 extend towards certain ones of the mating contact portions in each column. Those mating contact portions may be of the ground conductive elements. Here, the lossy material 402 is shown to occupy a continuous volume, but in other embodiments, the lossy material may be in discontinuous regions. For example, the lossy material 402 on one side of the shield 404 may be physically disconnected from the lossy material 402 on the other side of the shield.

Figure 5D:
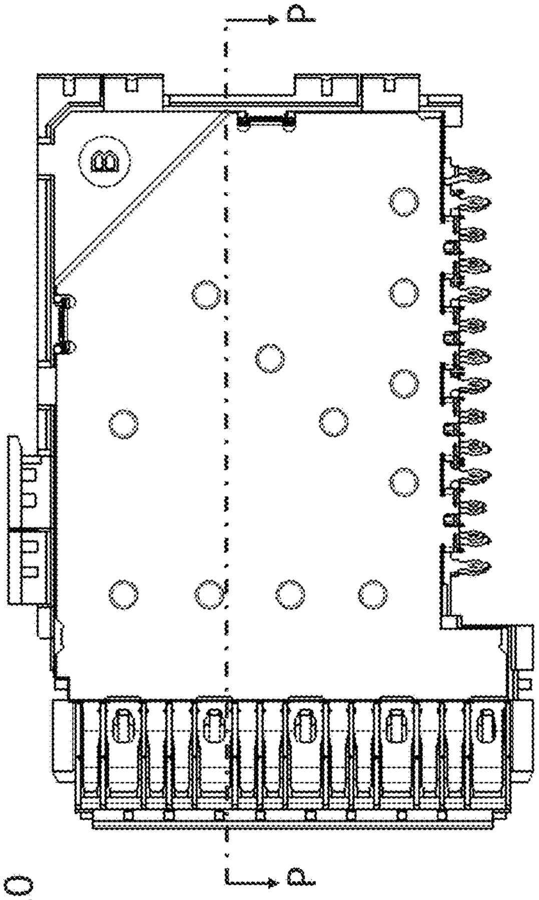
FIG. 5D is a second side view of the dual IMLA assembly of FIG. 5A, illustrating a Type-B IMLA attached to the second side, according to some embodiments.
Figure 5C:
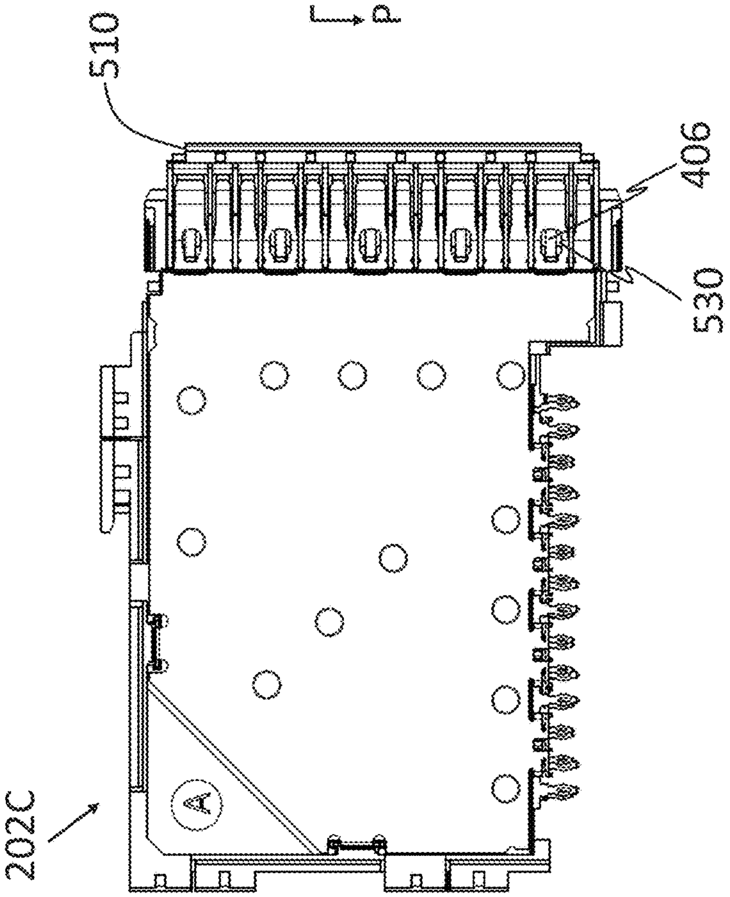
FIG. 5C is a first side view of the dual IMLA assembly of FIG. 5A, illustrating a Type-A IMLA attached to the first side, according to some embodiments.
Figure 5F:
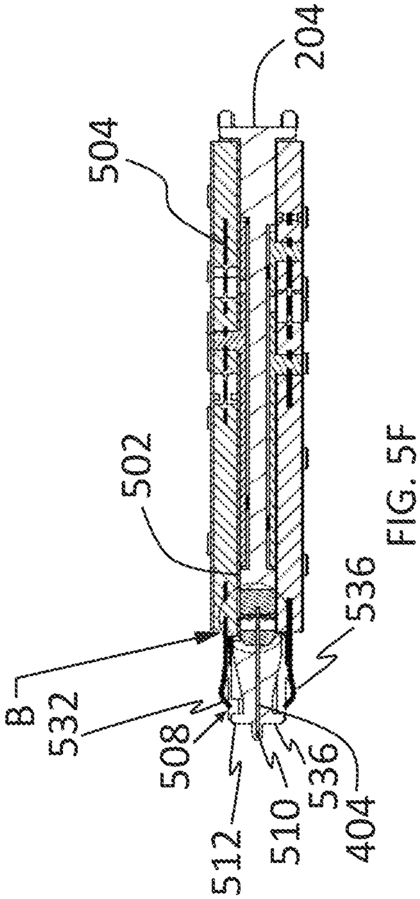
FIG. 5F is a cross-sectional view along line P-P in FIG. 5D, illustrating a shield of the Type-A IMLA coupled to a shield of the Type-B IMLA through the core member of FIG. 4A, according to some embodiments.

FIG. 5F depicts a cross-sectional view along line P-P in FIG. 5D, illustrating the Type A IMLA coupled to the Type-B IMLA through the core member 204 (FIG. 4A), according to some embodiments. FIG. 5F reveals that, in the illustrated embodiment, each IMLA has a shield 502 parallel to the intermediate portions of the conductive elements serving as signal conductors or ground conductors through the IMLA. Shield 404 is parallel to the mating contact portions of the conductive elements. Shields 404 and 502 may be electrically connected.

Figure 5G:
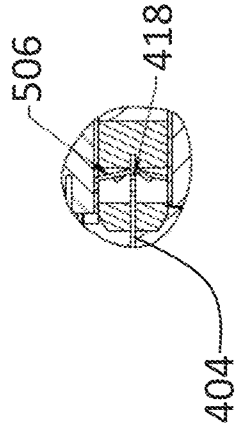
FIG. 5G is an enlarged view of the portion of the dual IMLA assembly within the circle marked as "B" in FIG. 5F, according to some embodiments.
Figure 5E:
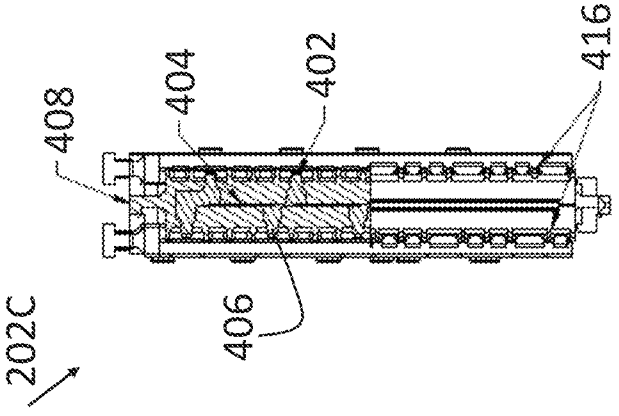
FIG. 5E is a front view of the dual IMLA assembly of FIG. 5A, partially cut away, according to some embodiments.

FIG. 5G shows features for connecting shields 404 and 502 in an enlarged view of the circle marked as "B" in FIG. 5F, according to some embodiments. This region encompasses openings 422 (see also, FIG. 4C) in the lossy portion of the core member 204, through which portions of the shields 404 are exposed. The exposed portions of the shields 404 include features to connect to shields 502. Here, those features are slots 418. Shields 502 may be stamped from a sheet of metal and may be stamped with structures, such beams 506, which may be inserted into slots 418 when the IMLA is pressed onto core member 204 so as to electrically connect shields 404 and 502.

Figure 5H:
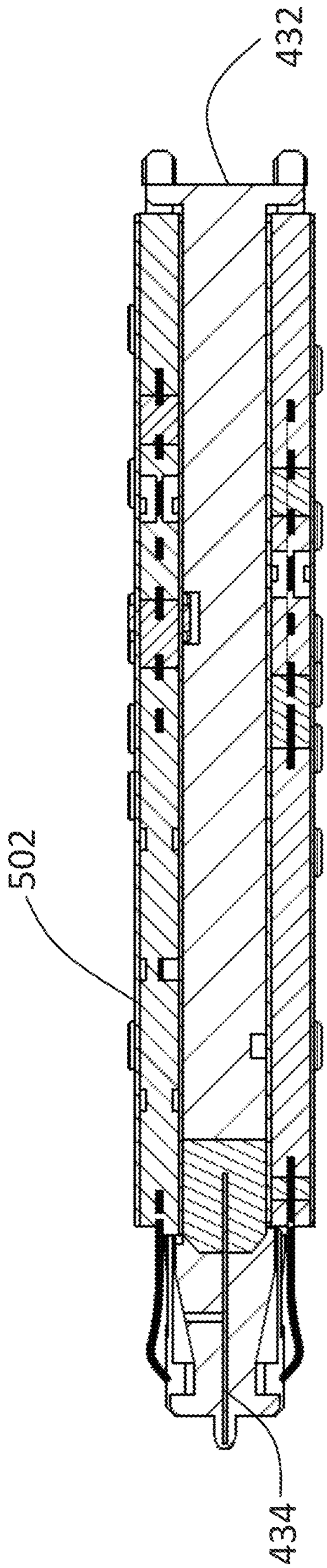
FIG. 5H is a cross-sectional view along line P-P in FIG. 5D, illustrating a shield of the Type-A IMLA coupled to a shield of the Type-B IMLA through the core member of FIG. 4D, according to some embodiments.

FIG. 5H depicts a cross-sectional view along ling P-P in FIG. 5D, illustrating the Type A IMLA coupled to the Type-B IMLA through the core member 432 (FIG. 4D), according to some embodiments. As illustrated, in some embodiments, the T-Top may be configured without T-Top shield slots 418. Omitting the slots 418 may enable a connector to have a smaller pitch, such as less than 3 mm, and may be approximately 2 mm, for example.

In some embodiments, the features for connecting the shields may also be simply formed. For example, openings 422 are extend in a direction perpendicular to the surface of body portion 412 and may be molded without moving portions of the mold. Also, a preload feature 512 is shown, also extending in a direction perpendicular to the surface of body portion 412.

Likewise, core member 204 may be molded with an opening 508. The opening 508 may be configured to receive the beam tips of conductive elements when an IMLA is mounted to the core member 204. The opening 508 enables the beam tips to flex upon mating with a mating connector.

In some embodiments, the core member 204 may include pre-load features 512 configured to preload conductive elements of a mating connector. The pre-load features may be positioned beyond the distal end of a tip 532 of a conductive element of the IMLA. In this configuration, the pre-load feature may touch a conductive element of a mating connector before the conductive element reaching the tip 532. For example, upon mating, a first connector including the IMLA assembly of FIG. 5F with a second connector having a similar mating interface, the pre-load features 512 of the first connector may engage tips 532 of the second connector and press them into opening 508. Thus, the tips 532 of the second connector are pressed out of the path of the first connector, which reduces the chance of stubbing. When the mating interfaces of the first and second connector are similar, the tips 532 of the first connector are pressed out of the path of the second connector by pre-load features 512 of the second connector.

The pre-load features illustrated in FIG. 5F differ from a pre-load shelf in conventional connectors in which the beam tips of the conductive element are restrained, in a partially deflected state, by pre-load features of the same connector. Such a design, for example, may involve a pre-load shelf on which a portion of the beam tip rests. In that configuration a portion of the tip extends far enough onto the pre-load shelf to be reliably held in place.

Such a configuration entails a segment of the conductive element between the convex contract point for each conductive element and the distal-most tip of the conductive element. That segment of the conductive element is out of the desired signal path and can constitute an un-terminated stub, which may undesirably impact the integrity of signals propagating along the conductive elements. The frequency of that impact may be inversely related to the length of the stub such that shortening the stub enables high frequency connector operation. Unterminated stubs on ground conducive elements may similarly impact signal integrity.

In the illustrated embodiment, however, the tip of the conductive elements is unrestrained. The segment between the convex contract point 536 and the distal end of tip 532 does not have to be sufficiently long to engage a pre-load shelf. This design enables reducing the length of the tips of conductive elements, without increasing the risk of stubbing upon mating. In some embodiments, the distance between the convex contact location and the tip of the conductive elements may be in the range of 0.02 mm and 2 mm and any suitable value in between, or in the range of 0.1 mm and 1 mm and any suitable value in between, or less than 0.3 mm, or less than 0.2 mm, or less than 0.1 mm. A method of operating connectors with such pre-load features to mate with each other is described with respect to FIGS. 11A-11F.

Forming these features as part of the core members enables miniaturization of the connector, as these features will have dimensions that are proportional to the dimensions of the conductive elements and the spacing between them. However, as these features are formed in the core member, rather than as a thin, complex geometry if integrally formed with the front housing 300, they may be more reliably formed. These features may be used in a high speed, high density connector in which signal conductive elements are spaced (center-to-center) from each other by less than 2 mm, or less than 1 mm, or less than 0.75 mm in some embodiments, such as in the range of 0.5 mm to 1.0 mm, or any suitable value in between. Pairs of signal conductive elements may be spaced (center-to-center) from each other by less than 6 mm, or less than 3 mm, or less than 1.5 mm in some embodiments, such as in the range of 1.5 mm to 3.0 mm, or any suitable value in between.

In some embodiments, a leadframe assembly may include IMLA shield 502, extending in parallel to a column of conductive elements 504. The IMLA shield 502 may include a beam 506 extending in a direction substantially perpendicular to the plane along which the IMLA shield extends. The beam 506 may be inserted in an opening 422 and contact a portion of the T-Top interface shield 404, such as by being inserted into a shield slot 418. In the illustrated example, the IMLA shield 502 of the Type-A IMLA is electrically coupled to an IMLA shield of the Type-B IMLA through the lossy material 402 and the interface shield 404 of the core member 204.

Figure 5I:
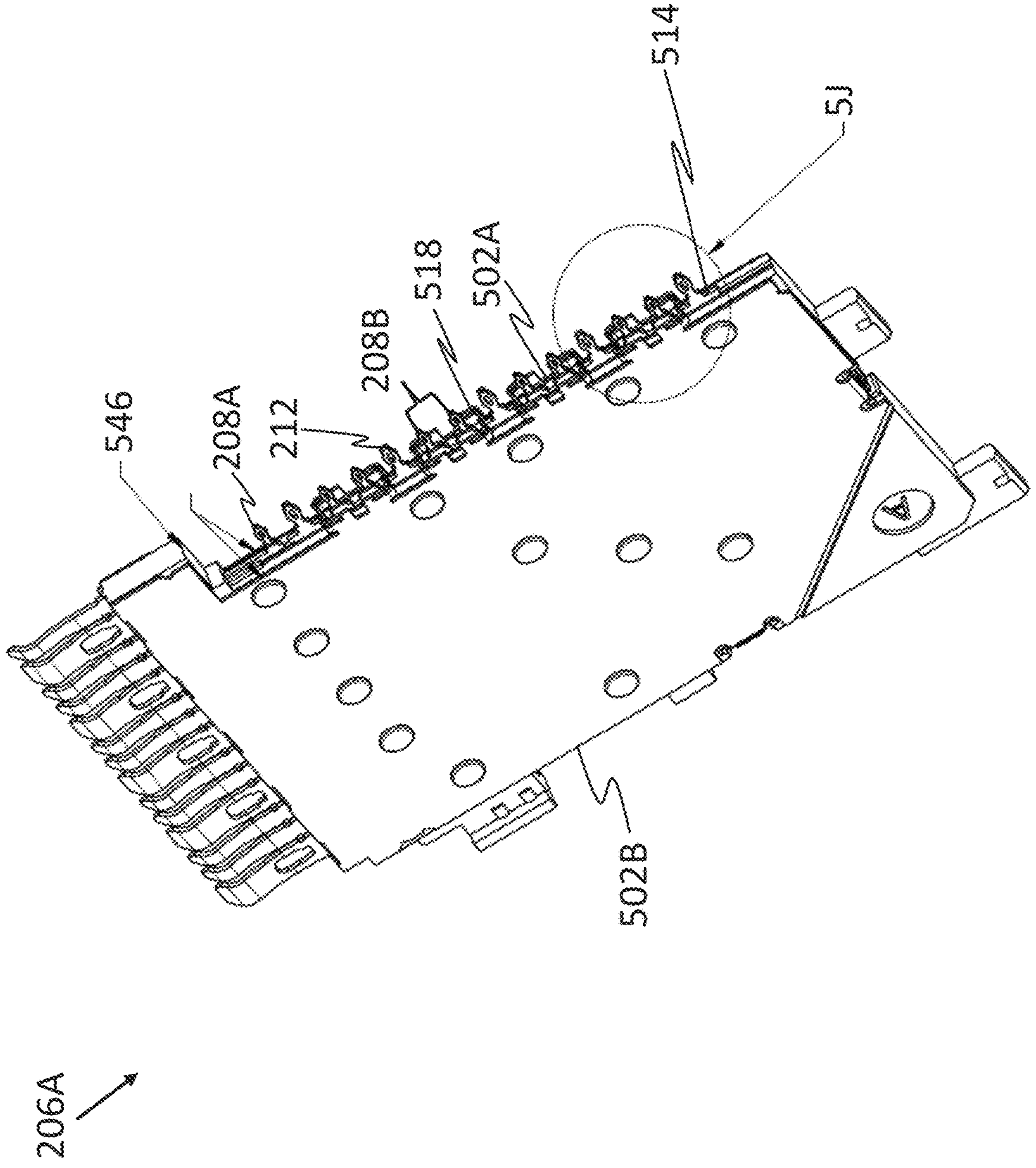
FIG. 5I is a perspective view of the Type-A IMLA of FIG. 5C, according to some embodiments.

FIG. 5I is a perspective view of the Type-A IMLA 206A, according to some embodiments. In the illustrated example, the Type-A IMLA 206A includes a leadframe 514 sandwiched between ground plates 502A and 502B. The leadframe 514 may be selectively overmolded with dielectric material 546 before the ground plates 502A and 502B are attached. FIG. 5N is an exploded view of the Type-A IMLA 206A, with dielectric material 546 removed, according to some embodiments. FIG. 5O is a partial cross-sectional view of the Type-A IMLA 206A of FIG. 5N, according to some embodiments. FIG. 5P is a plan view of the Type-A IMLA 206A, with ground plates 502A and 502B removed and showing the dielectric material 546, according to some embodiments.

The leadframe 514 may include a column of signal conductive elements. The signal conductive elements may include single-ended signal conductive element 208A and differential signal pairs 208B, which may be separated by ground conductive elements 212. In some embodiments, the conductive element 208A may be used for purposes other than passing differential signals, including passing, for example, low speed or low frequency signal, power, ground, or any suitable signals.

Shielding substantially surrounding the differential signal pairs 208B may be formed by the ground conductive elements together with the ground plates 502A, 502B. As illustrated, the ground conductive elements 212 may be wider than the signal conductive elements 208A, 208B. The ground conductive elements 212 may include openings 212H. In some embodiments, the leadframe 514 may be selectively molded with insulative material, which may substantially over mold intermediate portions of the signal conductive elements. The ground plates 502A, 502B may be attached to the over molded leadframe 514.

In some embodiments, the leadframe assembly may include lossy material that contacts and electrically connects the ground plates and the ground conductors. In some embodiments, lossy material may extend through openings 212H in the ground conductors and/or through openings 452 of ground plates 502A and 502B to make electrical contact. In some embodiments, this configuration may be achieved by molding a second shot of lossy material after the ground plates are attached. For example, lossy material may fill at least portions of the openings 212H through the openings 452 of the ground plates 502A, 502B so as to electrically connect the ground conductive elements 212 with the ground plates 502A, 502B and seal the gap between them caused by the insulative leadframe overmold. The openings 212H of the ground conductive elements 212 and the openings 452 of the ground plates 502A, 502B may be shaped to increase tolerance for filling the lossy material. For example, as illustrated in FIG. 5N, the openings 212H of the ground conductive elements 212 may have an elongated shape compared to the openings 452 that are substantially circles. Alternatively or additionally, the lossy material may be molded over the leadframe assembly, with hubs at the surface. Ground plates 502A, 502B may be attached by pressing the hubs through openings 452.

Figure 11B:
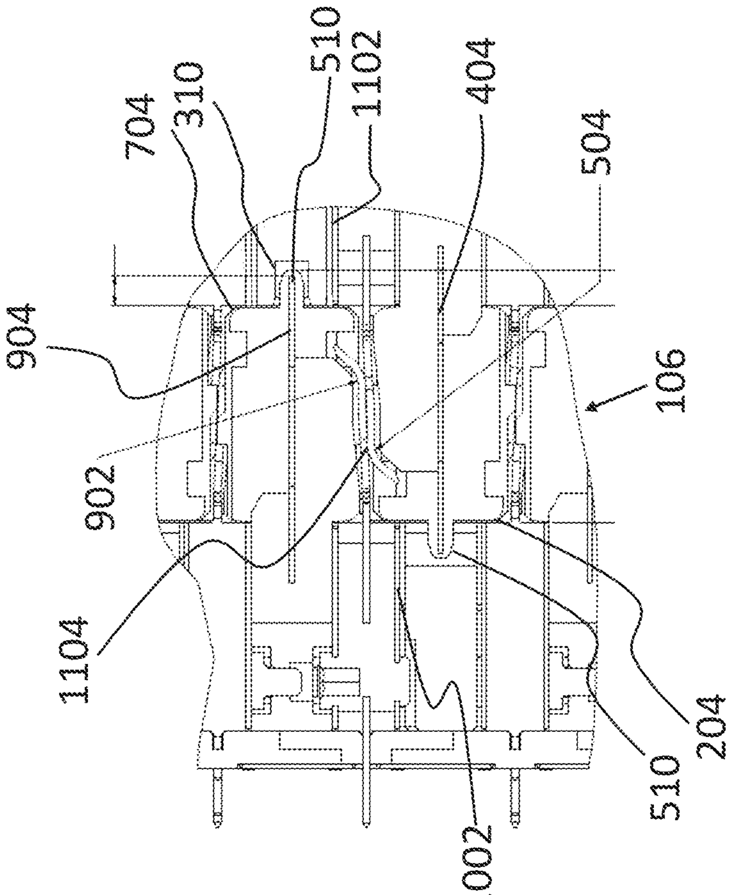
FIG. 11B is an enlarged view of the portions of the mating interface within the circle marked as "Y" in FIG. 11A, according to some embodiments.

The ground plates 502A and 502B may provide shielding for intermediate portions of the conductive elements on two sides. The ground plate 502A may be configured to face to the core member 204, for example, including features to attach to the core member 204. The ground plate 502B may be configured to face away from the core member 204. The shielding provided by the ground plates 502A and 502B may connect to shielding provided by interface shielding interconnects 214 and mating interface shielding provided by the T-Top that the leadframe is attached to and another T-Top of a mating connector, for example, as illustrated in FIG. 11B. Such configuration enables high frequency performance by shielding throughout two mated connectors.

The ground plates and/or the dielectric portions may include openings configured to receive retention features of the core member (e.g., retention features 414). It should be appreciated that, though the Type-B IMLA 206B has a different configuration of signal and ground conductors than in a Type-A IMLA, it may similarly be configured with ground plates and retention features similar to the Type-A IMLA 206A.

Each type of IMLA may include structures that connect the ground plates to ground structures on a printed circuit board to which a connector, formed with those IMLAs, is mounted. For example, the Type-A IMLA 206A may include compressible members 518, which may form portions of the mounting interface shielding interconnect 214 (FIG. 2C). In some embodiments, the compressible members 518 may be formed integrally with the ground plates 502A and 502B. For example, the compressible members 518 may be formed by stamping and bending a metal sheet that forms a ground plate. The integrally formed shielding interconnect simplifies the manufacturing process and reduces manufacturing cost.

In some embodiments, the shielding interconnect 214 may be formed to support a small connector footprint. The shielding interconnect, for example, may be designed to deform when pressed against a surface of a printed circuit board, so as to generate a relatively small counterforce. The counterforce may be sufficiently small that press fit contact tails, as illustrated in FIG. 5I, may adequately retain the connector against that counterforce. Such a configuration reduces connector footprint because it avoids the need for retaining features such as screws.

Figure 5J:
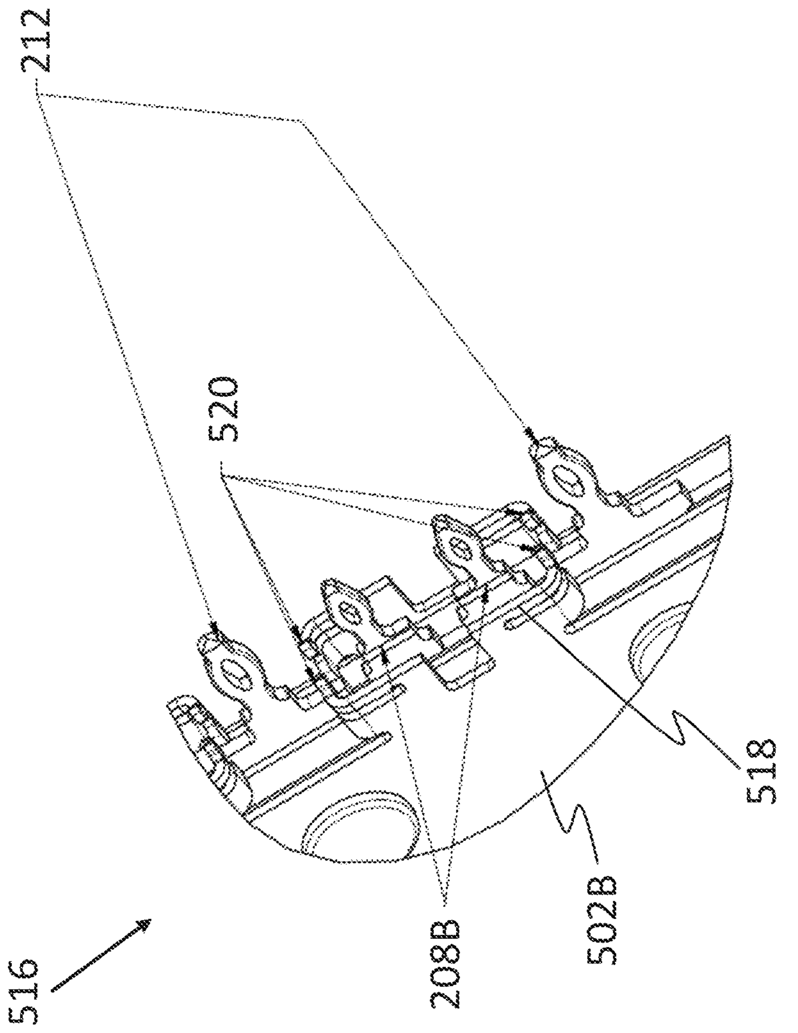
FIG. 5J is an enlarged view of the portion of the mounting interface of the Type-A IMLA within the circle marked as "5J" in FIG. 5I, according to some embodiments.
Figure 5K:
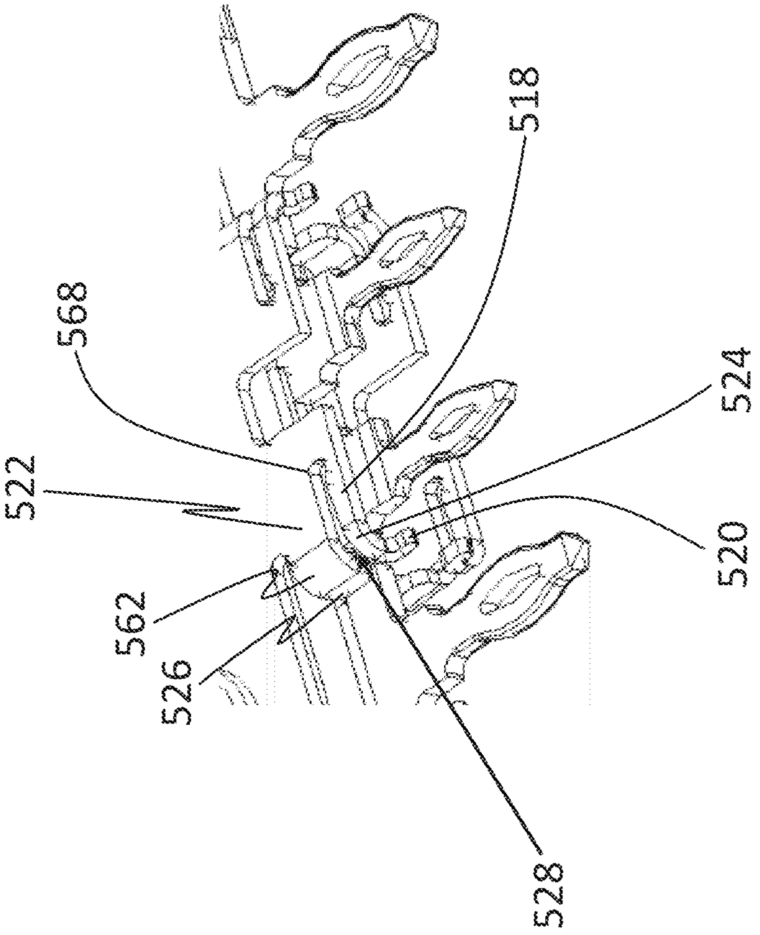
FIG. 5K is a perspective view of the portion of the Type-A IMLA in FIG. 5J, according to some embodiments.
Figure 5M:
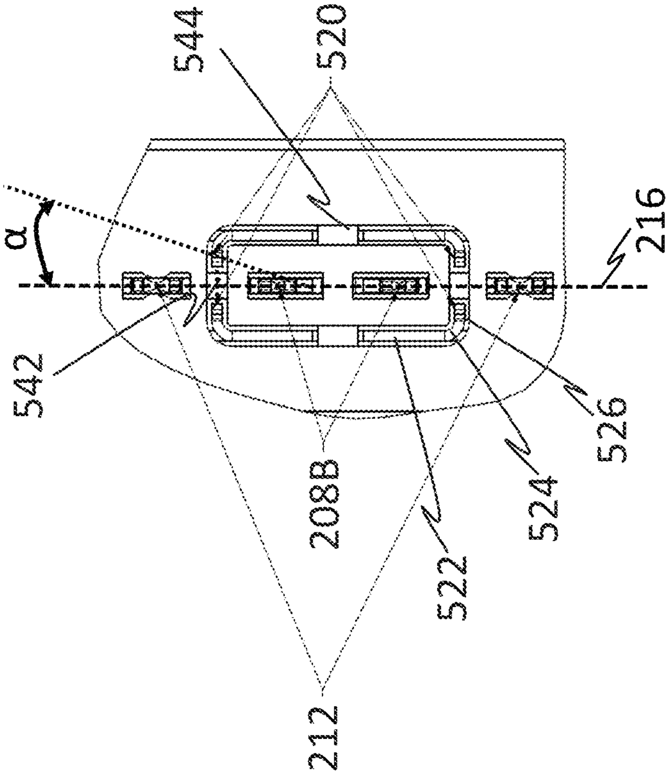
FIG. 5M is a plan view of the portion of the Type-A IMLA in FIG. 5L, according to some embodiments.
Figure 5L:
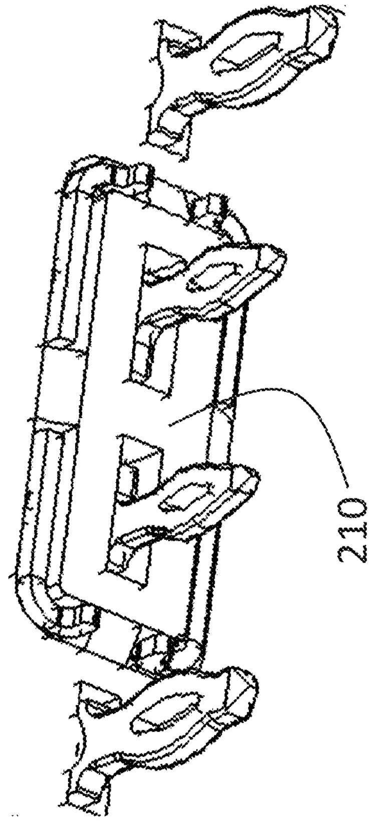
FIG. 5L is a perspective view of the portion of the Type-A IMLA in FIG. 5J with an organizer attached, according to some embodiments.
Figure 5N:
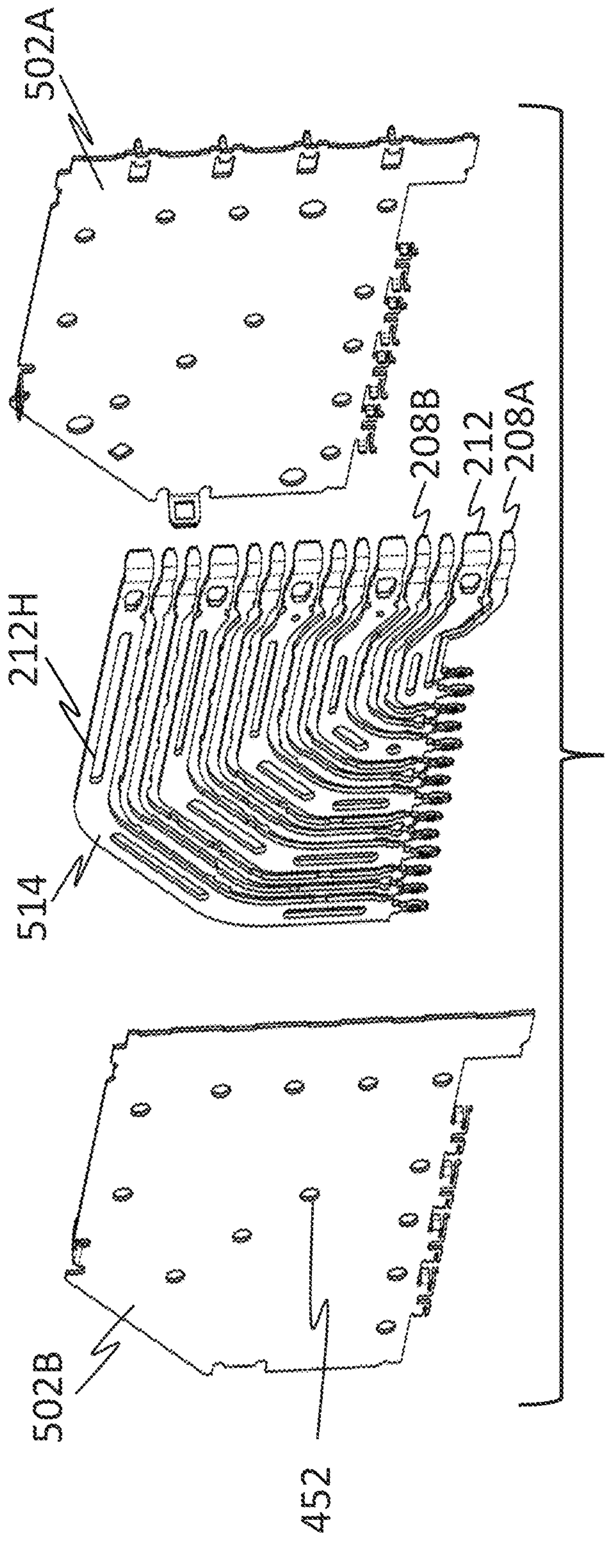
FIG. 5N is an exploded view of the Type-A IMLA of FIG. 5I, with dielectric material removed, according to some embodiments.
Figure 5O:
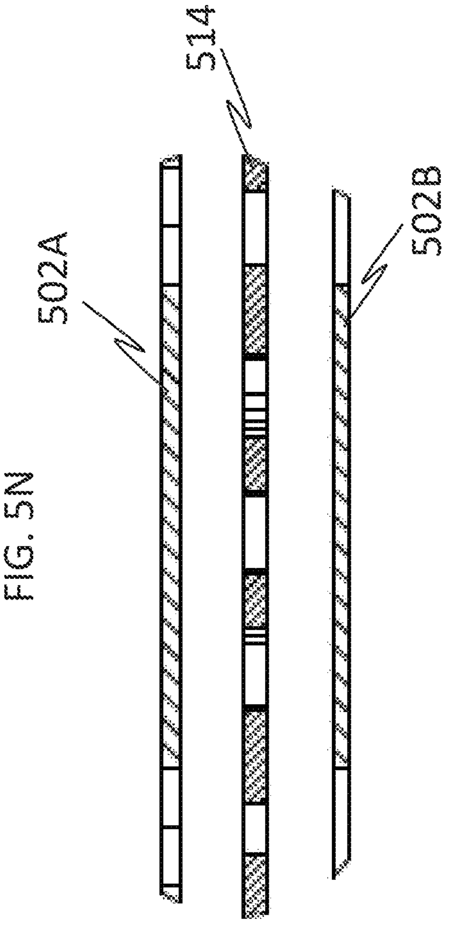
FIG. 5O is a partial cross-sectional view of the Type-A IMLA of FIG. 5N, according to some embodiments.
Figure 5P:
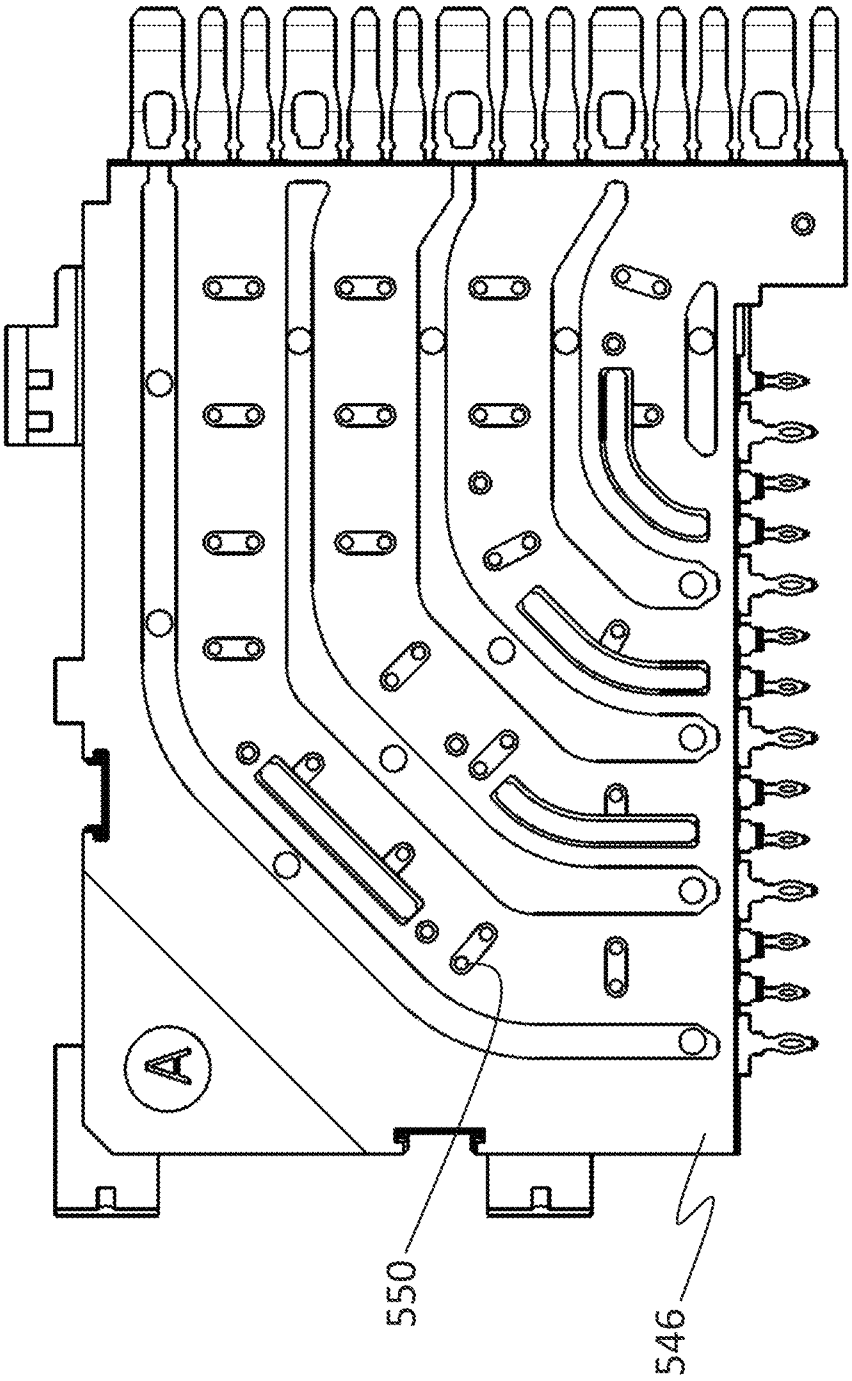
FIG. 5P is a plan view of the Type-A IMLA of FIG. 5I, with ground plates removed, according to some embodiments.

Enlarged views of a shielding interconnect 214 implemented with compressible members 518 are illustrated in FIGS. 5J-5M. FIG. 5J and FIG. 5K depict enlarged perspective views of a portion 516 of the Type-A IMLA 206A within the circle marked as "5J" in FIG. 5I, according to some embodiments. FIG. 5L and FIG. 5M depict a perspective view and a plan view, respectively, of the portion 516 of the Type-A IMLA 206A with the organizer 210 attached, according to some embodiments. The portion 516 of the Type-A IMLA 206A with the organizer 210 attached is also illustrated in FIG. 2C within the circle marked as "5L." FIGS. 5K and 5L show views taken through the neck of a press fit contact tail. The distal, compliant portion of the contact tail, shown as an eye-of-the-needle segment in FIG. 5J, may be present. Though, the contact tails may be in configurations other than eye-of-the-needle press-fits.

The shielding interconnect 214 may fill a space between the connector and the board, and provide current paths between the board's ground plane and the connector's internal ground structures such as the ground plates. In some embodiments, a pair of differential signal conductive elements (e.g., 208B) may be partially surrounded by shielding interconnects 214 extending from ground plates that sandwich the leadframe having the pair. The contact tails of the pair may be separated from the shielding interconnect 214 by dielectric material of the organizer 210.

In some embodiments, a shielding interconnect 214 may include a body 562 extending from an edge of an IMLA shield. One or more gaps 528 may be cut in body 562, creating a cantilevered compressible member 518. A distal portion of the compressible member 518 may be shaped with a tine 520. When the connector is pushed onto a board, the tines 520 may make physical contact with the board, causing deflection of compressible member 518. Compressible member 518 is cantilevered and could, in some embodiments, act as a compliant beam. In the embodiment illustrated, however, deflection of compressible member 518 generates a relatively low spring force. In this embodiment, gap 528 includes an enlarged opening 568 at the base of compressible member 518 configured to weaken the spring forces by making the compressible members 518 easier to deflect and/or deform. A low spring force may prevent the tines from springing back when contacting a board such that the connector would not be pushed off the board. The resulting spring force, per tine, may be in the range of 0.1 N to ION, or any suitable value in between, in some embodiments. The compressible members may or may not make physical contact with a board. In some embodiments, the compressible members may be adjacent the board, which may provide sufficient coupling to suppress the emissions at the mounting interface.

In some embodiments, a body 562 and compressible member 518 may include an in-column portion 522 extending from a ground plate (e.g., 502A or 502B), a distal portion 526 substantially perpendicular to the in-column portion 522, and a transition portion 524 between the in-column portion 522 and the distal portion 526. Such a configuration enables the shielding interconnects 214 extending from two adjacent shields to cooperate to surround, at least in part, contact tails of a pair of signal conductive elements. For example, four shielding interconnects 214 may surround a pair, as shown, two extending from each IMLA shield on each side of the signal conductive elements, one on each side of the pair.

In the illustrated example in FIG. 5L, there are gaps between the shielding interconnects. For examples, there are gaps 542 between the distal portion 526 of shielding interconnects 214 on opposite sides of a pair of signal conductors. There are also gaps 544 between the in-column portion 522 of shielding interconnects 214 on the same sides of a pair of signal conductors. Bridges 266 of the organizer 210 may at least partially occupy the gaps 542 and 544. Nonetheless, the illustrated configuration may be effective at reducing resonances in the ground structures of the connector over a desired operating range of the connector, such as up to 112 Gbps or higher using PAM4 modulation.

In some embodiments, tines 520 on compressible member 518 may be selectively positioned so as to more effectively suppress resonances. The tines, 520, as they provide a path for high frequency ground return current to flow to or from the ground plane of the PCB provide a reference for electromagnetic waves. In the illustrated example, the tines 520 and therefore the location of the references are positioned where the electromagnetic fields around the pair of signal conductors partially surrounded by shielding interconnects 214 is high. In the illustrated example, the electromagnetic field around the pair of tails of signal conductors may be the strongest between pairs in a column, but offset from the centerline 216 of the column by an angle α in the range of 5 to 30 degrees, or 5 to 15 degrees, or any suitable number in between. Accordingly, tines 520 positioned in this location with respect to the tails of the signal conductors of each pair may be effective at reducing resonances and improving signal integrity.

In the illustrated example, the tines 520 extend from the distal portions 526. It should be appreciated that the present disclosure is not limited to the illustrated positions for the tines 520. In some embodiments, the tines 520 may be positioned, for example, extending from the in-column portions 522 or the transition portions 524. It also should be appreciated that the present disclosure is not limited to the illustrated number of the tines 520. A differential signal pair may be surrounded by four tines 520 as illustrated, or more than four tines in some embodiments, or less than four tines in some embodiments. Further, it should be appreciated that it may not be necessary for all tines to make physical contact with the ground plane of a mounting board. A tine may or may not make physical contact with a mounting board, for example, depending on the actual surface topology of the mounting board. For example, the tines 520 may be positioned to make physical or capacitive contact with ground vias 244 in FIG. 2D.

A Type-B IMLA may similarly have compressible members positioned with respect to pairs of signal conductors as shown in FIGS. 5J and 5K. The arrangement of pairs within a column, however, may differ between a Type-A and a Type-B IMLA.

Figure 5Q:
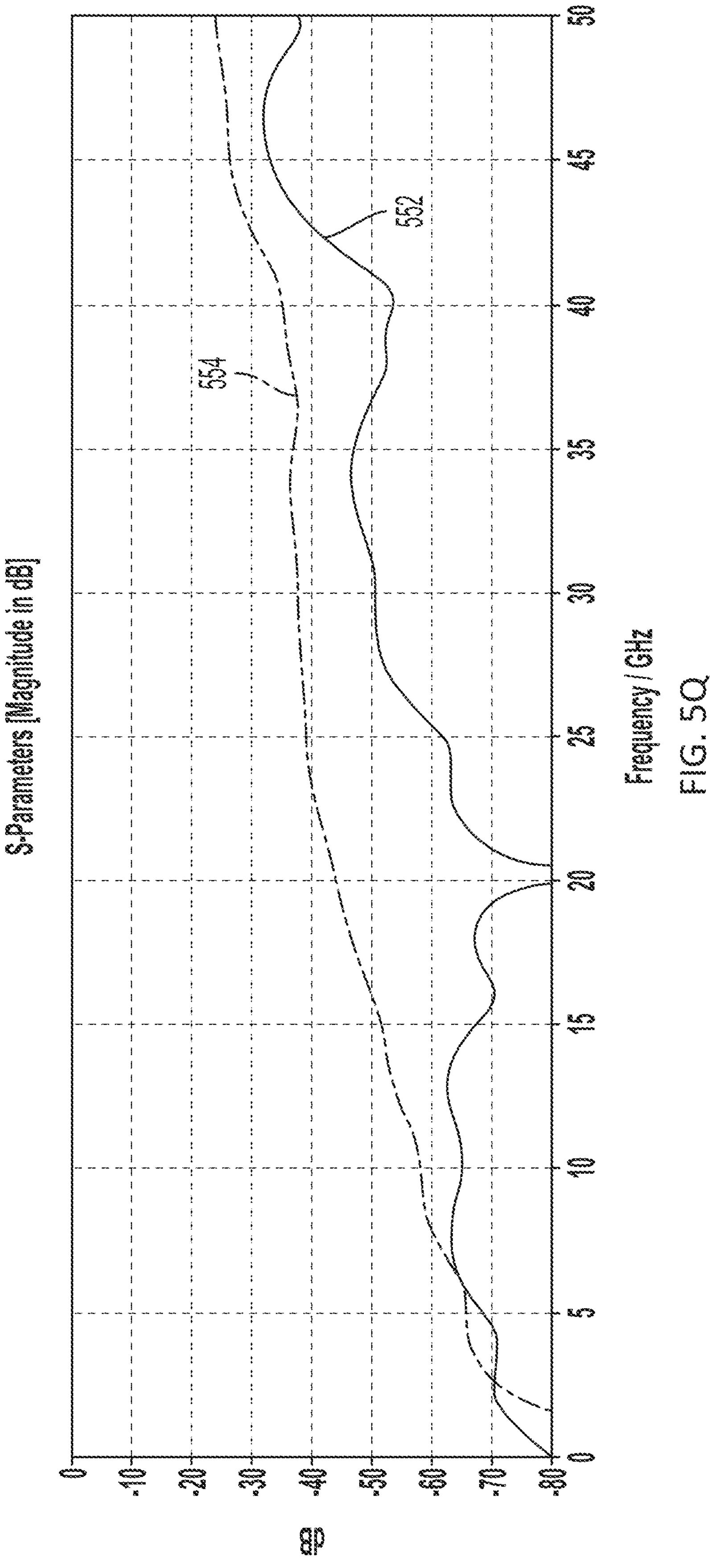
FIG. 5Q is an S-parameter chart across a frequency range of the connector of FIG. 2C compared with a connector with a conventional mounting interface, showing an S-parameter representing crosstalk from a nearest aggressor within a column, according to some embodiments.

FIG. 5Q shows simulation results of an S-parameter across a frequency range. The S-parameters represent crosstalk from a nearest aggressor within a column. The simulation results illustrate the S-parameter result 552 of the connector 200 with the mounting interface shielding interconnect 214, compared with the S-parameter result 554 of a counterpart connector with a conventional mounting interface, according to some embodiments. As illustrated, the connector 200 significantly reduces crosstalk while insertion loss and return loss are maintained. In some scenarios, the operating range of the connector may be set by the magnitude of the S-parameter as a function of frequency. The operating frequency range may be defined, for example, as the frequency range over which the S-parameter is greater than or less than some threshold amount. As a specific example, the operating frequency range may be based on the S-parameter having a value less than −30 dB. In the example of FIG. 5P, trace 552 shows an operating frequency range exceeding 50 GHz, which is an improvement over a conventional connector, represented by trace 554, with an operating frequency range less than 45 GHz.

FIGS. 6A-6F depict a side IMLA assembly 202A, according to some embodiments. The side IMLA assembly 202A may include a core member 204A. One side of the core member 204, illustrated in FIG. 6C, may be attached with a Type-A IMLA 206A. The other side of the core member 204A, illustrated in FIG. 6F, may form part of an insulative enclosure of the connector. The core member 204A may, on the side receiving IMLA 206A be shaped in the same way as core member 204, described above. The opposing side, which need not include features to receive an IMLA, may be flat.

Figure 6B:
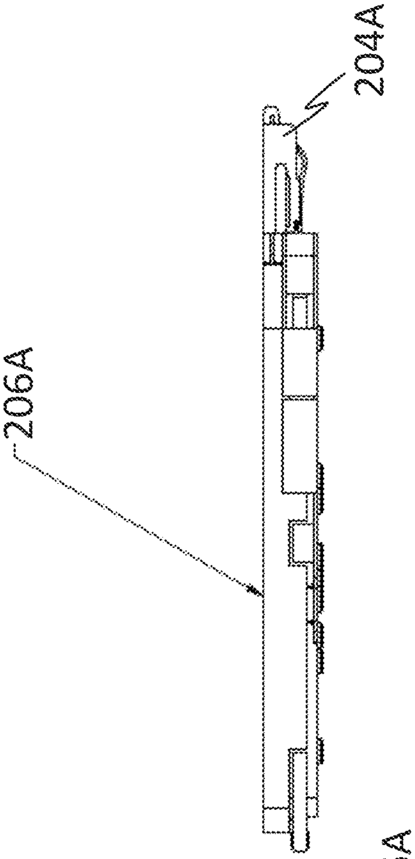
FIG. 6B is a top view of the side IMLA assembly of FIG. 6A, illustrating a single Type-A IMLA attached to one side of a core member, according to some embodiments.
Figure 6A:
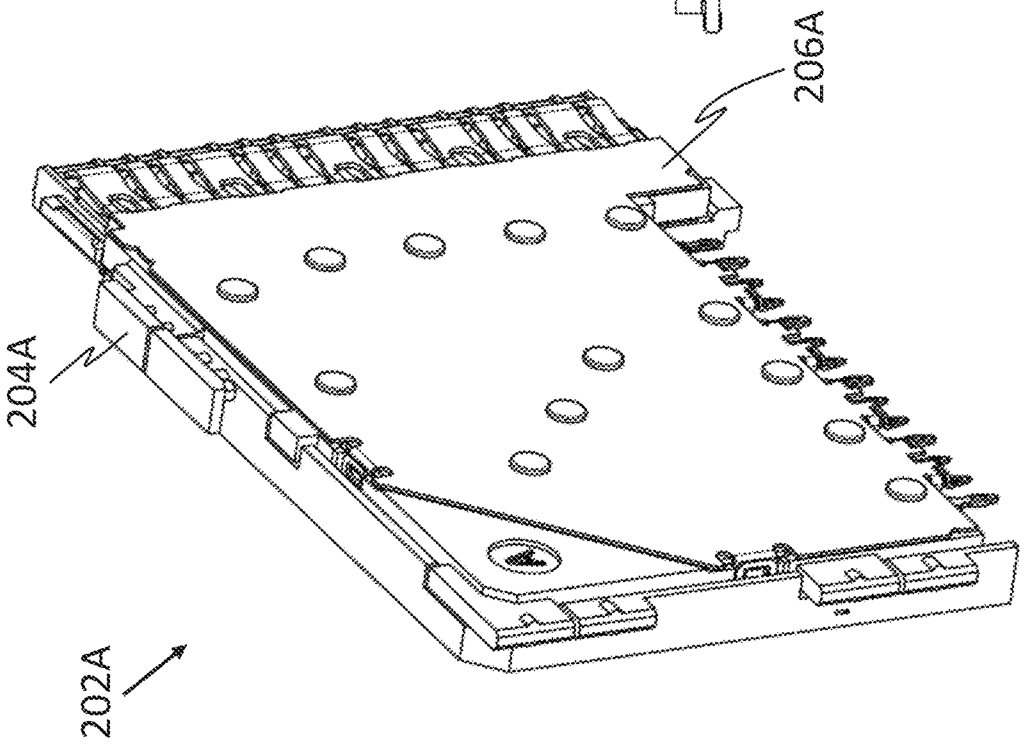
FIG. 6A is a perspective view of a side IMLA assembly, according to some embodiments.
Figure 6D:
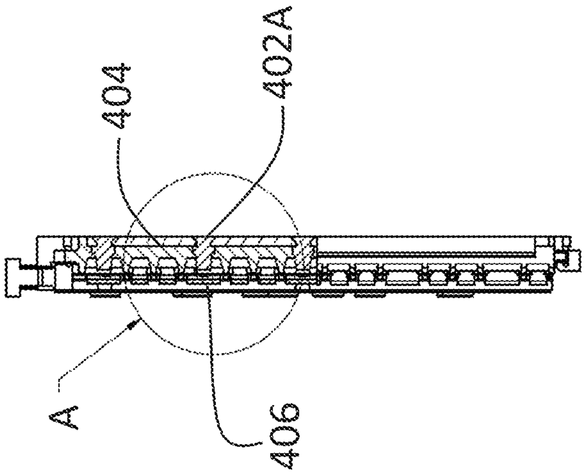
FIG. 6D is a cross-sectional view along line M-M in FIG. 6C, illustrating a mating end of the side IMLA assembly of FIG. 6A, according to some embodiments.

FIG. 6D depicts a front view of the side IMLA assembly 202A, partially cut away, according to some embodiments. FIG. 6D reveals the positioning of lossy material 402A, with ribs 406, adjacent to the mating contact portions of the ground conductors. A shield 404 is also adjacent and parallel to the mating contact portions, as in FIG. 5E. The lossy material 402A underneath the ground conductors electrically connects the ground conductors to the shield 404, and thus reduces crosstalk between pairs of signal conductors separated by the ground conductors.

Figure 6E:
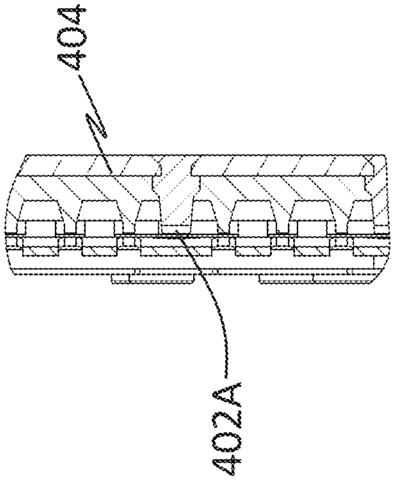
FIG. 6E is an enlarged view of the portion of the side IMLA assembly within the circle marked as "A" in FIG. 6D, according to some embodiments.
Figure 6C:
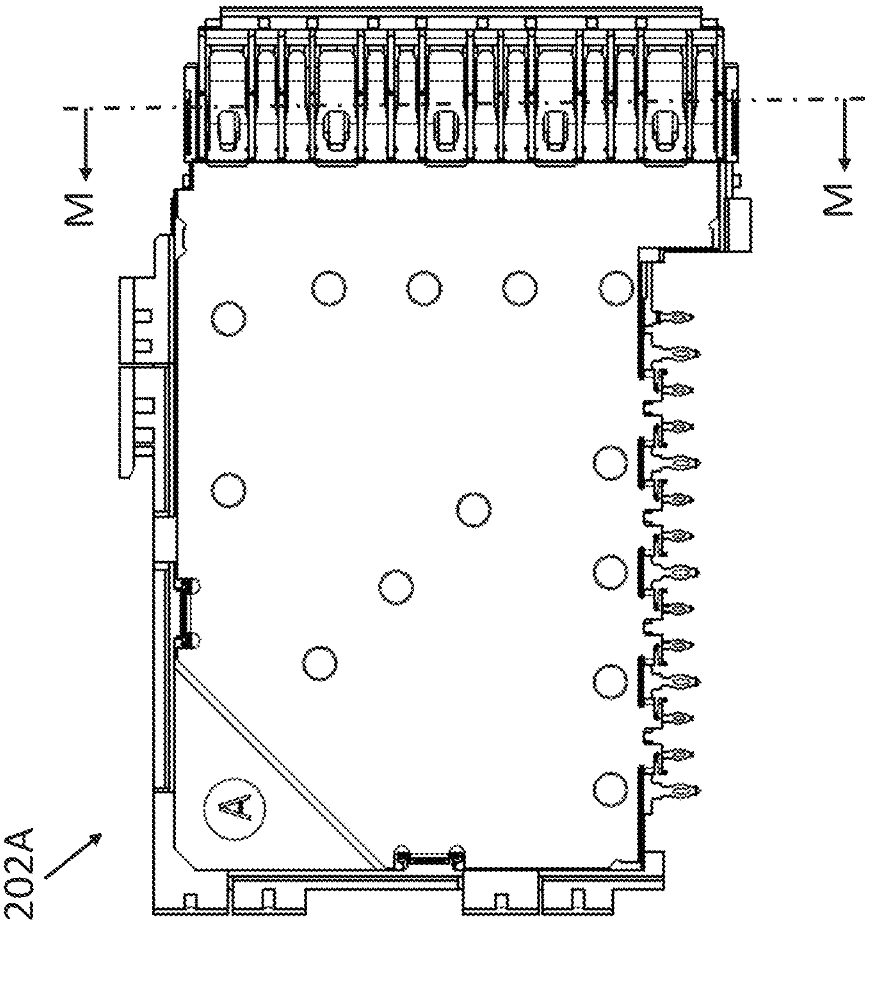
FIG. 6C is a side view of the side IMLA assembly of FIG. 6A, showing a side with a Type-A IMLA attached, according to some embodiments.
Figure 6F:
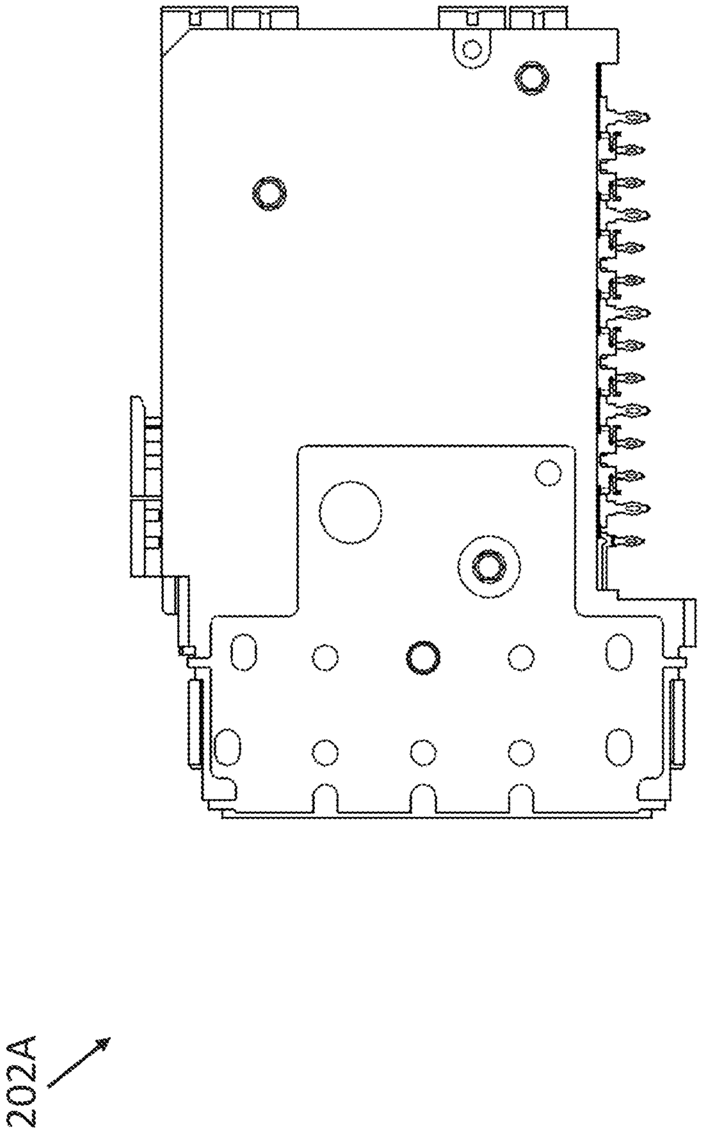
FIG. 6F is a side view of the side IMLA assembly of FIG. 6A, showing a side at an end of a row of IMLA assemblies, according to some embodiments.

FIG. 6E depicts an enlarged view of the circle marked as "A" in FIG. 6D, according to some embodiments. Although the side IMLA assembly 600 is illustrated as being attached with a Type-A IMLA 206A, it should be appreciated that a side IMLA assembly may be formed to receive a Type-B IMLA 206B. A core member for such a Type-B IMLA may, like the core member 204A, have features to receive an IMLA on one side and may be flat on the other side, or otherwise configured as an exterior wall of a connector. The core member for a Type-B IMLA assembly may differ from core member 204A in that it is configured to receive a Type-B IMLA, with a different configuration of conductive elements, on the opposite side relative to a Type-A core member. For example, insulative and conductive ribs may be on the opposite side, as are pre-load features 512.

Figure 7B:
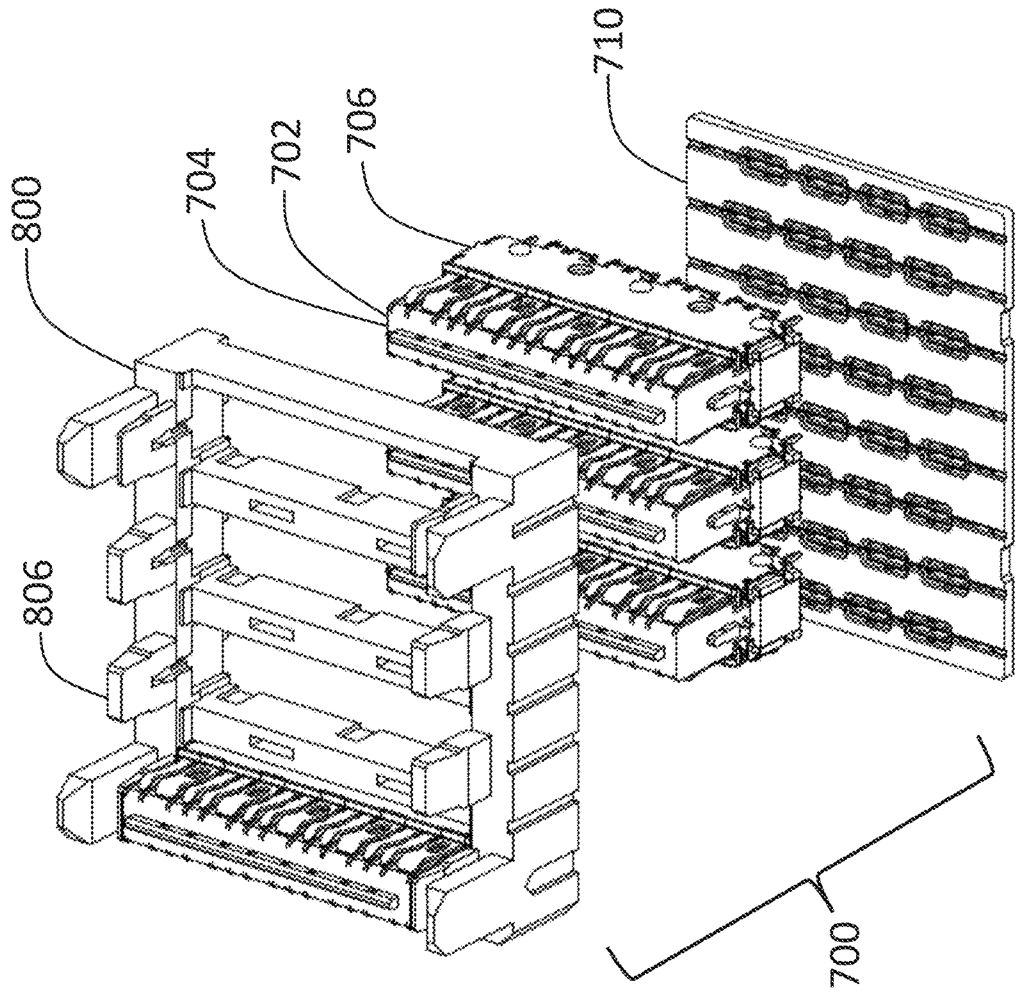
FIG. 7B is an exploded view of the header connector of FIG. 7A, according to some embodiments.
Figure 7A:
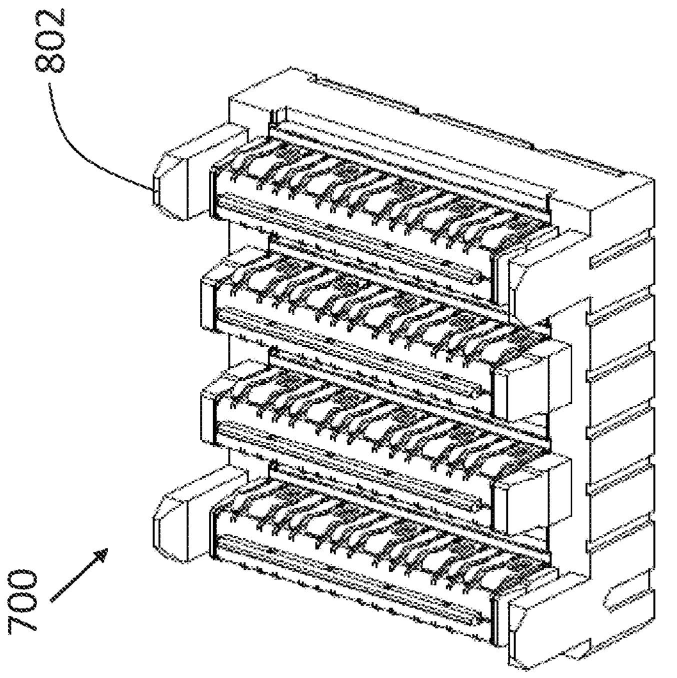
FIG. 7A is a perspective view of the header connector of FIG. 1A, according to some embodiments.

A right-angle connector may mate with a header connector. FIGS. 7A and 7B depict a perspective view and exploded view of the header connector 700, according to some embodiments. The header connector 700 may include dual IMLA T-Top assemblies 702 aligned in a row in a housing 800. A T-Top assembly 702 may include a core member 704 attached with at least one leadframe assembly 706. The header connector 700 may include an organizer 710 attached to its mounting end.

Though the header connector is vertical, rather than right angle as for connector 200, similar construction techniques may be applied. For example, leadframe assemblies may be formed by molding insulative materials over a column and attaching leadframe assembly shields. Those assemblies may be attached to core members that are then inserted into a housing to form a connector.

The mating interface may be configured to be complementary to the mating interface of connector 200. In this embodiment, the IMLA assemblies of header connector 700 fit between the A-Type and B-Type side IMLA assemblies, such that header connector 700 does not have separate side IMLA assemblies forming a side of header connector 700. Accordingly, in the embodiment illustrated, all of the IMLA assemblies of header connector 700 are two-sided IMLA assemblies.

Figure 3A:
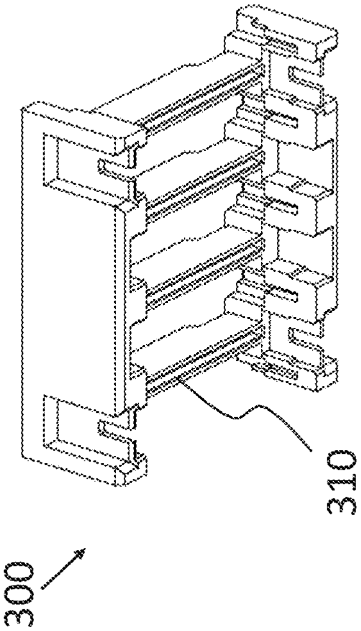
FIG. 3A is a perspective, top, front view of a front housing of the right angle connector of FIG. 2A, according to some embodiments.
Figure 3B:
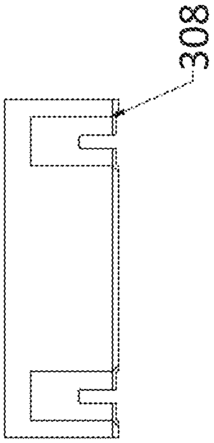
FIG. 3B is a top plan view of the front housing of FIG. 3A, according to some embodiments.
Figure 3C:
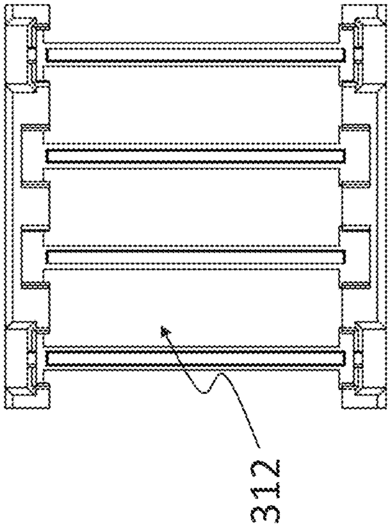
FIG. 3C is a front plan view of the front housing of FIG. 3A, according to some embodiments.
Figure 3D:
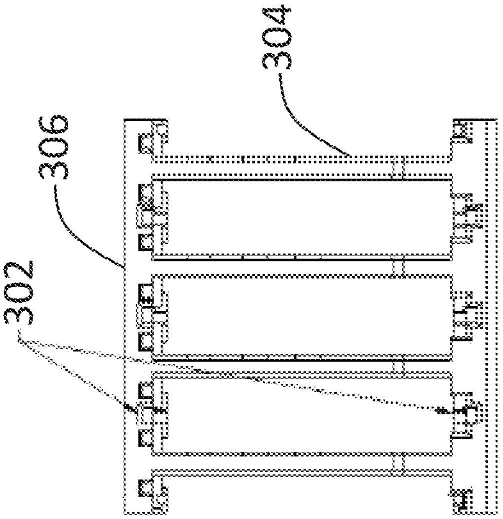
FIG. 3D is a rear plan view of the front housing of FIG. 3A, according to some embodiments.
Figure 3E:
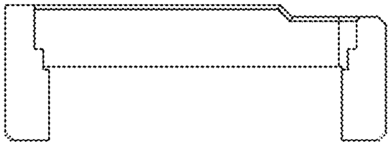
FIG. 3E is a side view of the front housing of FIG. 3A, according to some embodiments.
Figure 8B:
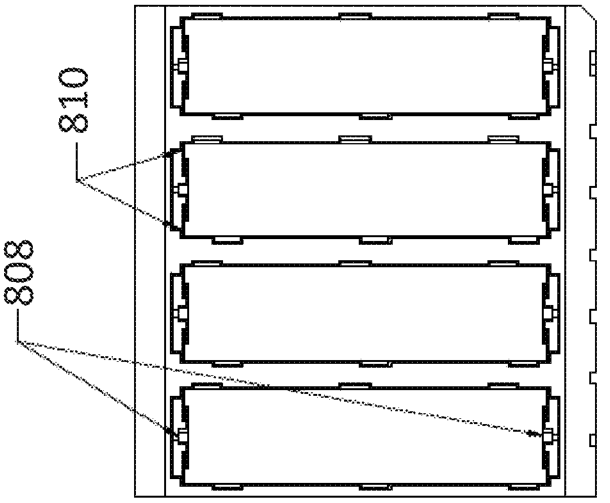
FIG. 8B is a mounting end view of the connector housing of FIG. 8A, according to some embodiments.
Figure 8A:
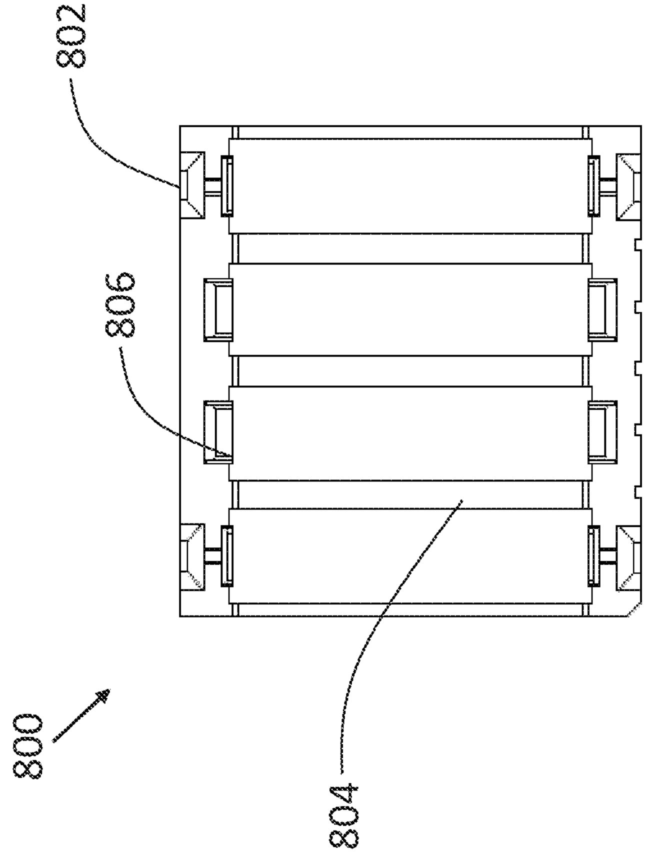
FIG. 8A is a mating end view of a connector housing of the header connector of FIG. 7A, according to some embodiments.

FIGS. 8A and 8B depict a mating end view and a mounting end view of the housing 800 respectively, according to some embodiments. The housing 800 may include mating keys 802 configured to insert into matching slots in a housing of a mating connector, for example, mating keyways 308 of the housing 300 (FIG. 3B). The housing 800 may include walls 804 configured to separate adjacent T-Top assemblies 702 and provide isolation and mechanical support. The walls 804 may include slots (not shown) configured to receive the distal ends of the T-Top region 410 of the right angle connector 200. The housing 800 may include pairs of members 806 and pairs of IMLA support features 810. Each pair of the members 806 may include alignment features 808 configured to align and secure a T-Top assembly, and IMLA support features 810 configured to provide mechanical support to leadframe assemblies of the T-Top assembly. It should be appreciated that the housing 800 does not include complex and thin features required by conventional connectors, and thus is easier to manufacture. Housing 800 may be easily formed in a mold that closes and opens in a direction perpendicular to the surfaces shown in FIGS. 8A and 8B. Fine features, such as insulative and lossy ribs, and pre-load features may be formed in the T-top portions of the core members, as described above.

Figure 9C:
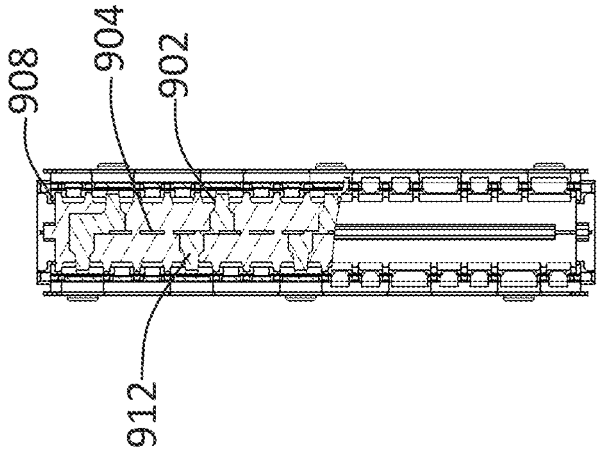
FIG. 9C is a mating end view of the dual IMLA assembly of FIG. 9A, partially cut away, according to some embodiments.
Figure 9D:
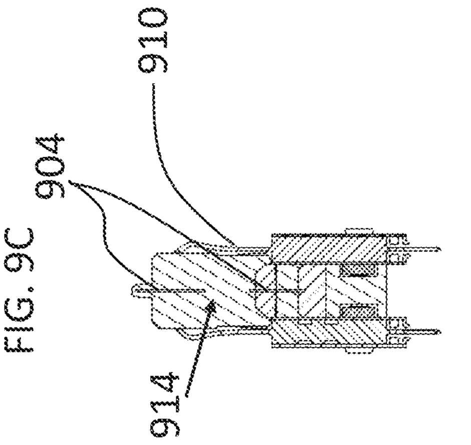
FIG. 9D is a cross-sectional view along line Z-Z in FIG. 9B, according to some embodiments.
Figure 9A:
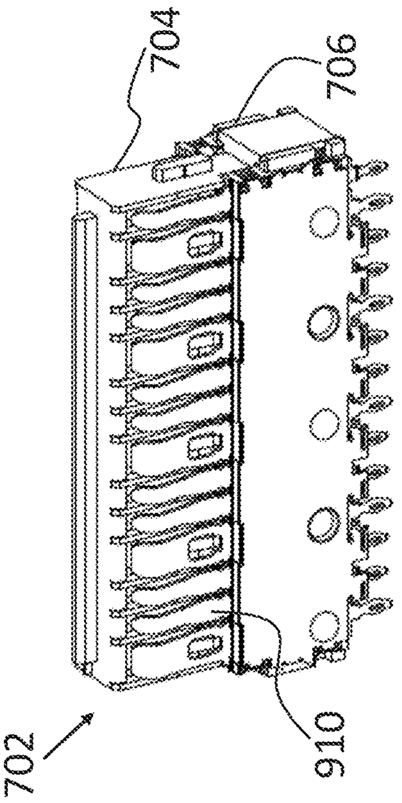
FIG. 9A is a perspective view of a dual IMLA assembly of the header connector of FIG. 7A, according to some embodiments.
Figure 9B:
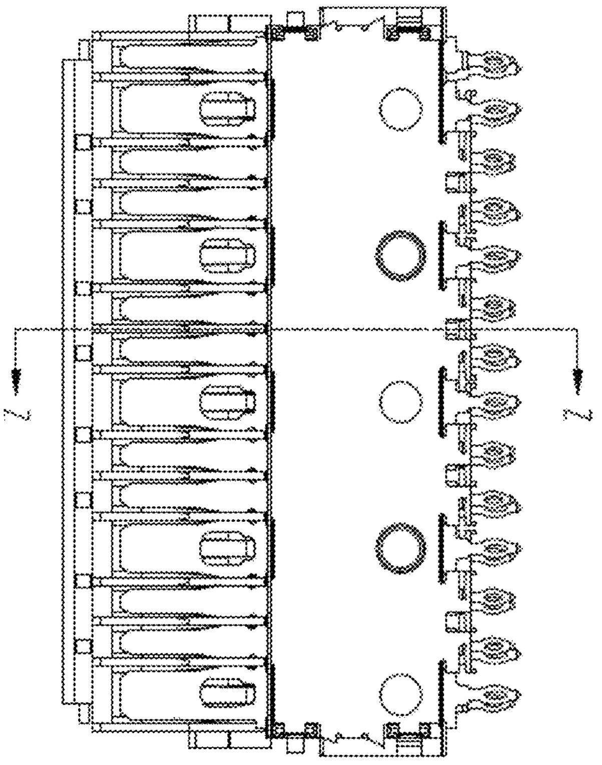
FIG. 9B is a side view of the dual IMLA assembly of FIG. 9A, according to some embodiments.

In some embodiments, the dual IMLA assemblies 702 of the header connector 700 may include features similar to those of the dual IMLA assemblies 202C of the right angle connector 200. FIGS. 9A and 9B depict a dual IMLA assembly 702 of the header connector 700, according to some embodiments. FIG. 9C depicts a mating end view of the dual IMLA assembly 702, partially cut away, according to some embodiments. FIG. 9D depicts a cross-sectional view along line Z-Z in FIG. 9B, according to some embodiments.

The dual IMLA assembly 702 may include a core member 704 to which two leadframe assemblies 706 are attached. Each leadframe assembly 706 may include multiple conductive elements 910 aligned in a column. The core member 704 may include a T-Top interface shield 904, lossy material 902 selectively molded over the interface shield 904, and insulating plastic 908 selectively molded over the lossy material 902 and interface shield 904. Although a gap 914 between two portions of the interface shield 904 is illustrated in FIG. 9D, it should be appreciated that the interface shield 904 may be a unitary piece. The gap 914 may be the cross-sectional view of a hole cut out of the shield such that other materials (e.g., lossy material 902 and/or insulative material 908) can flow around the shield 904. The lossy material 902 may include ribs 912 extending from the interface shield 904 towards ground conductive elements of the leadframe assemblies such that the ground conductive elements are electrically connected through the lossy material 902 and the interface shield, which reduces resonances, and otherwise improves signal integrity. Although the illustrated example shows only dual IMLA assemblies for the header connector 700, a header connector may include side IMLA assemblies, for example, configured similar to side IMLA assemblies 202A, 202B of the right angle connector 200. Such a configuration would enable the header to mate with a right angle connector without side IMLA assemblies. In some embodiments, the IMLA assemblies on opposite sides of a core member may have conductive elements disposed in the orders that are complementary to a mating right angle connector. For example, the IMLA assemblies on opposite sides of a core member may include leadframes that are complementary to the leadframes of the Type-A IMLA 206A and Type-B IMLA 206B respectively.

Figure 10A:
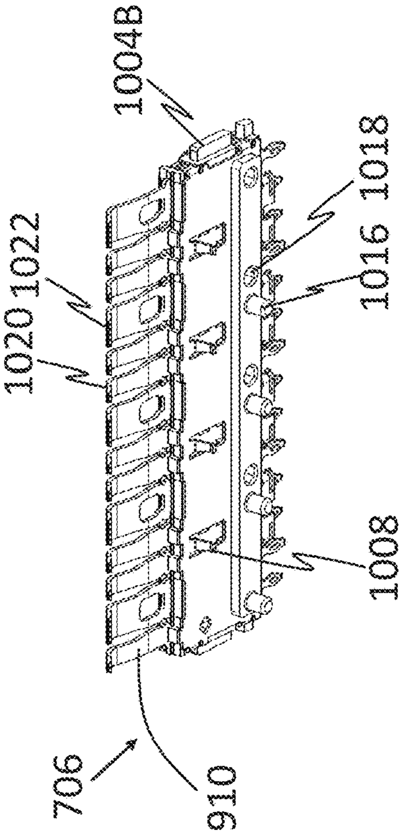
FIG. 10A is a perspective view of a leadframe assembly of the dual IMLA assembly of FIG. 9A, according to some embodiments.
Figure 10D:
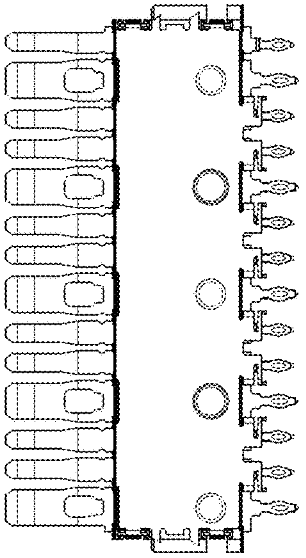
FIG. 10D is a view of the side of the leadframe assembly of FIG. 10A facing away from a core member, according to some embodiments.
Figure 10C:
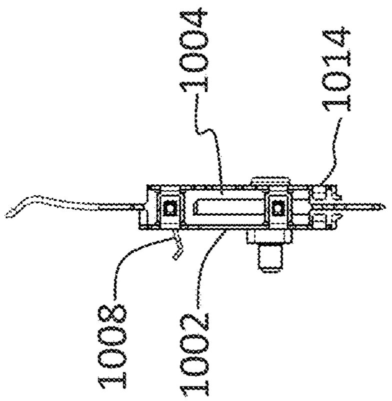
FIG. 10C is a side view of the leadframe assembly of FIG. 10A, according to some embodiments.
Figure 10B:
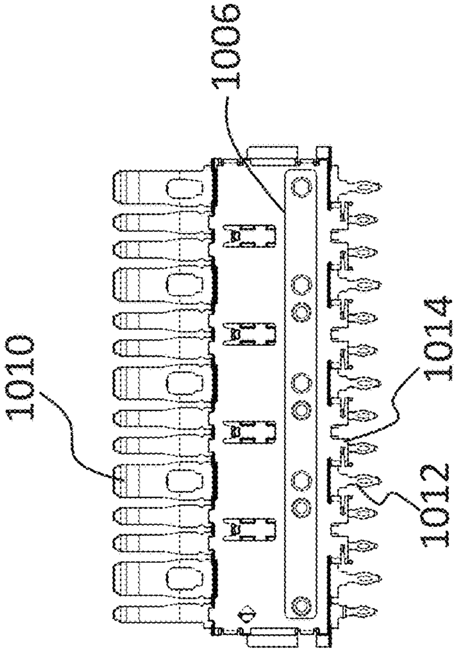
FIG. 10B is a view of the side of the leadframe assembly of FIG. 10A facing to a core member, according to some embodiments.

FIG. 10A depicts a perspective view of a leadframe assembly 706 of the dual IMLA assembly 702, according to some embodiments. FIG. 10B depicts an elevation view of the side of the leadframe assembly 706 facing to the core member 704, according to some embodiments. FIG. 10C depicts a side view of the leadframe assembly 706, according to some embodiments. FIG. 10D depicts an elevation view of the side of the leadframe assembly 706 facing away from the core member 704, according to some embodiments.

In some embodiments, the leadframe assembly 706 may be manufactured by molding insulative material 1004 over a leadframe including the column of conductive elements 910, attaching ground plates 1002 to sides of the column of conductive elements 910 molded with insulative material 1004, and selectively molding a lossy material bar 1006. The insulative material 1004 may include a projection 1004B configured for secondary alignment and support. The lossy material bar may be configured to retain the ground plates 1002, and provide electrical connection between the ground plates and ground conductive elements of the column while maintaining isolation from signal conductive elements of the column. In some embodiments, the lossy material bar 1006 may include ribs or other projections extending towards ground conductive elements 1022.

In some embodiments, the column of conductive elements 910 may include signal conductive elements (e.g., 1020) separated by ground conductive elements (e.g., 1022). The signal conductive elements may include signal mating portions and signal mounting tails. The ground conductive elements may be wider than the signal conductive elements and may include ground mating portions 1010 and ground mounting tails 1012.

In some embodiments, the ground plates 1002 may include beams 1008 extending substantially perpendicular to a length of the conductive elements 910 and towards a core member that the leadframe assembly 706 configured to be attached to. In some embodiments, the beams 1008 may be positioned adjacent to the signal conductive elements 1020. In such a configuration, the ground current path through the IMLA shields and T-Top shields is closer to and generally parallel to the signal conductive elements, which may improve the shielding effectiveness and enhance signal integrity. In some embodiments, the ground plates 1002 may not include beams 1008, for example, as illustrated in FIG. 9D.

In some embodiments, the lossy material bar 1006 may include retention features such as projections 1016 and openings 1018. In some embodiments, the core member may include projections and openings to insert into the openings 1018 and receive the projections 1016. In some embodiments, the core member may be configured to enable the projections 1016 pass through and insert into the openings of a complementary leadframe assembly attached to a same core member. For example, the projections 1016 may be configured to attach to openings of a complementary leadframe assembly attached to a same core member. The openings 1018 may be configured to receive projections of the complementary leadframe assembly attached to the same core member. Such retention features provide mechanical support for a dual IMLA assembly, and also provide current paths between ground structures of the dual IMLA assembly.

As with the right angle connector 200, the header connector 700 may include mounting interface shielding interconnects. The mounting interface shielding interconnects may be formed by compressible members 1014, for example, extending from the shields 1002. The compressible members 1014 may be configured similar to compressible members 518.

Figure 11A:
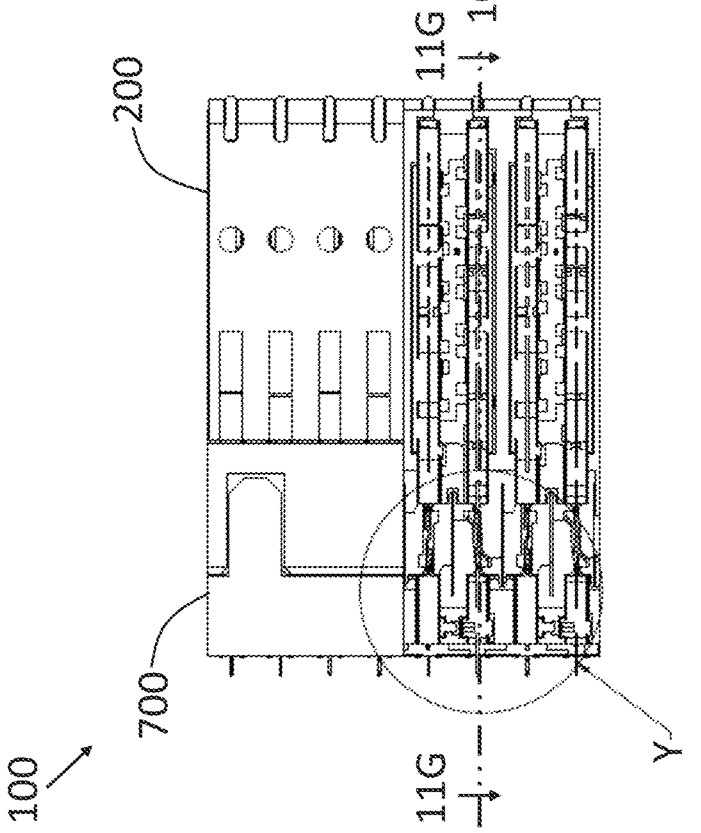
FIG. 11A is a top view of the mated connectors of FIG. 1A, partially cut away, according to some embodiments.

FIG. 11A depicts a top view of the electrical interconnection system 100, partially cut away, according to some embodiments. FIG. 11B depicts an enlarged view of the circle marked as "Y" in FIG. 11A, according to some embodiments.

In the illustrated example, the right angle connector 200 and the header connector 700 are mated by forming electrical connection between conductive elements 504 of the right angle connector 200 and conductive elements 902 of the header connector 400 at one or more contact locations 1104. FIG. 11B illustrates in cross section a portion of header connector 700 and a portion of the right angle connector 200 at which a conductive element from each of the connectors are mated. The conductive elements may be signal conductive elements or ground conductive elements, as, in the illustrated embodiment, both have the same profile in cross section.

In this configuration, mated portions of the conductive elements 504 and 902 are shielded by the T-Top interface shield 404 of the core member 204 of the right angle connector 200 and the T-Top interface shield 904 of the core member 704 of the header connector 700. In this way, the shielding configuration, with planar shields on both sides of the conductive elements, is carried into the mating interface of the mated connectors. However, rather than that two-sided shielding being provided by the IMLA shields 502 or 1002 as for the intermediate portions of the conductive elements within the IMLA insulation, the two-sided shielding is provided by the T-Top shields of the two T-Tops carrying the mating contact portion of the two mated conductive elements.

It also should be appreciated that the T-Top interface shield 404 of the core member 204 of the right angle connector 200 overlaps with the shield 1002 of the leadframe assembly 706 of the header connector 700 when the connectors are mated. The T-Top interface shield 904 of the core member 704 of the header connector 700 overlaps with the shield 1002 of the leadframe assembly 206 of the right angle connector 200 when the connectors are mated. A length of the overlaps may be controlled by a length of extensions of interface shields (e.g., extension 510 of the T-Top interface shield 404). The extension 510 may have a thickness smaller than the rest of the core member such that the extension 510 can be inserted into a matching opening of a mating connector. The above described configuration of T-Top interface shields 404 and 904 of the core members 204 and 704 not only provides shielding for the mated portions of the conductive elements at the mating interface 106 but also reduces shielding discontinuity caused by the change from the internal shields of leadframe assemblies (e.g., shields 1002, 1102) to the interface shields (e.g., T-Top interface shields 404, 904).

A method of operating connectors 200 and 700 to mate with each other in accordance with some embodiments is described herein. Such a method may enable conductive elements to have short lead-in segments between a contact point and distal end, which enhances high frequency performance. Yet, there may be a low risk of stubbing. FIGS. 11C-11F depict enlarged views of the mating interface of the two connectors of FIG. 1A, or connectors in other configurations with similar mating interfaces. FIG. 11G depicts an enlarged partial plan view of the mating interface along the line marked "11G" in FIG. 11A. A conductive element may include a curved contact portion 1106 with a contact location on a convex surface. The contact portion 1106 may extend from an intermediate portion of the conductive element and from the insulative portion of the IMLA into an opening 1110. For mating to another connector, the contact portion may press against a mating conductive element. A tip 1108 may extend from the contact portion 1106. As illustrated in FIG. 11G, mated pairs of signal conductive elements of connectors 200 and 700 may have mated ground conductive elements of the connectors on their sides to block energy propagating through the grounds and thus reduce cross talk.

FIGS. 11C-11F illustrate a mating sequence that operates with a tip 1108 that can be shorter than in a conventional connector. In contrast to a connector in which the tip of a mating portion of a conductive element may be retained by a feature in the housing enclosing the conductive element, tip 1108 is free and substantially fully exposed in the opening into which mating conductive element 902 will be inserted. In a convention connector, such a configuration risks stubbing of the conductive elements as the connectors are mated. However, stubbing of conductive elements 902 and 504 is avoided because each conductive element is moved out of the path of the other conductive element by a feature on a housing around the other conductive element.

Figure 11C:
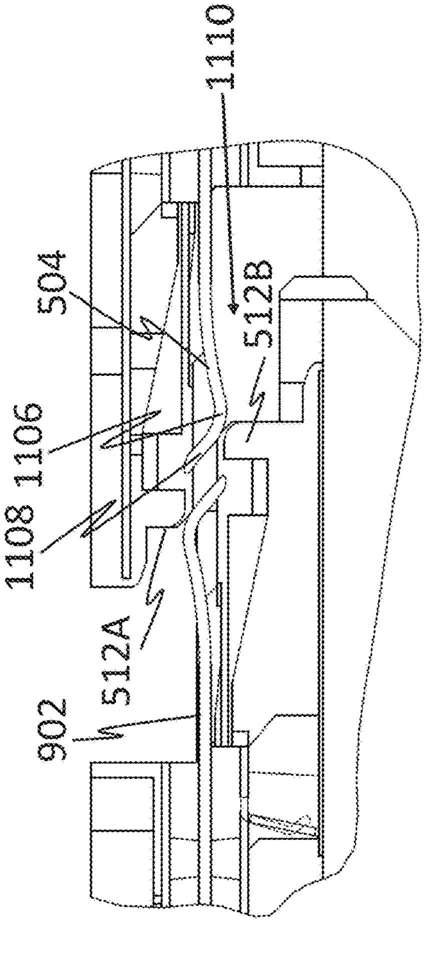
FIGS. 11C-11F are enlarged views of the mating interface of the connectors of FIG. 1A, at successive steps in mating, illustrating a method of mating the connectors, according to some embodiments.

The method of operating connectors 200 and 700 may start with bringing the connectors together so that mating conductive elements are aligned, as illustrated in FIG. 11C. In this state, the conductive element 504 of the right angle connector 200 and conductive elements 902 of the header connector 700 may be in respective rest states, and aligned with one another in a mating direction.

Figure 11D:
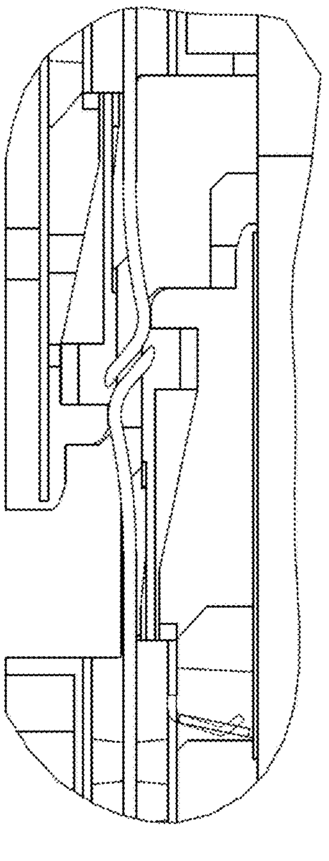

Connectors 200 and 700 may be further pressed together in the mating direction until they reach the state illustrated in FIG. 11D. In this state, conductive element 504 of the right angle connector 200 has engage with a preload feature 512B of the header connector 700. To reach this state, the angled lead-in portions of 1108 slid along tapered leading edge of preload feature 512B. The preload feature 512B of the header connector 700 deflected the conductive element 504 of the right angle connector 200 from its rest state.

In this example, both connectors have similar mating interface elements, and conductive element 902 of the header connector 700 has similarly engaged with preload feature 512A of the right angle connector 200. The preload feature 512A of the right angle connector 200 deflected the conductive element 902 of the header connector 700 from its rest state. As a result, conductive elements 902 and 504 have been deflected in opposite directions such that the distance between the distal-most portions of their respective tips has increased. Such an increased distance between the tips, moving both tips away from the centerline of the mated conductive elements, reduces that chance that variations in the manufacture or positioning of the connectors during mating will result in the stubbing of conductive elements 902 and 504. Rather, the tapered lead-in portions of conductive elements 902 and 504 will ride along each other as the connectors are pressed together.

Figure 11E:
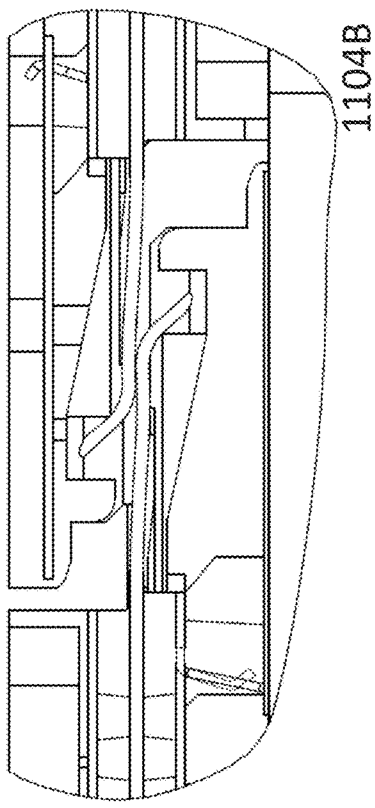

Connectors 200 and 700 may be further pressed together in the mating direction until they reach the state illustrated in FIG. 11E. In this state, the conductive element 504 of the right angle connector 200 and conductive elements 902 of the header connector 400 have disconnected from the preload features 512A and 512B, and make contact with each other. Each conductive element is further deflected relative to the state in FIG. 11D when they are engaged with respective preload features 512A or 512B. In this state, the convex contact surface of each conductive element presses against a contact surface, which may be flat, of the mating conductive element.

Figure 11F:
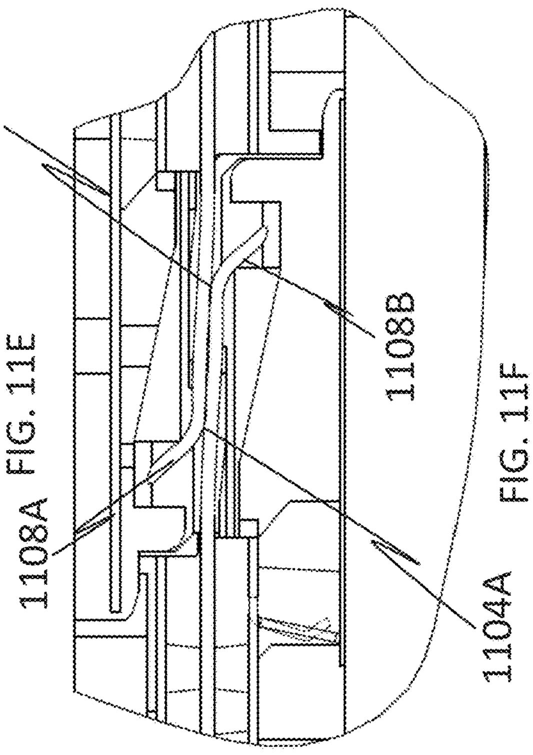
Figure 11G:
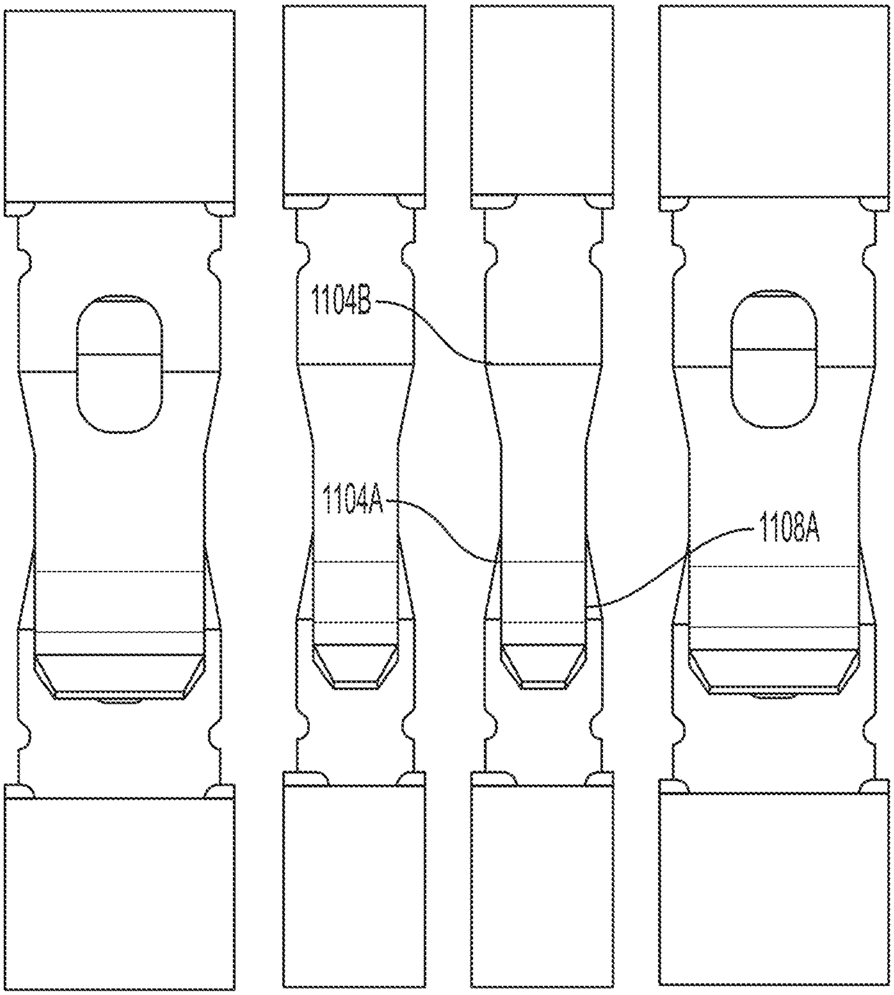
FIG. 11G is an enlarged partial plan view of the mated connectors of FIG. 1A along the line marked "11G" in FIG. 11A, according to some embodiments.

Connectors 200 and 700 may be further pressed together in the mating direction until they reach the state illustrated in FIG. 11F. In this state, the conductive element 504 of the right angle connector 200 and conductive elements 902 of the header connector 400 may be in a fully-mated condition and make contact with each other at locations 1104A and 1104B. The locations 1104A and 1104B may be at an apex of the convex surface of the contact portions 1106. The configuration may enable a connector to have a smaller wipe length for a contact portion (e.g., contact portion 1106) before reaching a respective contact location (e.g., locations 1104A, 1104B), such as less than 2.5 mm, and may be approximately 1.9 mm, for example.

Each of the conductive elements has an unterminated portion, 1108A and 1108B, respectively, extending beyond its respective contact location 1104A and 1104B. This unterminated portion may form a stub, which can support a resonance. But, as the stub is short, that resonance may be higher than the operating frequency range of the connector, such as above 35 GHz or above 56 GHz. The unterminated portions 1108A and 1108B, may have a length, for example, in the range of 0.02 mm and 2 mm and any suitable value in between, or in the range of 0.1 mm and 1 mm and any suitable value in between, or less than 0.8 mm, or less than 0.5 mm, or less than 0.1 mm.

Figure 12A:
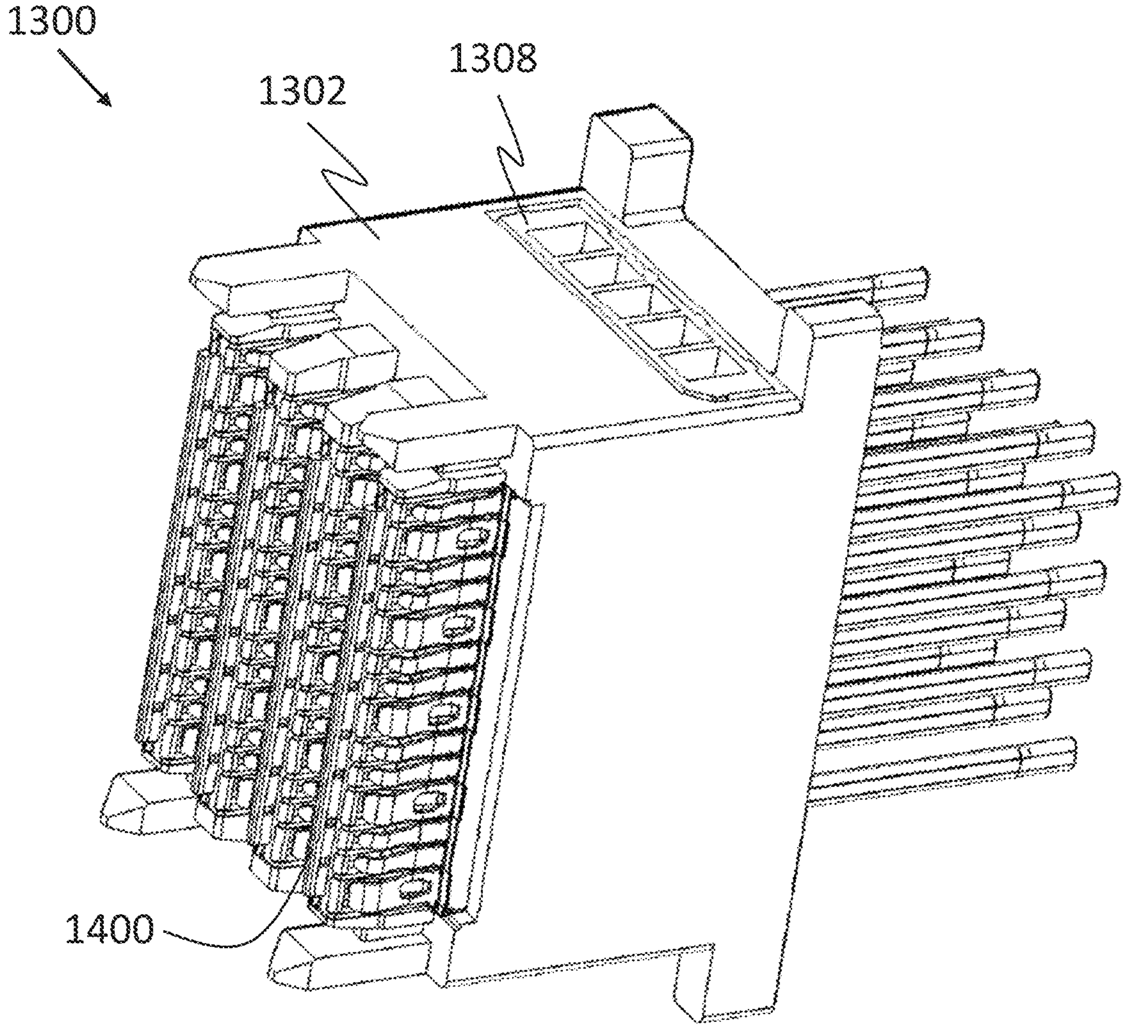
FIG. 12A is a perspective view of a cable connector, according to some embodiments.
Figure 12B:
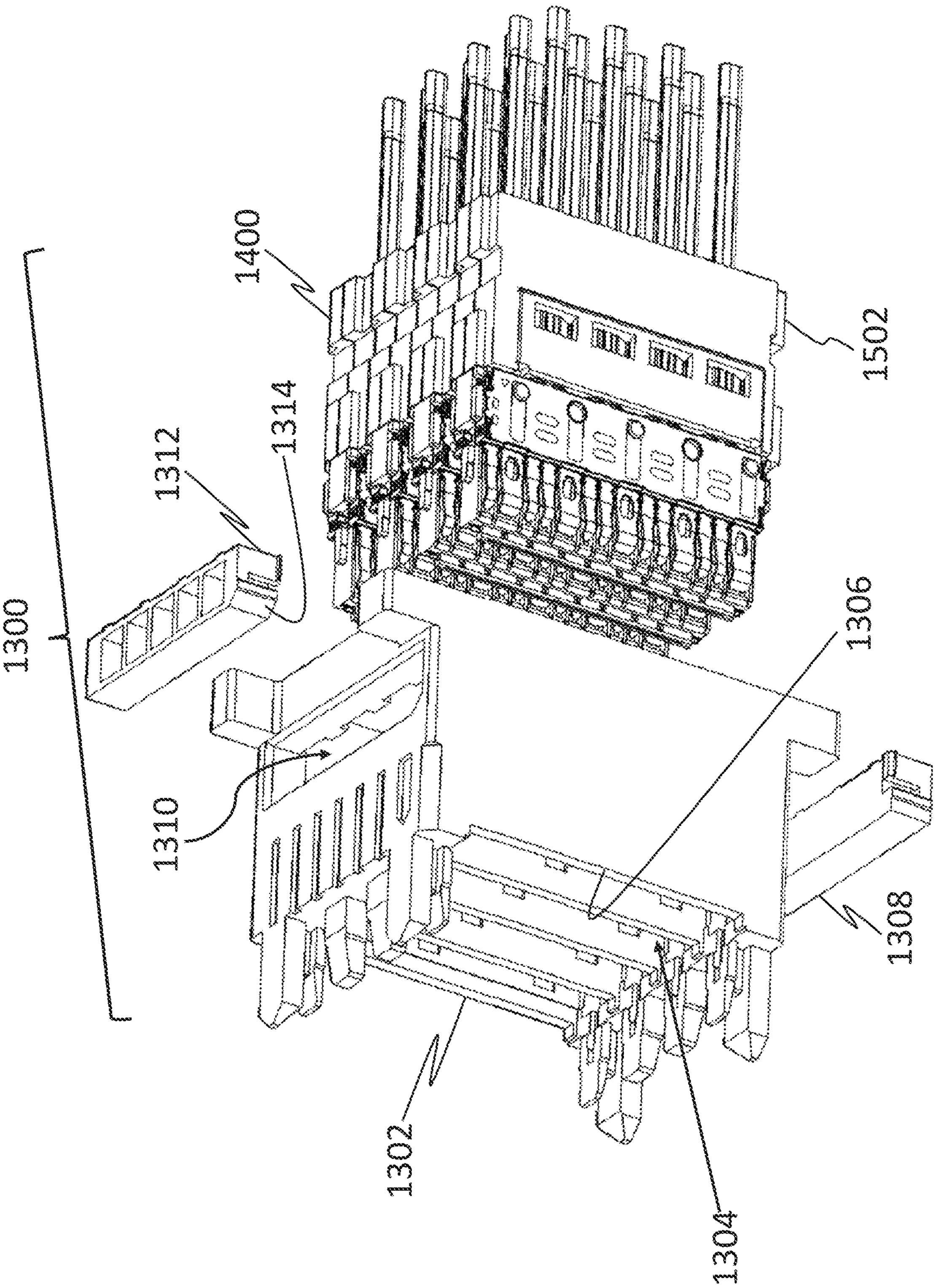
FIG. 12B is a partially exploded view of the cable connector of FIG. 12A, according to some embodiments.

A right-angle connector may mate with connectors in configurations other than header 700, such as a cable connector. FIG. 12A and FIG. 12B depict a perspective and partially exploded view of the cable connector 1300 respectively, according to some embodiments. The cable connector 1300 may include dual IMLA cable assemblies 1400 held by a housing 1302. The housing 1302 may include a cavity 1304 surrounded by walls 1306. The cavity 1304 may be configured to hold the T-Top cable assemblies 1400. In the illustrated example of FIG. 12B, the dual IMLA cable assemblies 1400 are inserted from the back of the housing 1302 into the cavity 1304. The walls 1306 of the housing 1302 may include features configured to retain the dual IMLA cable assemblies 1400. The retaining features of the walls 1306 may be similar to the features of the housing 800 for a header connector including, for example, mating keys, alignment features, and IMLA support features. In some embodiments, the housing 1302 of the cable connector 1300 may be configured with or without internal walls (e.g., walls 804, FIG. 8A). The dual IMLA cable assemblies 1400 may include IMLA housings 1502 that separate adjacent dual IMLA cable assemblies 1400.

As with header 700, the housing 1302 may have only or predominately only features that can be easily molded in a mold without moving parts. The housing 1302 may be molded, for example, in a mold that opens and closes in the front to back direction for the housing 1302. Fine features, such as ribs or other features that separate adjacent conductive elements or align with individual conductive elements, and/or features with surfaces and/or corings that extend in a side to side direction, perpendicular to the front to back direction, may be formed as part of assemblies that are inserted into the housing. Those assemblies may include components that are easily molded in a mold that opens and closes in the side to side direction, such as preload features 512.

The housing 1302 may include openings 1310 configured to receive retainers 1308. The retainers 1308 may be configured to securely retain the T-Top cable assemblies 1400 in the housing 1302. The retainers 1308 may prevent the T-Top cable assemblies 1400 from slipping out of the housing 1302 since the housing 1302, as discussed above, may be molded without fine features perpendicular to the front to back direction. The retainers 1308, which may be molded separately, may include fine features such as chamfers 1314 and crush ribs 1312. The chamfers 1314 may be at selected one or more corners of the retains 1308 such that the retainers 1308 may be assembled into the housing 1302, following the insertions of the T-Top cable assemblies 1400, in one orientation but not the opposite direction. The keyed orientation may enable the crush ribs 1312 to bias the retainers 1308 and the dual IMLA cable assemblies 1400 forward towards the mating interface.

Figure 13B:
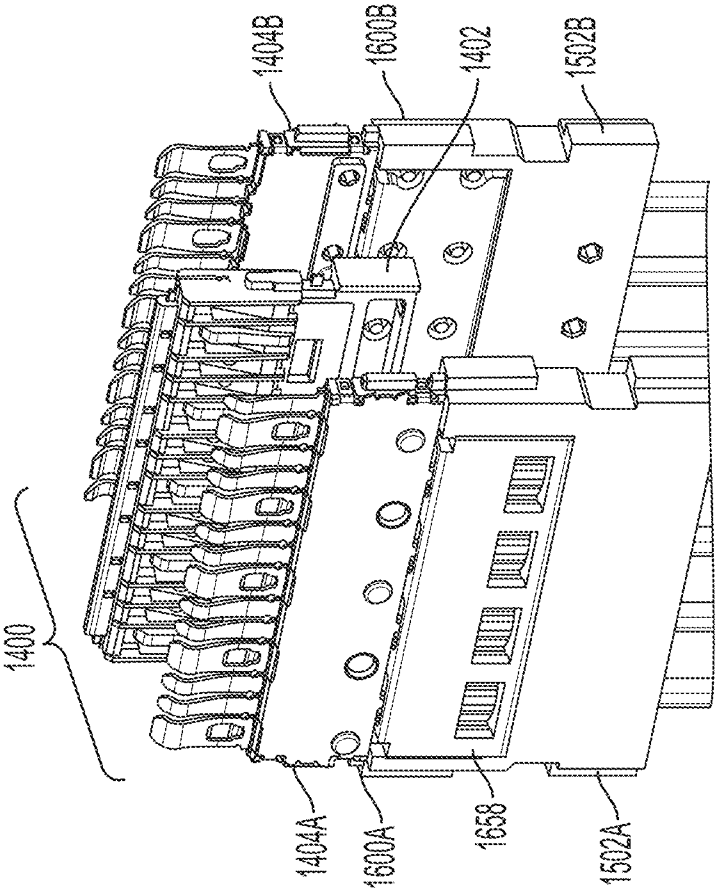
FIG. 13B is an exploded view of the dual IMLA cable assembly of FIG. 13A, according to some embodiments.
Figure 13A:
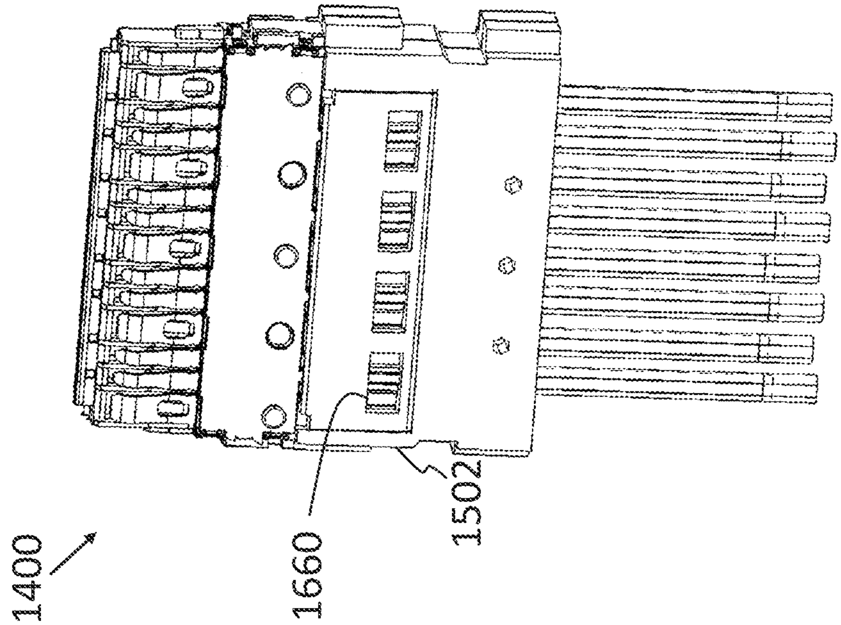
FIG. 13A is a perspective view of a dual IMLA cable assembly, according to some embodiments.

FIG. 13A and FIG. 13B depict a perspective view and an exploded view of the dual IMLA cable assembly 1400 respectively, according to some embodiments. The dual IMLA cable assembly 1400 may include a core member 1402 to which two cable IMLAs 1404A and 1404B are attached. The cable IMLAs 1404A and 1404B may have conductive elements to which cables are terminated, and hoods 1658 that may provide shielding to the conductive elements and thus reduce crosstalk. Strain relief overmolds 1502A and 1502B may be molded over the cables terminated to each cable IMLA and portions of the cable IMLAs, forming leadframe cable assemblies 1600A and 1600B, which, together with core member 1402 form the dual IMLA cable assembly 1400.

In some embodiments, the core member 1402 of the cable connector 1300 may be configured similar to the core member 704 of the header connector 700. In the embodiment of FIG. 13B, IMLAs 1404A and 1404B may be configured the same, but, when mounted on opposite sides of core member 1402 with contact surfaces of the conductive elements facing away from the core member, the IMLAs may have a different order of conductive elements. IMLA 1404A, in the illustrated example, has a wider, ground conductive element at a first end of the dual IMLA assembly and a single-ended signal conductive element at the second end. For IMLA 1404B, the single-ended signal conductive element is at the first end and a ground conductive element is at the second end. As a result, the pairs of signal conductors on opposite sides of the dual IMLA assembly are offset in the column direction.

Figure 14B:
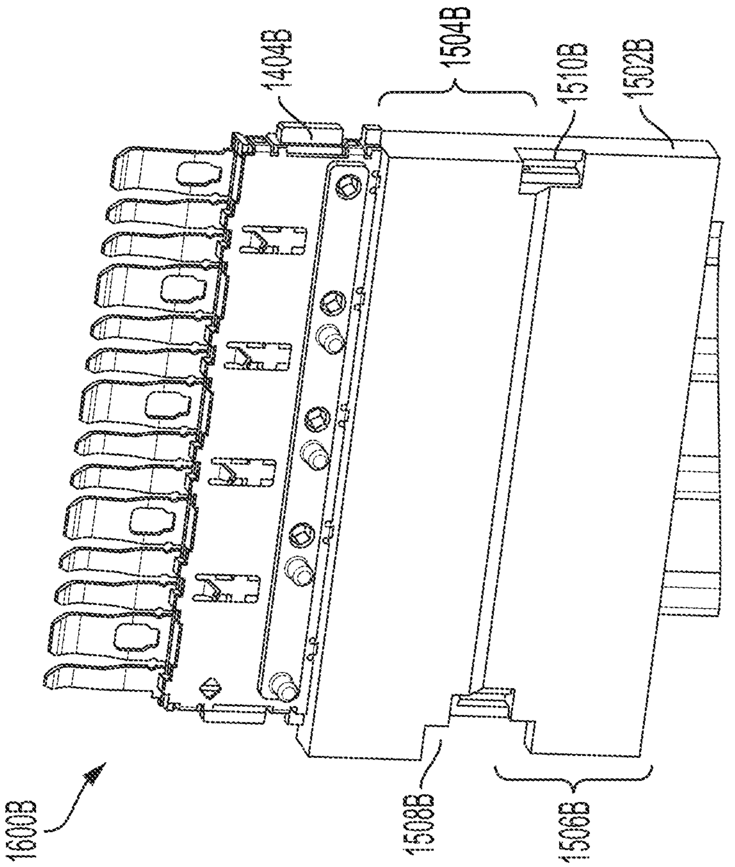
FIG. 14B is a perspective view of a Type-B cable IMLA in the dual IMLA cable assembly of FIG. 13A, according to some embodiments.
Figure 14A:
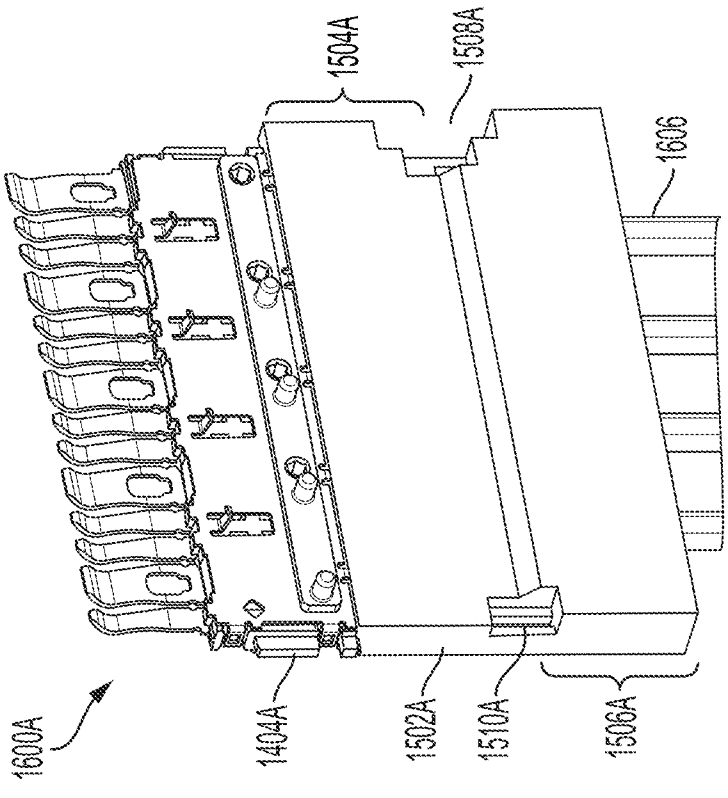
FIG. 14A is a perspective view of a Type-A cable IMLA in the dual IMLA cable assembly of FIG. 13A, according to some embodiments.
Figure 14D:
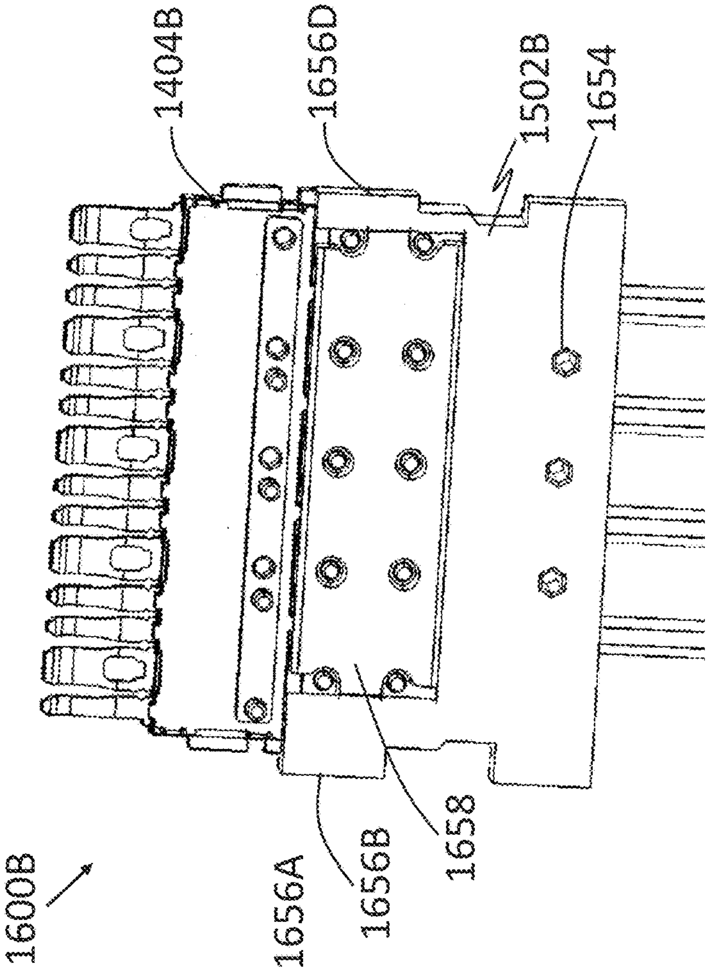
FIG. 14D is a perspective view of a Type-B cable IMLA in the dual IMLA cable assembly of FIG. 13A, according to some embodiments.
Figure 14C:
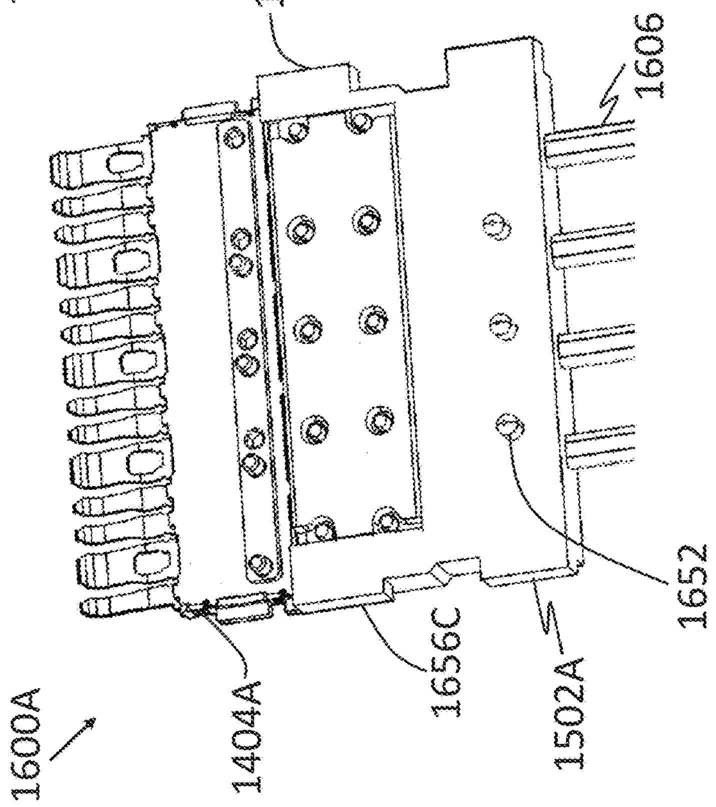
FIG. 14C is a perspective view of a Type-A cable IMLA in the dual IMLA cable assembly of FIG. 13A, according to some embodiments.

Perspective views of a Type-A leadframe cable assembly 1600A and a Type-B leadframe cable assembly 1600B in the dual IMLA cable assembly 1400 in accordance with the embodiments shown in FIGS. 13A-B are depicted in FIG. 14C and FIG. 14D respectively. FIG. 14A and FIG. 14B depict, in accordance with another embodiment, perspective views of a Type-A leadframe cable assembly 1600A and a Type-B leadframe cable assembly 1600B. Although two embodiments are described herein, the features described with respect to the embodiments may be used alone or in any suitable combination.

FIGS. 14A-D show the surfaces of the leadframe cable assemblies mounted against the core member (not shown). Each leadframe cable assemblies may include a cable IMLA 1404A or 1404B, terminated to multiple cables 1606 which, in the illustrated embodiments, may be drainless twinax cables such that signal conductors of the each twinax cable may be terminated to the tails of a pair of signal conductive elements within the cable IMLAs. In the illustrated embodiment, each cable IMLA may terminate as many twinax cables as there are pairs of signal conductive elements in the IMLAs.

A strain relief cable overmold may be applied to each cable IMLA. In the illustrated examples, an overmold 1502A or 1502B is applied to each of the cable IMLAs 1404A and 1404B. The strain relief overmolds 1502A and 1502B may include grommets (not shown) configured to apply appropriate pressure on cables 1606.

In the embodiments illustrated, overmolds 1502A and 1502B have complementary inner surfaces, but they are not the same to reduce the chances of an assembly error during assembly of a cable connector. Though both leadframe cable assemblies 1600A and 1600B are made with cable IMLAs that can efficiently be formed with the same tooling, once terminated and overmolded, the connector can only be assembled with leadframe cable assemblies 1600A and 1600B each on its appropriate side of the dual IMLA cable assembly 1400.

In the example illustrated in FIGS. 14A and 14B, stress relief overmold 1502A has a thinner upper portion 1504A than upper portion 1504B of stress relief overmold 1502B. Conversely, stress relief overmold 1502A has a thicker lower portion 1506A than lower portion 1506B of stress relief overmold 1502B. As a result, an attempt to assembly two of the same type leadframe cable assemblies into a dual IMLA cable assembly can be readily detected because the leadframe cable assemblies will not fit together.

In the example illustrated in FIGS. 14C and 14D, stress relief overmold 1502A has posts 1652 configured to extend towards a Type-B cable assembly 1600B, which may be attached to a same core member with the Type-A cable assembly 1600A. Conversely, stress relief overmold 1502B has holes 1654 configured to receive the posts 1652. The posts 1652 and holes 1654 may assist in keeping the leadframe cable assemblies 1600A and 1600B together, and also prevent two leadframe cable assemblies of the same type being assembled together.

Moreover, the overmolds 1502A and 1502B both have features to engage complementary features of the housing 1302 to enable insertion into the housing in only one orientation. In the example of FIGS. 14A and 14B, the overmolds 1502A and 1502B each have a larger opening 1508A and 1508B at the first end of the column of conductive elements. Overmolds 1502A and 1502B each have a smaller opening 1510A and 1510B at the second end of the column of conductive elements. The interior walls of the housing 1302 may have larger and smaller projections on opposite walls. These projections may be sized and positioned to engage with openings 1508A and 1508B and 1510A and 1510B only when the dual IMLA assemblies are inserted with a predetermined orientation.

In the example illustrated in FIGS. 14C and 14D, the stress relief overmolds 1502A and 1502B each have a bigger rib 1656A and 1656B at the first end of the column of conductive element. The stress relief overmolds 1502A and 1502B each have a smaller rib 1656C and 1656D at the second end of the column of conductive element. The interior walls of the housing 1302 may have larger and smaller recesses on opposite walls. These recesses may be sized and positioned to engage with ribs 1656A and 1656B and 1656C and 1656D only when the dual IMLA assemblies are inserted with a predetermined orientation.

The strain relief overmolds 1502A and 1502B may be configured to provide mechanical strength, and also electrical insulation by, for example, preventing molding material (e.g., plastic) from affecting the areas that the cables terminate to the conductive elements. Depending on the configurations of the cable IMLAs, the strain relief overmolds 1502A and 1502B may or may not fully cover the hoods

1658. In the example illustrated in FIGS. 14A, 14B, the hoods 1658 may be fully covered by the strain the relief overmolds 1502A and 1502B, and may not be visible from the outside of the cable IMLAs. In the example illustrated in FIGS. 13A, 13B, the hoods 1658 may include openings 1660, through which portions of the conductive elements and the cables and/or portions of the leadframe may be exposed. To prevent the molding material from entering through the openings 1660, the hoods 1658 may be partially surrounded but not fully covered by the strain relief overmolds 1502A and 1502B.

The cable IMLAs may be configured to terminate drainless cables such that the cables 1606 require no drain wires and the density of the connector is increased relative to an assembly with cables with drains. Features of the embodiment of FIGS. 14A-B and the embodiment of FIGS. 14C-D are described with respect to FIGS. 15A-E and FIGS. 15F-P, respectively. Although two embodiments are described herein, the features described with respect to the embodiments may be used alone or in any suitable combination.

Figure 15A:
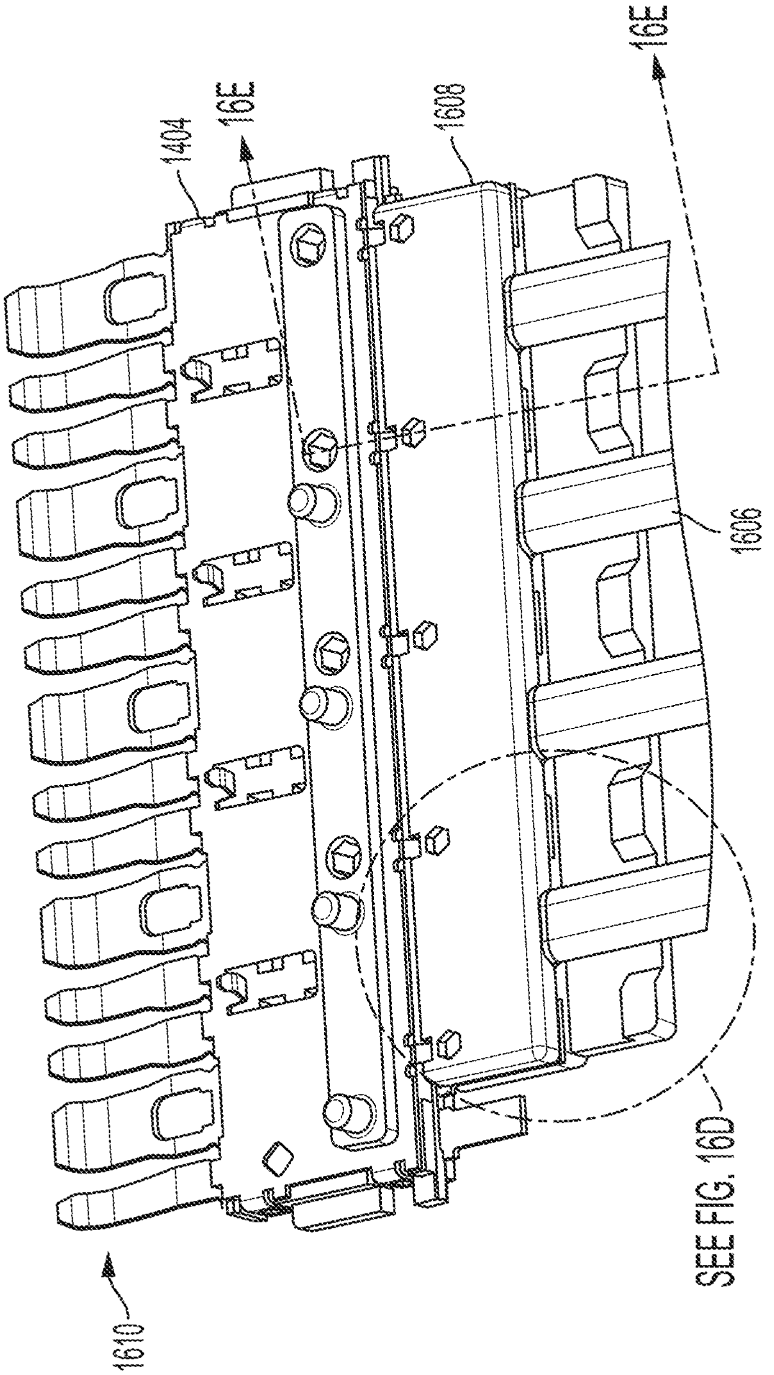
FIG. 15A is a perspective view of the Type-A cable IMLA of FIG. 14A without an IMLA housing, according to some embodiments.

FIG. 15A is a perspective view of the cable IMLA 1404 with cables terminated to it, prior to application of the overmolds, according to some embodiments. The cable IMLA 1404 may include a hood 1608 connected to the cable IMLA 1404, and holding cables 1606 to the cable IMLA 1404.

Figure 15C:
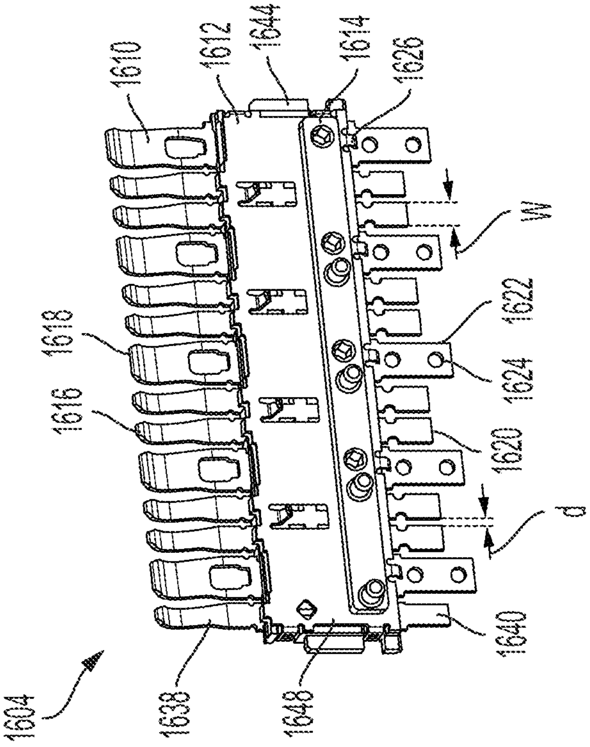
FIG. 15C is a perspective view of the Type-A IMLA of FIG. 15B without cables, according to some embodiments.
Figure 15B:
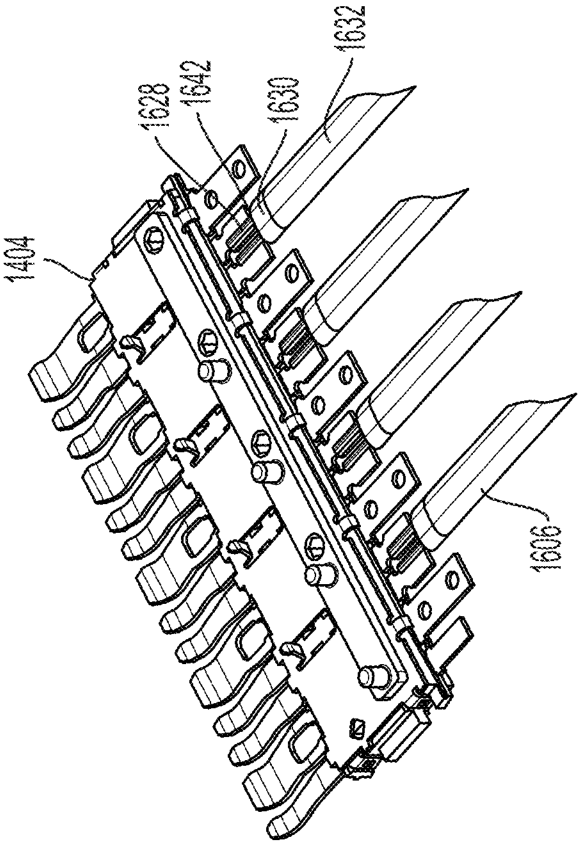
FIG. 15B is a perspective view of the Type-A cable IMLA of FIG. 15A without a hood, according to some embodiments.

FIG. 15B is a perspective view of the cable IMLA 1404 with wires, serving as signal conductors for the cables 1606, terminated to tails of signal conductive elements of IMLA 1404, without hood 1608 installed, according to some embodiments. Each cable 1606 includes one or more wires 1628 running through a cable insulator 1642, a shield member 1630, and a jacket 1632. The shield member 1630 may be a foil made of a conductive material, which may be wrapped around the cable insulator 1642. In the illustrated example, the cable 1606 includes a pair of wires 1628 configured for transferring a pair of differential signals. The wires 1628 may have a cross-sectional area depending on particular application for the cable connector 1300. Larger cross-sectional area leads to lower signal attenuation per unit length of cable. Each wire 1628 may be attached at a conductive joint to a tail of a signal conductive element.

Figure 15E:
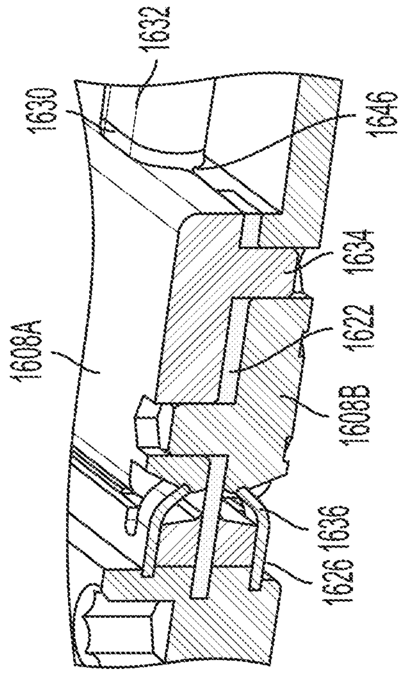
FIG. 15E is a cross-sectional view along line 16E-16E in FIG. 15A, according to some embodiments.
Figure 15D:
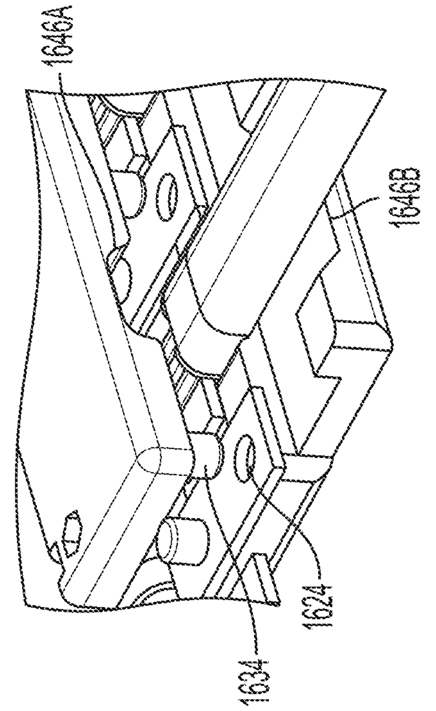
FIG. 15D is an exploded view of a portion of the Type-A cable IMLA within the circle marked as "16D" in FIG. 15A, according to some embodiments.

FIG. 15C depicts a perspective view of the leadframe assembly 1604, according to some embodiments. FIG. 15D depicts an exploded view of a portion of the leadframe cable assembly 1600A within the circle marked as "15D" in FIG. 15A, according to some embodiments. FIG. 15E depicts a cross-sectional view along line 16E-16E in FIG. 15A, according to some embodiments.

The leadframe assembly 1604 may include a column of conductive elements 1610 overmolded with insulative material 1644, and ground plates 1612 attached to each side of the insulative material. Lossy material bars 1614 may be selectively overmolded on the ground plates 1612, both mechanically securing the ground plates 1612 and dampening high frequency signals that might otherwise exist on the ground plates 1612. The column of conductive elements 1610 may include signal conductive elements 1616 and ground conductive elements 1618. Each of the conductive elements 1610 may include a mating end 1638, a tail, here shaped as a tab 1640 opposite the mating end, and an intermediate portion extending between the mating end 1638 and the tab 1640. The intermediate portion may be substantially surrounded by the insulative material 1644. The mating end 1638 and the tab 1640 may extend outside the insulative material 1644. In some embodiments, the portion of the leadframe assembly 1604 that is above the lossy material bar 1614 may be configured similar to the leadframe assembly 706 of the header connector 700. The lossy material bar 1614 may be configured similar to the lossy material bar 1006 of the header connector 700.

A signal conductive element 1616 may include a tab 1620 configured to have a wire of a cable attached. The tabs 1620 may be configured to receive cables in a range of sizes including, for example, from AWG 26 to AWG 32. The wire may be attached to the tab by, for example, welding, brazing, compression fitting, or in any suitable manner. In the illustrated example, the tabs 1620 of a pair of conductive elements 1616 are attached to respective wires 1628 of the pair of the cable 1606. The spacing between wires of the pairs within cables 1606 may be selected to provide a desired impedance in the cable such as 50 Ohms, 85 Ohms, 95 Ohms or 100 Ohms, or 120 Ohms, in some embodiments. Generally, smaller diameter wires may be spaced, center to center, by a smaller amount than larger wires to provide a desired impedance.

The tabs 1620 of a pair of conductive elements 1616 may be spaced from each other by a distance d that ensures the narrowest wires in the range to fit on the tab. The tabs 1620 may have a width w that ensures the widest wires in the range to fit on the tab. The cable insulator 1642 may extend beyond the shield member 1630 such that the cable insulator 1642 separates the tabs 1620 from the shield member 1630 and provide isolation therebetween. In some embodiments, the dimension d may be in the range of 0.02 mm to 2 mm, and the dimension w may be in the range of 2 mm to 5 mm.

In embodiments in which a cable IMLA 1404 includes single ended signal conductive elements, those single-ended signal conductive elements may be unused when cables with pairs of signal conductors are terminated to the IMLA. Alternatively, the single-ended signal elements may be connected to single wires or a wire of a cable with two or more wires.

A ground conductive element 1618 may include a tab 1622 configured to have the hood 1608 attached. In this example, each of the tabs 1622 of a ground conductive element has holes that facilitate connection to hood 1608. The hood 1608 may be conductive. In some embodiments, the hood 1608 may be formed of die cast metal. The hood 1608 may include projections 1634 and openings 1646. The tab 1622 may include openings 1624 configured to receive the projections 1634 of the hood 1608. The projections 1634 of the hood 1608 may pass through the openings 1624 of the tab 1622. The hood 1608 may make electrical connection with the tab 1622, for example, at the locations of the projections 1634 and/or in other locations at which hood 1608 presses against the tab 1622.

The hood 1608 also may make electrical connection with the shield member 1630 of the cable 1606 at the locations of the openings 1646 such that the ground conductive elements 1618 are electrically coupled to the shield member 1630 of the cable 1606 through the hood 1608. In preparation for terminating a cable to a cable IMLA, a portion of jacket 1632 may be removed near the end of the cable. The shield member 1630 of the cable 1606 may extend beyond the jacket 1632 of the cable 1606 such that the hood 1608 may make contact with the shield member 1630 at the portions extending beyond the jacket 1632.

In the illustrated example, the hood 1608 include two portions 1608A and 1608B. Cables 1606 may be held between the two portions 1608A and 1608B. The hood portions 1608A and 1608B are pressed onto tabs 1622 from opposite sides. The hood portions 1608A and 1608B include projections 1634 that are inserted into the openings 1624 of the tab 1622 from opposite directions. After passing through tab 1622 the two portions 1608A and 1608B may be secured to each other, thus holding the tabs 1622 in place. In this example, portions 1608A and 1608B are secured to each other via an interference fit. A projection from one of the portions 1608A or 1608B enters an opening 1624 in the portion. As can be seen in the examples of FIGS. 15D and 15E, the holes are of a different shape than the projections such that, upon forcing a projection into the hole, it may become jammed in place. Alternatively or additionally, other attachment mechanisms may be used.

The hood portions 1608A and 1608B include openings 1646A and 1646B, respectively, that are arranged in pairs. The pairs of the openings 1646A and 1646B may be positioned such that they align when hood portions 1608A and 1608B are secured to each other. A cable may pass through the combined opening of openings 1646A and 1646B such that hood portions 1608A and 1608B squeeze the cable 1606 between hood portions 1608A and 1608B. As a result, hood portions 1608A and 1608B press against shield members 1630 of individual cables 1606, both making electrical contact between the shield members 1630 and hood 1608.

In the illustrated embodiment, hood 1608 is also electrically connected to ground plates 1612 attached to each side of each cable IMLA 1404. The ground plate 1612 may include a body 1648 extending substantially in parallel to the column of conductive elements 1610, and tabs 1626 extending from the body 1648. The tabs 1626 may be configured to make electrical connection with the hood 1608 and/or tails of ground conductive elements to which hood 1608 is attached. The tabs 1626 may include contact portions 1636, which may bend towards the column of conductive elements 1610. The contact portions 1636, for example, may be configured as compliant beams that press against ramped surfaces when the two portions of the hood are brought together.

In the illustrated example, the leadframe assembly 1604 includes two ground plates 1612 attached to opposite sides of the column of conductive elements 1610. The tabs 1626 of the two ground plates 1612 may be arranged in pairs. Each pair of the tabs 1626 may be aligned with a tab 1622 of a ground conductive element 1618 in a direction substantially perpendicular to a column direction that the column of conductive elements 1610 aligns. The contact portions 1636 of the tabs 1626 may make contact with the hood 1608 such that the ground plates 1612 are electrically connected to the ground conductive elements 1618 and the shield member 1630 of the cable 1606 through the hood 1608. The inventors found that this configuration simply and reliable completes a ground path that reduces in-column cross talk for the column of conductive elements 1610.

Figure 15G:
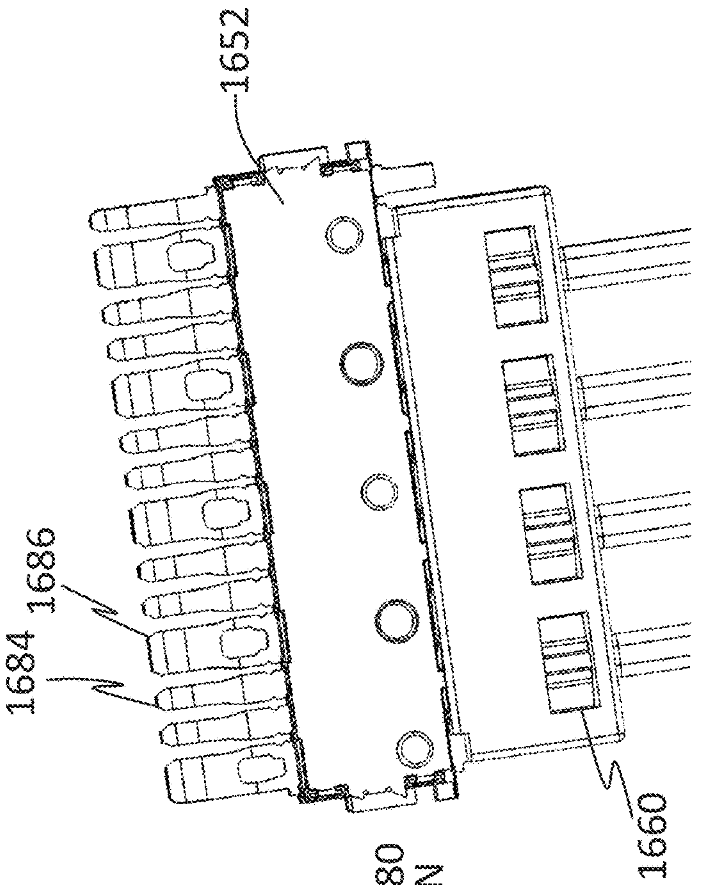
FIG. 15G is a perspective view of the Type-A cable IMLA of FIG. 15F, showing a side facing away from the core member, according to some embodiments.
Figure 15F:
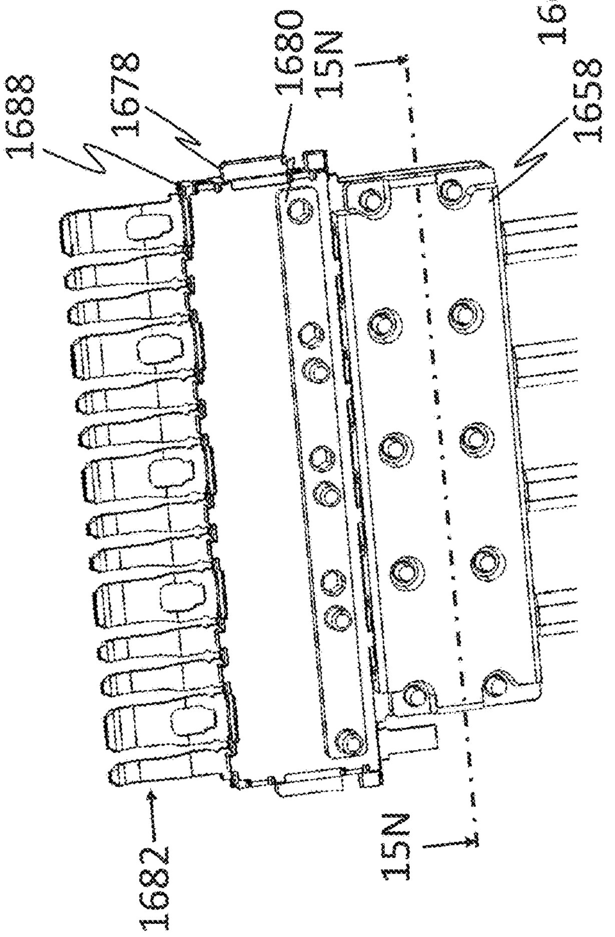
FIG. 15F is a perspective view of the Type-A cable IMLA of FIG. 14C without an IMLA housing, showing a side facing towards a core member, according to some embodiments.

As discussed above, features of the embodiment of FIGS. 14C-D are described with respect to FIGS. 15F-P. FIG. 15F and FIG. 15G are perspective views of a cable IMLA 1688 with cables 1606 terminated to it, prior to the application of the overmolds, respectively showing sides facing towards a core member and away from the core member, according to some embodiments. The cable IMLA 1688 may include a hood 1658 connected to the cable IMLA 1688, and holding the cables 1606 to the cable IMLA 1688.

Similar to the cable IMLA 1404, the cable IMLA 1688 may include a column of conductive elements 1682, which may include signal pairs 1684 separated by ground conductive elements 1686. Intermediate portions of the conductive elements 1682 may be selectively overmolded with insulative material 1678. Ground plates 1652 may be disposed on opposite sides of the column of conductive elements 1682 and separated from the signal pairs 1684 by the insulative material 1678. The cable IMLA may include a lossy material bar 1680, which may be configured similar to the lossy material bar 1614.

Figure 15I:
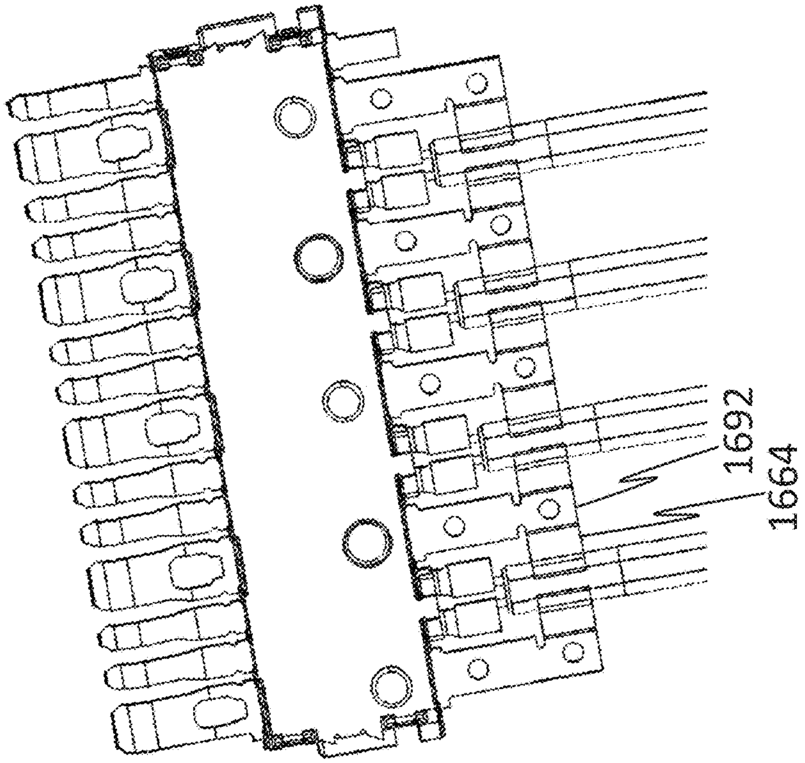
FIG. 15I is a perspective view of the Type-A cable IMLA of FIG. 15H, showing the side facing away from the core member, according to some embodiments.
Figure 15H:
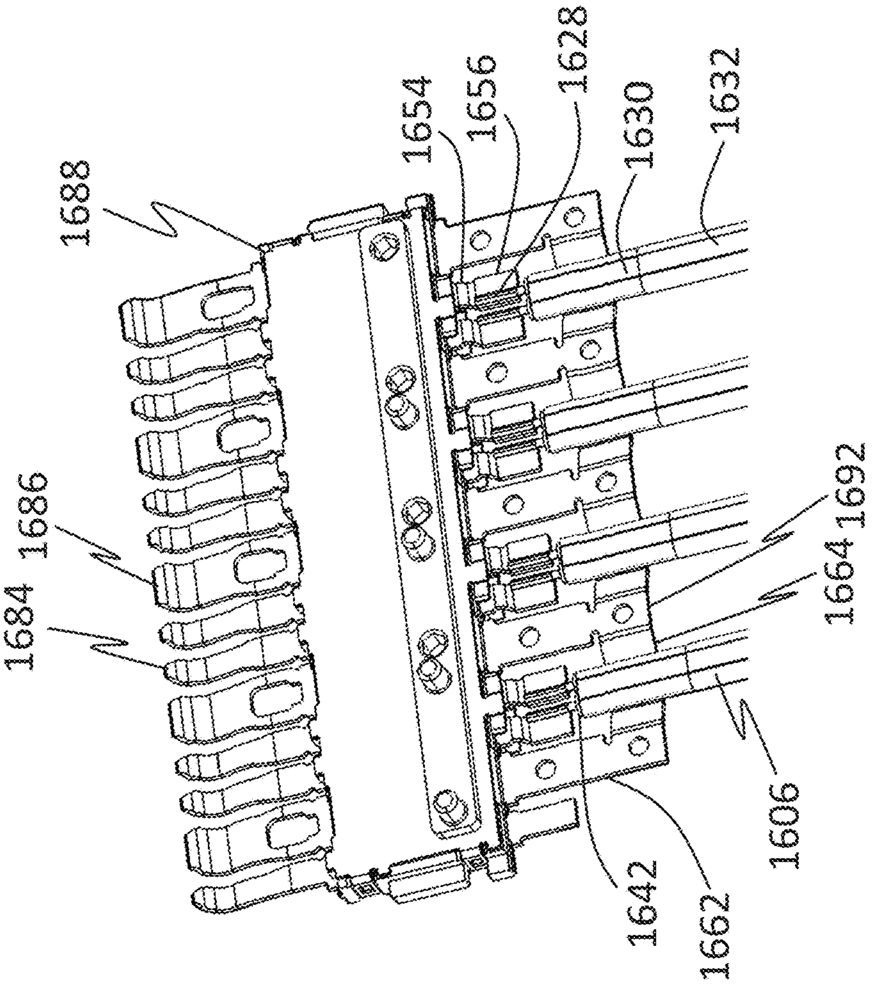
FIG. 15H is a perspective view of the Type-A cable IMLA of FIG. 15F without a hood, showing the side facing towards the core member, according to some embodiments.
Figure 15K:
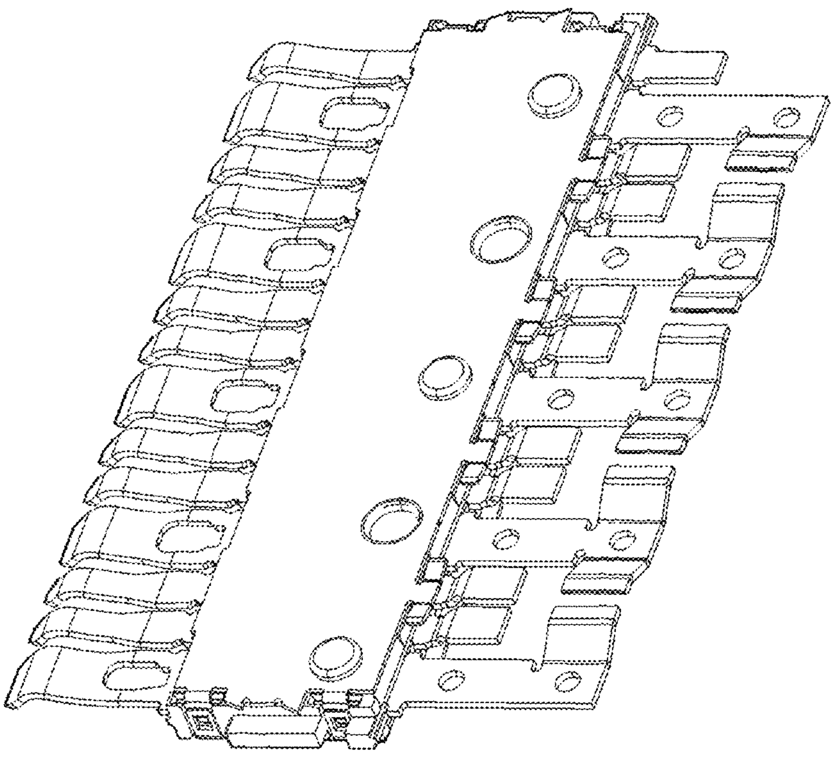
FIG. 15K is a perspective view of the Type-A cable IMLA of FIG. 15J, showing the side facing away from the core member, according to some embodiments.
Figure 15J:
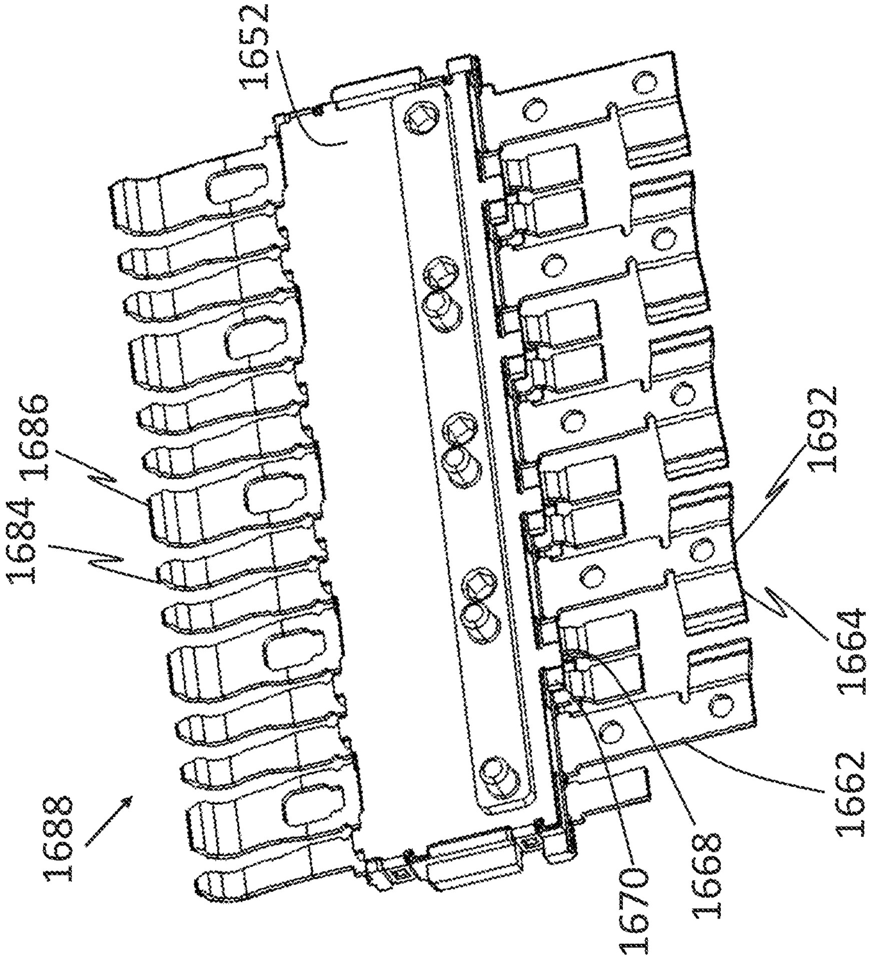
FIG. 15J is a perspective view of the Type-A cable IMLA of FIG. 15H without cables, showing the side facing towards the core member, according to some embodiments.
Figure 15M:
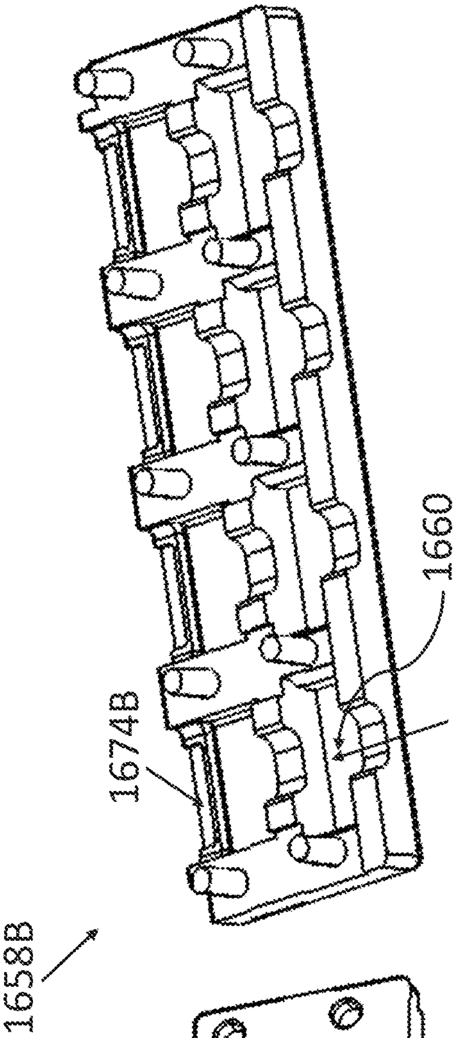
FIG. 15L and FIG. 15M are perspective views of members 1658A and 1658B, respectively, of the hood of FIG. 15F, showing the sides of the members facing cable attachments, according to some embodiments.
Figure 15L:
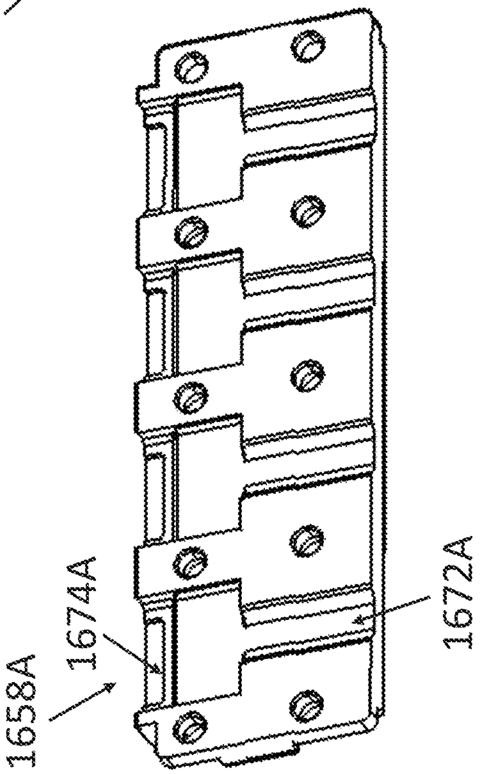
Figure 15N:
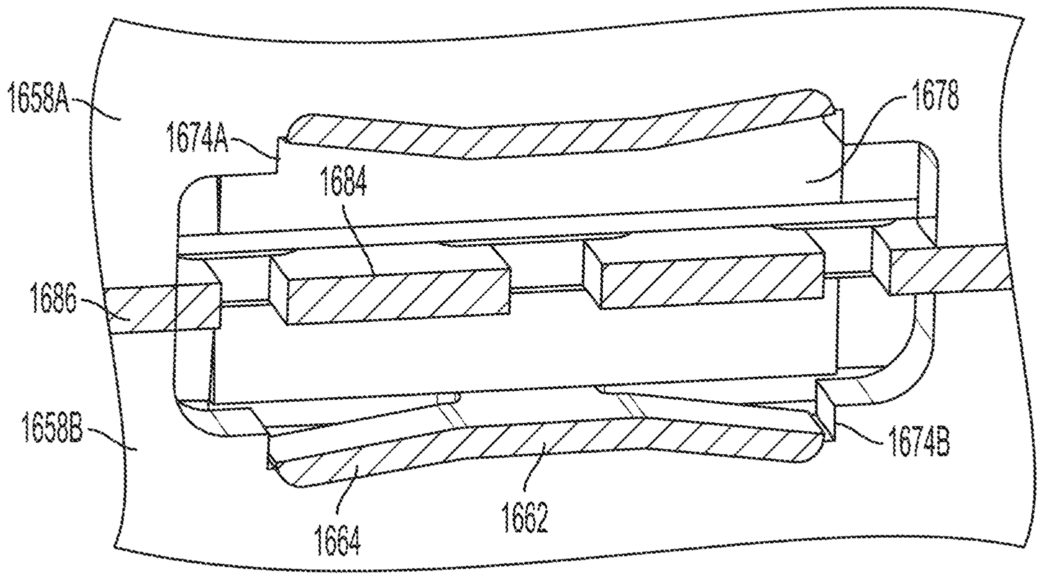
FIG. 15N is a perspective view of a portion of the Type-A cable IMLA of FIG. 15F, partially cut away along the line marked "15N-15N," showing tabs 1662 in a deflected state, according to some embodiments.
Figure 15P:
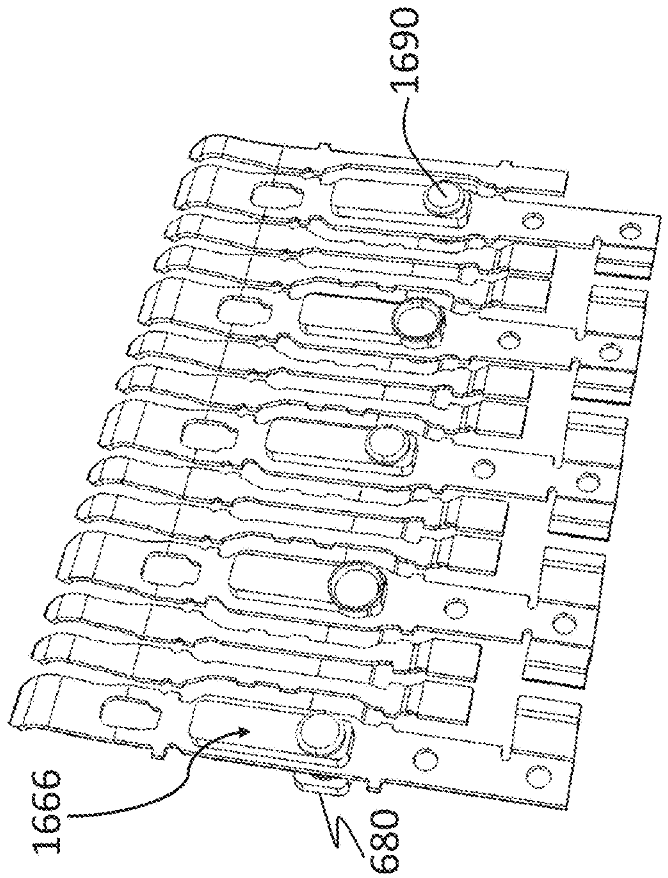
FIG. 15P is a perspective view of the Type-A cable IMLA of FIG. 15O, showing the side facing away from the core member, according to some embodiments.
Figure 15O:
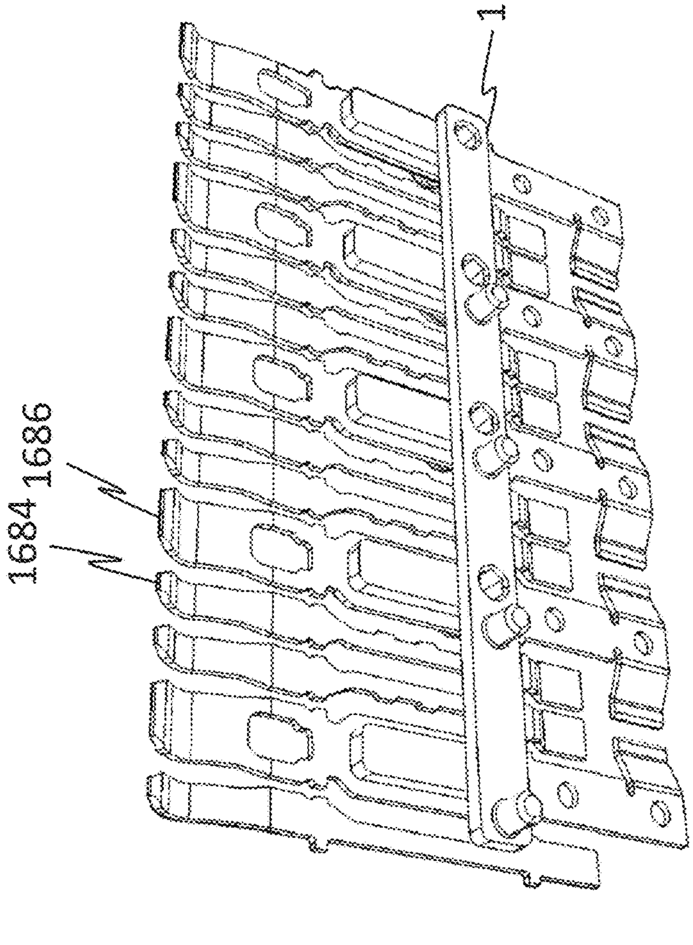
FIG. 15O is a perspective view of the Type-A cable IMLA of FIG. 15J without insulative material and ground plates, showing the side facing towards the core member, according to some embodiments.

FIG. 15O and FIG. 15P are perspective views of the IMLA 1688, with insulative material and ground plates removed, respectively showing sides facing towards and away from the core member. As illustrated, the ground conductive elements 1686 may include openings 1666, which may be free of the insulative material 1678 such that the lossy material bar 1680 may hold onto the ground conductive elements 1686 through the openings 1666. Portions 1690 of the lossy material bar 1680 may close gaps between the ground plates 1652 on opposite sides of the column of conductive elements, and form enclosures that substantially surround respective signal pairs 1684. Such configuration reduces crosstalk.

FIG. 15H and FIG. 15I are perspective views of the IMLA 1688 with wires 1628, serving as signal conductors for the cables 1606, terminated to tails of signal conductive elements 1684, without the hood 1658 installed. FIG. 15J and FIG. 15K are perspective views of the IMLA 1688, respectively showing the sides facing towards a core member and away from the core member.

Tails of the signal conductive elements 1684 may include transition portions 1654, which may jog away from the core member. Such transition portions 1654 enable tabs 1656 extending from the transition portions 1654 to be parallel to but offset from a plane, along which the intermediate portions of the column of conductive elements 1682 may extend. As a result, wires 1628 attached to the tabs 1656 may be substantially on the plane of the intermediate portions of the column of conductive elements 1682. This may reduce impedance discontinuity along signal conduction paths.

Ground conductive elements 1686 may be configured for making a direct electrical connection to the shields of cables, such as by spring force. In some embodiments, tails of the ground conductive elements 1686 may include tabs 1662, which may extend beyond the tabs 1656 of the signal conductive elements 1684. Beams 1664 may extend from end portions 1692 of the tabs 1662 and curve away from the core member. When the wires 1628 are attached to the tabs 1656 of the signal conductive elements 1684, the beams 1664 may be adjacent and/or contact the shield members 1630 that surround respective wires 1628. The beams 1664 of the ground conductive elements 1686 may be configured to be deflected against the shield members 1620 when the hood 1658 are installed. Hood 1658 here is made of two hood pieces 1658A and 1658B, which are joined, pinching tabs 1692 between them. The inner surfaces of hood pieces 1658A and 1658B may be contoured such that, when pressed together, they press on tabs 1692 so as to press beams 1664 against the shield members 1630 of the cables, generating a spring force that aids in providing reliable connections between the ground conductors and the cable shield members 1630. Both the hood portions and the strain relief overmolds may be formed with openings that enable the beams 1664 to move in operation, providing this spring force.

The ground plates 1652 may include tabs 1668 extending between adjacent ground tabs 1662. The ground plates 1652 may include beams 1670 extending from the tabs 1668 in a column direction that the column of conductive elements 1682 may extend. The beams 1670 of a ground plate 1652 that face towards the core member may curve towards the core member. Conversely, the beams 1670 of a ground plate 1652 that face away from the core member may curve away from the core member.

The hood 1658 may be configured to electrically connected to the ground conductive elements 1686 and the ground plates 1652 so as to provide shielding at the attached interface for the cables and conductive elements and reduce crosstalk. FIG. 15L and FIG. 15M are perspective views of two portions 1658A and 1658B of the hood 1658, showing sides facing cable attachments. FIG. 15N is a perspective view of a portion of the leadframe assembly 1688, partially cut away along the line marked "15N-15N" in FIG. 15F.

As illustrated, the hood portions 1658A and 1658B may include compression slots 1672A and 1672B, respectively, that are arranged in pairs. The pairs of the compression slots 1672A and 1672B may be positioned such that they align when the hood portions 1658A and 1658B are secured to each other. A cable may pass through the combined slot of the compression slots 1672A and 1672B such that the shield members 1630 are squeezed by the surfaces of the compression slots 1672A and 1672B. The hood portion 1658B may include the openings 1660 corresponding to each compression slot 1672B such that the beams 1664 of the ground conductive elements 1686 may flex at least partially in respective openings 1660. The hood portions 1658A and 1658B may include recesses 1674A and 1674B, respectively. The beams 1670 of the ground plates 1652 may be held in the recesses 1674A and 1674B and deflect against respective hood portions when the hood portions are secured to each other, making electrical connections among the hood, ground plates, ground conductors of the IMLAs and cable shields.

The inventors have recognized and appreciated techniques for simply and effectively creating conducting paths between shields within a connector and ground structures within a printed circuit board to which the connector is mounted. These techniques may improve high frequency performance of the interconnection system as a result of reducing or eliminating discontinuities that might otherwise be created when signal conductive elements and internal shields transition from a body of a connector to a mounting surface of a printed circuit board (PCB). For example, discontinuities may be created as a result of a gap between the mounting ends of the internal shields of the connector and the top surface of the PCB. Such a discontinuity in the ground structure may disrupt current in the ground conductor that serves as a reference for a signal conductor, which can lead to a change in impedance which, in turn, causes signal reflections or enables mode conversions or can otherwise reduce signal integrity. The gap may provide clearance for component despite variability that may result from manufacturing tolerances. With higher transmission speeds, such discontinuities in the ground return path may reduce the integrity of signals passing through the connector.

Designs for compliant shields as described herein, in conjunction with the connector and PCB to which the connector is mounted, may simply and efficiently provide current paths between the internal shields within the connector and ground structures in the PCB. These paths may run parallel to current flow paths in signal conductors passing from the connector to the PCB. In some embodiments, the compliant shields may simply integrate lossy material into the mounting interface, which may further improve high frequency performance of the connector.

In an uncompressed state, the compliant shield may have a first thickness. In some embodiments, the first thickness may be about 20 mil, or in other embodiments between 10 and 30 mils. In some embodiments, the first thickness may be greater than the gap between the mounting end of the internal shields of the connector and the mounting surface of the PCB. Because the first thickness of the compliant shield is greater than the gap, when the connector is pressed onto a PCB engaging the contact tails, the compliant conductive member is compressed by a normal force (a force normal to the plane of the PCB). As used herein, "compression" means that the material is reduced in size in one or more directions in response to application of a force. In some embodiments, the compression may be in the range of 3% to 40%, or any value or subrange within the range, including for example, between 5% and 30% or between 5% and 20% or between 10% and 30%, for example. Compression may result in a change in height of the compliant shield in a direction normal to the surface of a printed circuit board (e.g., the first thickness).

In some embodiments, the compliant shield may extend from internal shields of the connector, for example, the mounting interface shielding interconnect 214 described above.

In some embodiments, the compliant shield may include structures that are fully or partially conductive (e.g. lossy conductors) configured to electrically contact internal shields within the connector. In some embodiments, the compliant shield may include a plurality of openings configured for contact tails of the connector to pass therethrough. In some embodiments, at least a portion of the openings may be sized and shaped to receive an organizer configured to provide contact tail alignment and isolate the compliant shield from the signal conductors (e.g., the organizer 210). In some embodiments, at least a portion of the openings may be sized and shaped to adapt for the internal shields of the connector, which may jog away from signal conductive elements when exiting the connector such that signal vias and ground vias on the PCB are not shorted.

In some embodiments, the compliant shield may be stamped or otherwise formed from a sheet of a conductive material and/or may include such a conductive member. In some embodiments, such a conductive member may include contact members, each extending from a side of a respective opening and substantially perpendicular to the mounting interface. Each contact member may contact a respective internal shield of the connector along a contact line. In some embodiments, the compliant shield may include columns of contact beams between columns of conductive elements of the connector. In some embodiments, the contact beams may be cantilever beams. In some embodiments, the contact beams may be torsional beams and may have a chevron shape, for example.

In some embodiments, the compliant shield may include first contact beams curving toward leadframe assemblies to contact internal shields of the connector and second contact beams curving away from the leadframe assemblies such that the second contact beams contact ground planes of a PCB when the connector is mounted to the PCB.

In some embodiments, the compliant shield may be formed from or include a compliant material. In some embodiments, the compliant shield may include extensions projecting into the openings so as to make contact with surfaces of internal shields of the connector. In some embodiments, the compliant shield may include slits configured to allow ground contact tails to pass through while making contact with the compliant shield. In some embodiments, a reduction in a thickness of a compliant shield may result from forces applied to compliant structures of the compliant shield.

Figure 16B:
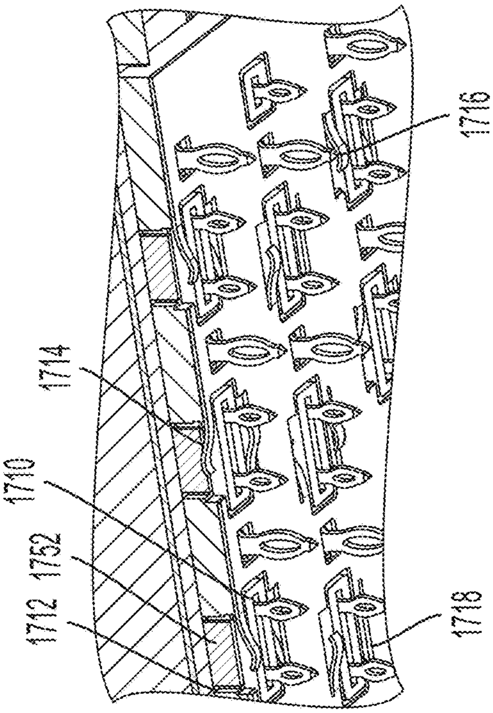
FIG. 16B is an enlarged view of the region marked "X" in FIG. 16A, according to some embodiments.
Figure 16A:
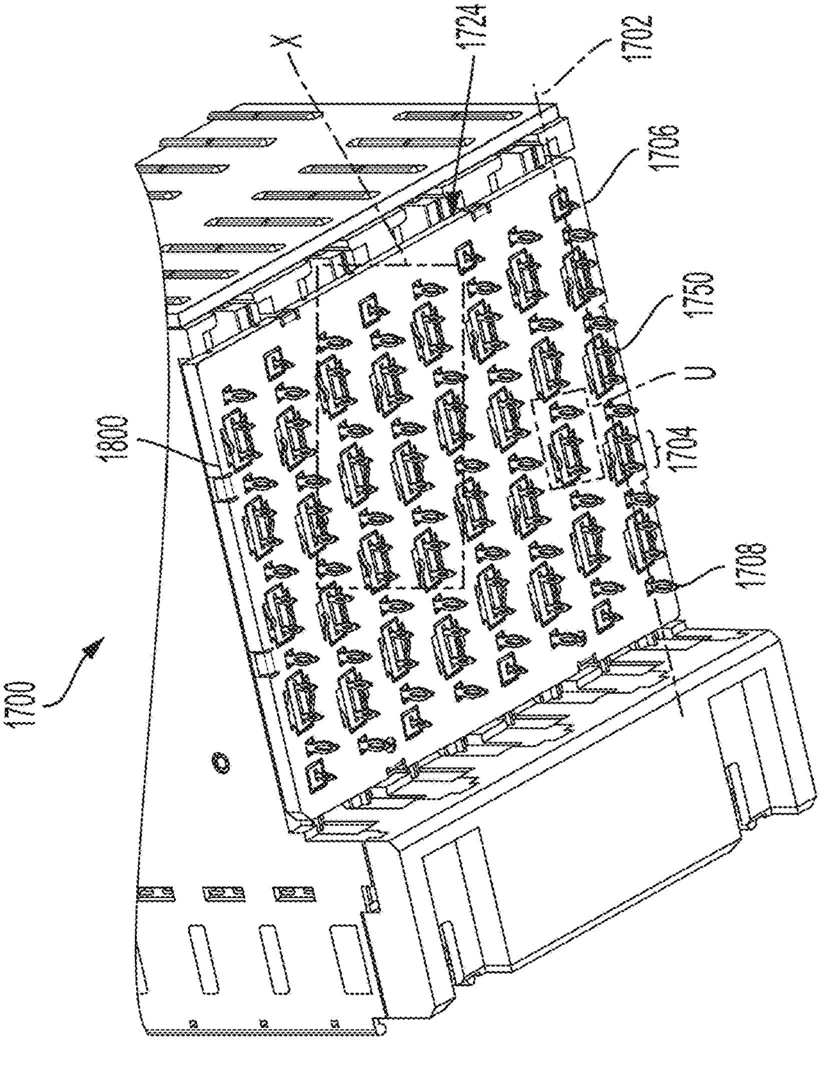
FIG. 16A is a perspective view of a mounting interface of a right angle connector, according to some embodiments.
Figure 17B:
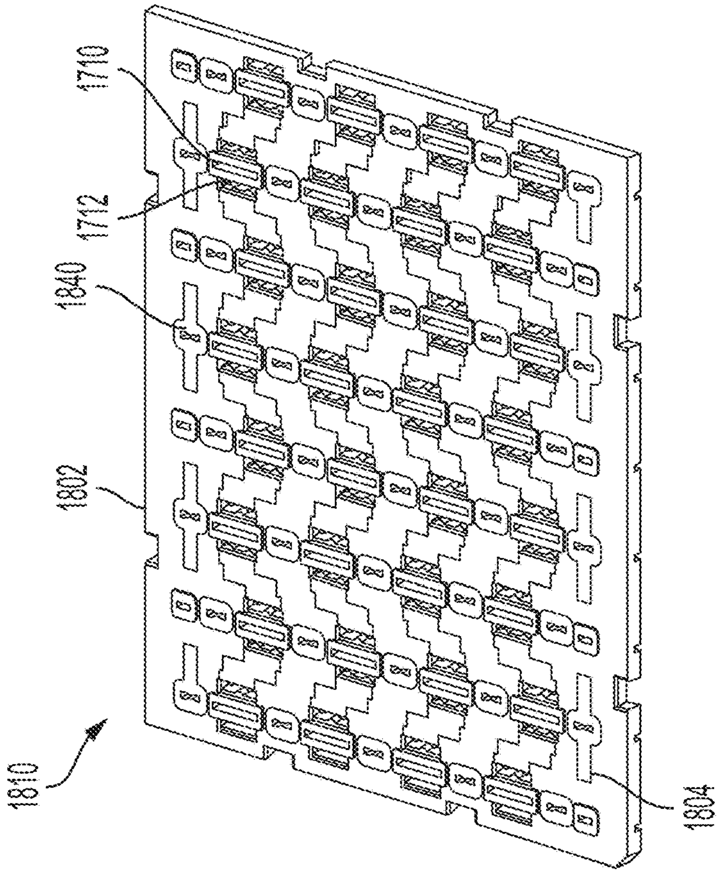
FIG. 17B is a perspective view of the organizer of FIG. 17A, without the compliant shield, according to some embodiments.
Figure 17A:
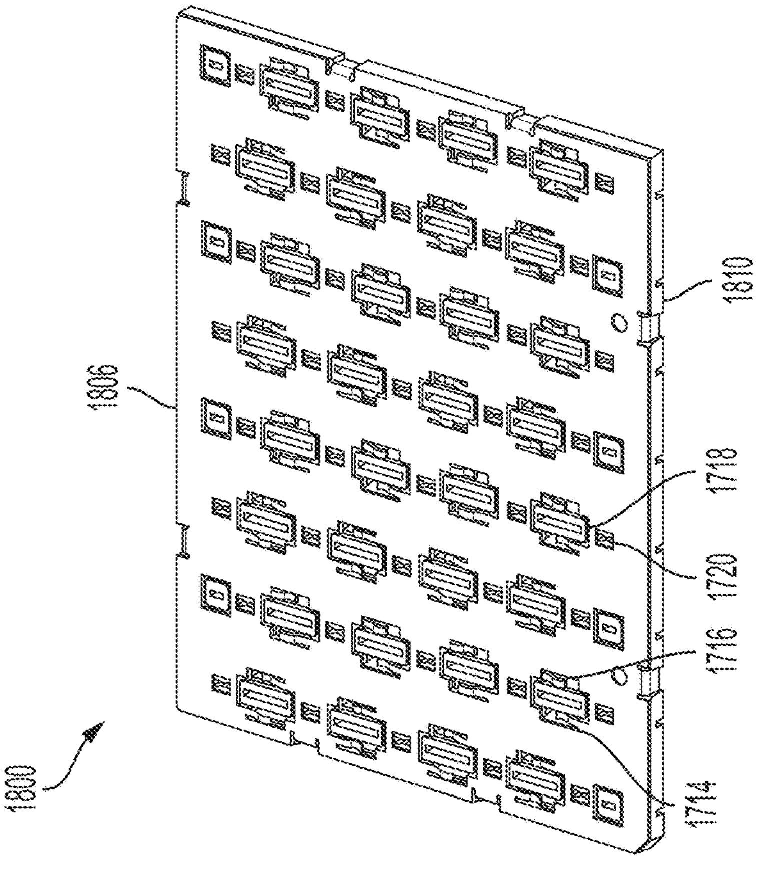
FIG. 17A is a perspective view of an organizer assembly of the connector of FIG. 16A comprising a compliant shield and an organizer, according to some embodiments.
Figure 17D:
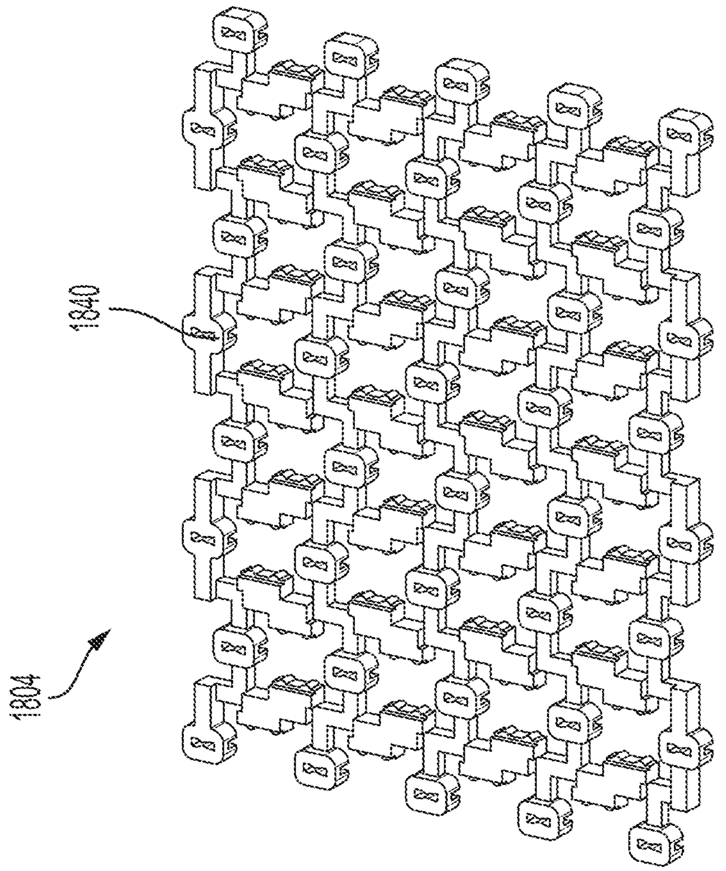
FIG. 17D is a perspective view of a second, lossy portion of the organizer of FIG. 17B, according to some embodiments.
Figure 17C:
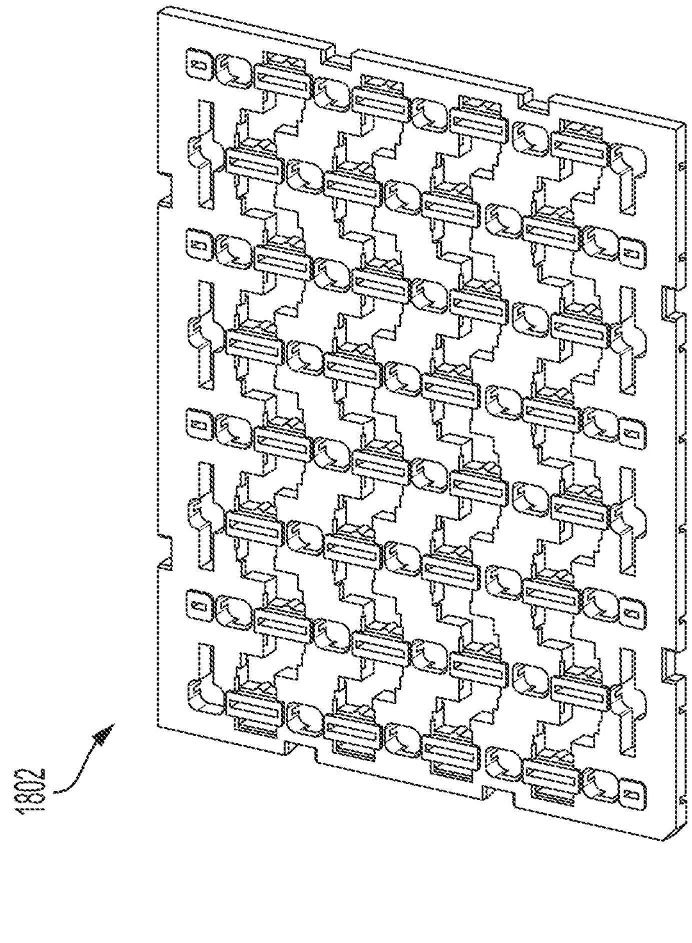
FIG. 17C is a perspective view of a first, insulative portion of the organizer of FIG. 17B, according to some embodiments.

FIG. 16A is a perspective view of a mounting interface 1724 of a right angle connector 1700, according to some embodiments. Connector 1700 may be constructed using techniques as described above in connection with connector 200. FIG. 16B depicts an enlarged view of the region marked "X" in FIG. 16A, according to some embodiments. In the illustrated embodiments, connector 1700 includes an organizer assembly 1800, which may include an organizer 1810 and a compliant shield 1806. FIG. 17A depicts a surface of the organizer assembly configured to face a PCB. FIGS. 17B-17D depict an exemplary embodiment of the organizer 1810. FIG. 17B depicts the flat surface of the organizer 1810. In the illustrated example, the organizer 1810 includes a first part 1802 and a second part 1804. The first part 1802 may be insulative and may provide isolation among signal contact tails. The second part 1804 may be a lossy conductor and may provide interconnection among ground contact tails and/or ground shields.

It should be appreciated that FIGS. 17C and 17D depict the first part 1802 and second part 1804 as separate parts for purpose of showing each part. In some embodiments, the first part 1802 and second part 1804 may be made separately and then assembled together. In other embodiments, the first part 1802 may be molded by a first shot of non-conductive material. The first part 1802 may include openings for the second part which are filled in a second shot of a molding operation, enabling different materials to be used for the first part and the second part. In some embodiments, the second part may be molded over the first part 1802 by a second shot of conductive material and/or lossy material. Likewise, compliant shield 1806 is illustrated as a separate sheet of metal, which may then be attached to organizer 1810 such as by tabs or clips. Alternatively or additionally, the insulative and/or lossy portions of organizer 1810 may be molded onto compliant shield 1806.

As shown in FIG. 16A, connector 1700 may include contact tails 1750 aligned along columns 1702. A column of contact tails may extend from a leadframe assembly (e.g., leadframe assemblies 206A, 206B). In the illustrated example, the contact tails are aligned along eight columns, which is a non-limiting example. A column of contact tails may include pairs of differential signal contact tails 1704 separated by ground contact tails 1708. A column of contact tails may include one or more single signal contact tail 1706. In the illustrated embodiment, the contact tails have edges and broadsides. The tails are aligned edge-to-edge along the columns such that the tails of the differential signal contacts form edge-coupled pairs. Also in the illustrated embodiment, the tails of the ground conductive elements are larger than those of the signal conductive elements.

Further, the mounting interface of the connector may include shielding interconnects 1752, which may extend from the IMLA shields. In this embodiment, the shielding interconnects are tabs projecting from a lower edge of the IMLA shields. The shielding interconnects in this embodiment do not include compliant members. Nonetheless, the shielding interconnects may be connected to a ground structure on a surface of a printed circuit board to which the connector is mounted through a compliant shield 1806, which may make connections to the shielding interconnects 1752 and a ground structure on a surface of the printed circuit board.

The first part 1802 of organizer 1810 may include openings 1710 configured for contact tails 1750 to pass therethrough. First part 1802 may be insulative and the openings 1710 may be aligned with contact tails of signals conductive elements that are electrically isolated as they pass through organizer 1810. Second part 1804 may have openings 1840 therethrough. Second part 1804 may be lossy and openings 1840 may be aligned with contact tails of ground conductive elements such that the ground conductive elements are electrically coupled as they pass through organizer 1810.

Organizer 1810 may include slots 1712. Some or all of the slots 1712 may be aligned with shielding interconnects 1752. Shielding interconnects 1752 may extend into slots 1712, but in the illustrated embodiment, do not extend through slots 1712. In the illustrated embodiment, slots 1712 are formed between the first part 1802 and the second part 1804 such that the slots 1712 share a wall from the first part 1802 with a respective opening 1710 such that shielding interconnects 1752 are isolated from signal contact tails passing through the opening 1710. The slot 1712 may have an opposite wall from the second part 1804 of the organizer 1800 such that the shielding interconnects 1752 may be coupled to ground contact tails through the second part 1804.

The compliant shield 1806 may include openings 1718 configured for contact tails 1750 of signal conductive elements and openings 1720 configured for contact tails of ground conductive elements to pass therethrough. In the embodiment illustrated, openings 1710 are bounded by a raised lip, which extends through openings 1718. Opening 1718 may be sized and positioned to expose slots 1712 of the organizer such that shielding interconnects 1752 may pass through the compliant shield into the organizer.

The compliant shield may include structures that couple the IMLA shields to ground. In the illustrated embodiment, this coupling is made by connecting, through the compliant shield, shielding interconnects 1752 to a ground structure on a printed circuit board to which the connector 1700 is mounted. Such connections may be made through first contact beams 1714 curving toward the leadframe assemblies so as to contacting shielding interconnects 1752, thereby making connections to the IMLA shield 502. The compliant shield 1806 may include second contact beams 1716 curving away from the leadframe assemblies and configured to contact ground planes of a PCB (e.g., daughter card 102). The first and second contact beams 1714 and 1716 may have a length, which extends in parallel to a direction that the columns extend. The contact beams 1714 and 1716 may align with slots 1712 such that when connector 1700 is pressed onto a printed circuit board, the beams may deflect into slots 1712. The contact beams 1714 and 1716 enable connections between the internal shields of a connector, such as the IMLA shields, and a ground plane on a surface of a printed circuit board without contact tails extending from the internal shields. Such a configuration enables a compact PCB footprint.

Figure 18:
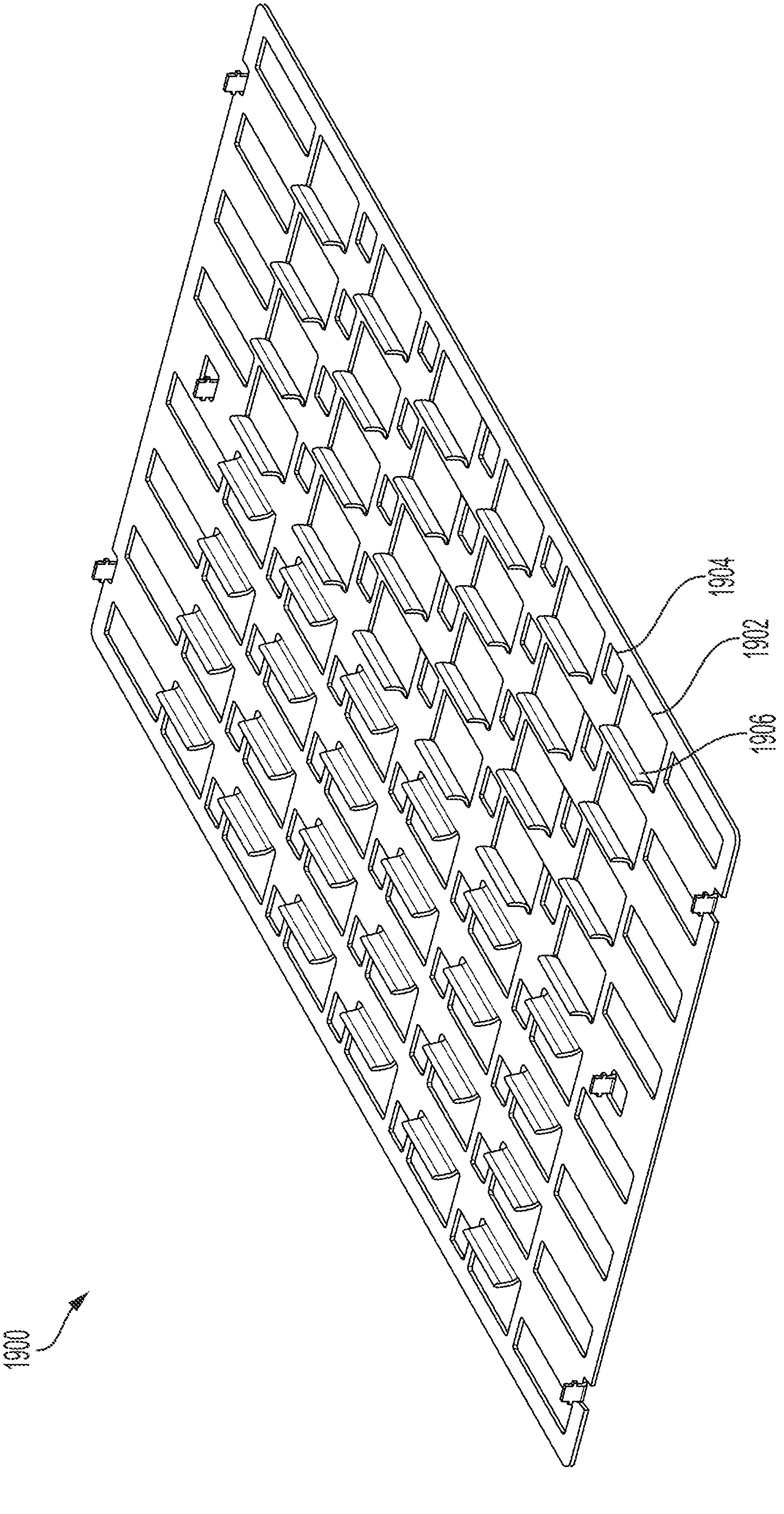
FIG. 18 is a perspective view of an alternative compliant shield of the organizer assembly of FIG. 17A, according to some embodiments.

FIG. 18 depicts a perspective view of an alternative shield 1900, which may be used as part of an organizer assembly, according to some embodiments. FIG. 19A depicts a perspective view of a portion of a mounting interface of a connector with a compliant shield 2000, according to some embodiments. In this example, the connector has columns of signal and ground contact tails exposed at the mating interface. The contact tails may have the same pattern described above for connector 1700. The IMLA shields 502 also include shielding interconnects 1926 extending from a lower edge. As illustrated, there may be a gap g between an end of the shielding interconnects 1926 and a plane that the body 2004 of the compliant shield 2000 extends such that the shielding interconnects 1926 do not touch a PCB that the connector is mounted to. In some embodiments, the gap g may be on the order of, for example, 0.2 mil.

In this embodiment, however, the shielding interconnects 1926 do not extend beyond a mounting face of the connector. Rather, they are exposed in recesses in the connector, such as might be formed between IMLA assemblies when the core member does not extend as far towards the mounting face as the IMLA assemblies attached to that core member.

Figure 19B:
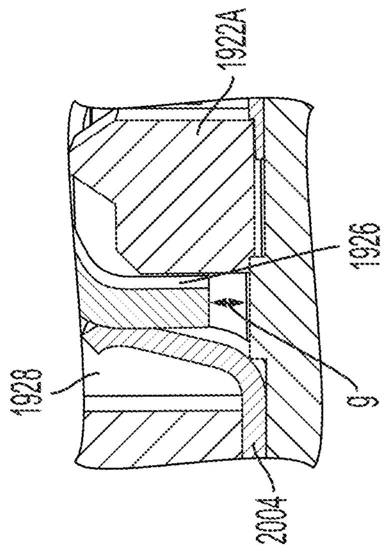
FIG. 19B is an enlarged end view of the region marked "W" in FIG. 19A, according to some embodiments.
Figure 19A:
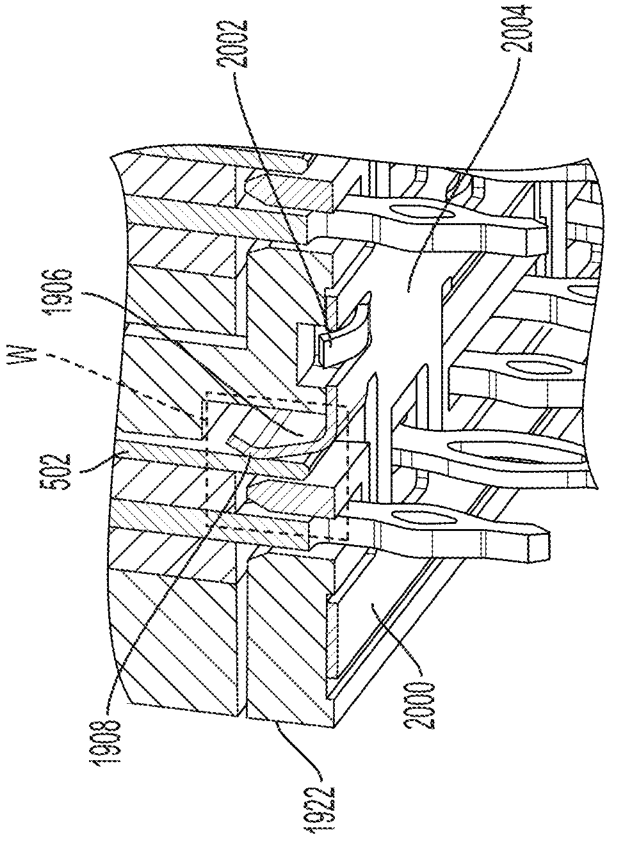
FIG. 19A is a perspective view of a portion of a mounting interface of a connector with the compliant shield of FIG. 18, according to some embodiments.

FIG. 19B is an enlarged view of a region marked "W" in FIG. 19A, containing such a recess 1928, according to some embodiments. A portion of the recess is filled by a projection 1922A from organizer 1922. A portion of the compliant shield also extends into recess 1928 where it can make contact with shielding interconnect 1926. In this example, that portion is contact member 1906, which is formed from a tab cut from the same sheet of metal as the compliant shield and can operate as a beam that generates force against shielding interconnect 1926 so as to make a reliable connection. A contact member 1906 may be included in a compliant shield, such as 1900 or 2000.

In the illustrated example, the compliant shield 2000 is attached to board-facing face of an insulative organizer 1922. The compliant shield 2000, as does compliant shield 1900, has first openings 1902 configured for signal contact tails to pass therethrough, and second openings 1904 for ground contact tails to pass therethrough. A first opening 1902 has a contact member 1906 extending from a side of the first opening 1902 and substantially perpendicular to a body of the compliant shield 1900. Insulative organizer 1922 has similar openings such that the tails may pass through both the compliant shield 1900 and organizer 1922 for attachment to a printed circuit board.

The contact member 1906 is configured to make contact with shielding interconnects 1926 along a line 1908. This line contact configuration reduces contact resistance from a point contact configuration.

Compliant shield 1900 or 2000 may couple the IMLA shields 502 to grounded structures on the PCB to which the connector is mounted by pressing against those ground structures. Such a connection may be formed, for example, with compliant shield 1900. Alternatively or additionally, a connection to ground may be made by compliant beams or other contact structure. FIG. 19A illustrates an embodiment in which a compliant shield 2000 includes compliant beams 2002.

Figure 20B:
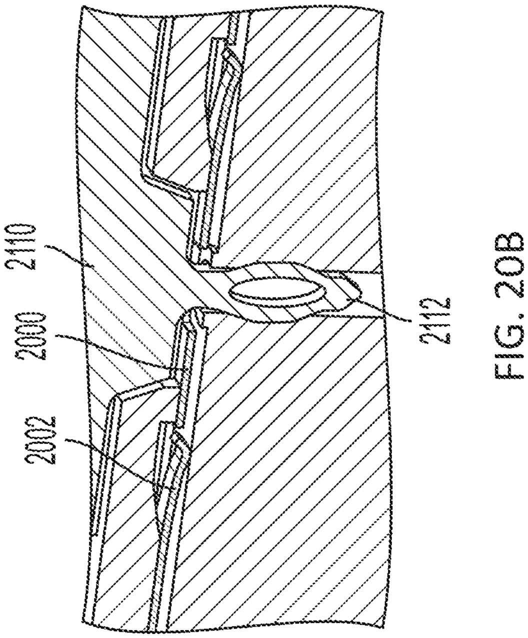
FIG. 20B is a cross-sectional view of a portion of the compliant shield of FIG. 20A along line L-L, when the compliant shield is between a connector and a printed circuit board, according to some embodiments.
Figure 20A:
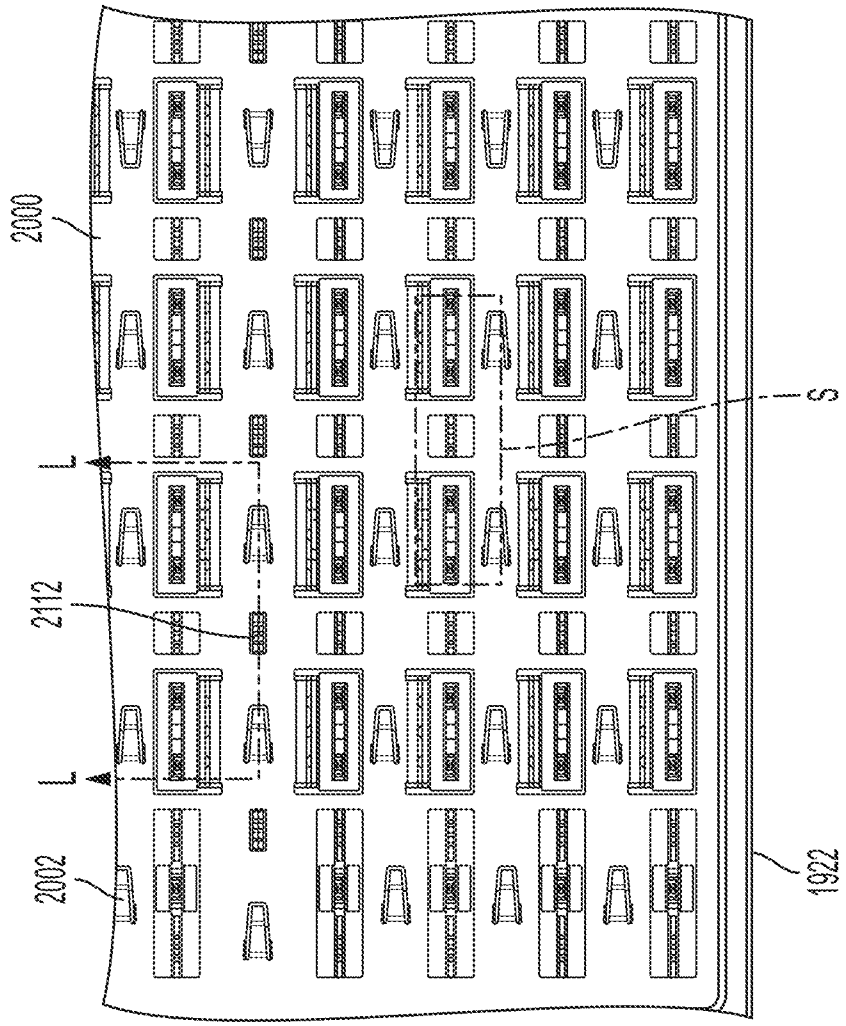
FIG. 20A is a plan view of a compliant shield with compliant beams, according to some embodiments.

FIG. 20A is a planar view of the board-facing surface of compliant shield 2000 with compliant beams 2002, according to some embodiments. FIG. 20B depicts a cross-sectional view along line L-L in FIG. 20A, according to some embodiments. Line L-L passes through a contact tail 2112, which may extend from a conductive structure 2110 within a connector. Conductive structure 2110 may be a planar shield that is part of a dual IMLA assembly, between dual IMLA assemblies or that is otherwise incorporated into the connector. In the example of FIG. 20A, there is a column of contact tails 2112 for four columns of contact tails extending from IMLA assemblies. Conductive structure 2110 may be connected to ground. Accordingly, as illustrated in FIG. 20B, conductive structure 2110 need not be isolated from shield 2000 and may make contact to it.

Figure 21B:
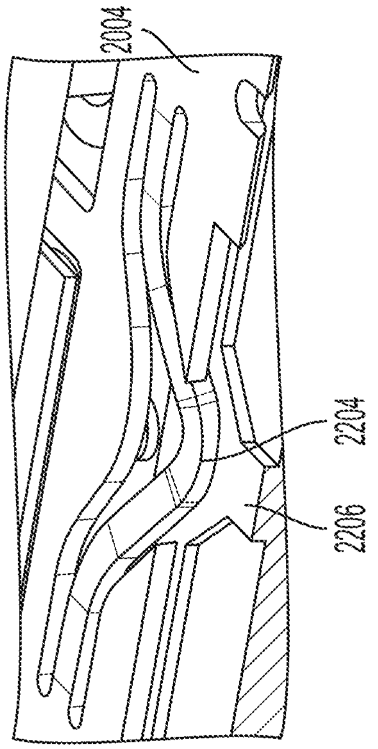
FIG. 21B is an enlarged view of the region marked "V" in FIG. 21A, according to some embodiments.
Figure 21A:
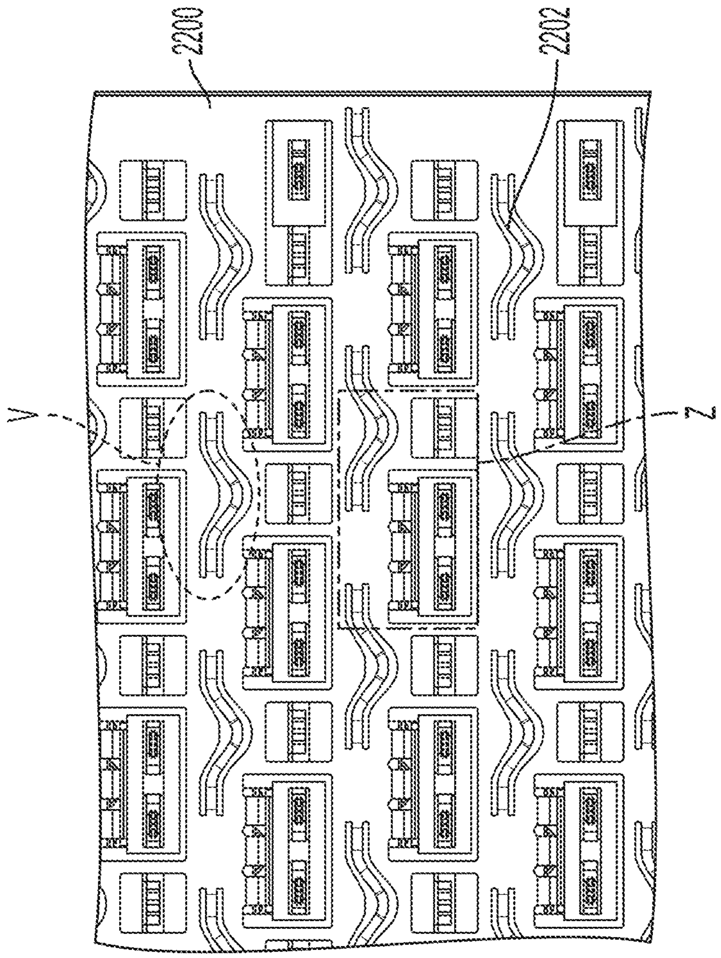
FIG. 21A is a plan view of an alternative embodiment of a compliant shield with an alternative compliant beam design, according to some embodiments.

FIG. 21A illustrates an alternative embodiment of a compliant shield, which may be used in an organizer assembly as described above. FIG. 21A is a planar view of a board facing surface of the compliant shield 2200. Compliant shield 2200, as with compliant shields 1900 and 2000, has openings through which contact tails from the IMLA assemblies pass and contact members 1906 that may make contact with shielding interconnects 1926.

As with compliant shield 2000, compliant shield 2200 may include a mechanism to make electrical connections to a ground structure on a surface of a printed circuit board to which a connector, containing compliant shield 2200, is mounted. In this example, that mechanism is compliant beams 2202. Compliant means 2202 are torsional beams.

FIG. 21B depicts an enlarged view of the region marked "V" in FIG. 21A, according to some embodiments. The compliant beams 2202 may have a chevron shape with a tip 2204 configured to make contact with a PCB. The tips 2204 of the compliant beams 2202 may be bent out of the body of the compliant shield and generate a counter force when pressed back towards the body of the compliant shield. In this way, contact force may be generated to make contact with the surface ground contact pad 2206 on the PCB. Compared with a compliant beam 2002 contacting a PCB at a point or along a line as illustrated in FIGS. 20A and 20B, the tips 2204 of the compliant beams 2202 may have a surface contacting the pad 2205 as illustrated in FIG. 21B, which reduces contact resistance and allows the compliant beams 2202 to be made with narrower width and thus reduces the spacing between columns of contact tails of the connector.

Compliance of a shield at the mounting interface enables the compliant shield to make connections between the shields internal to a connector and grounds on a surface of a printed circuit board despite variations in position of the connector with respect to a surface of a printed circuit board in a finished assembly. In some embodiments, such as those described in connection with compliant shields 2000 and 2100, compliance is a result of compressible beams on the shield. In some embodiments, compliance of a compliant shield may result from displacement of the material forming the compliant shield. The material forming the compliant shield may be, for example, rubber, which when pressed in a direction normal to the mounting surface of a PCB, may reduce in height perpendicular to the PCB but may expand laterally, parallel to the mounting surface of the PCB, such that the volume of the material remains constant. Alternatively or additionally, the change in height in one dimension may result from a decrease in volume of the compliant shield, such as when the compliant shield is made from an open-cell foam material from which air is expelled from the cells when a force is applied to the material. The cells of the foam may collapse such that the thickness of the foam may be reduced to the size of the gap between the mounting ends of the ground shields and the mounting surface of the PCB when the connector is pressed onto the PCB.

In some embodiments, a compliant shield may be configured to fill the gap with a force between 0.5 $gf/mm^2$ and 15 $gf/mm^2$, such as 10 $gf/mm^2$, 5 $gf/mm^2$, or 1.4 $gf/mm^2$. A compliant shield made of an open-cell foam may require a relatively low application force to compress the shield to the size of the gap. Further, as the open-cell foam does not expand laterally, the risk of the open-cell foam inadvertently contacting adjacent signal tails and shorting them to ground is low.

A suitable compliant shield may have a volume resistivity between 0.001 and 0.020 Ohm-cm. Such a material may have a hardness on the Shore A scale in the range of 35 to 90. Such a material may be a conductive elastomer, such as a silicone elastomer filled with conductive particles such as particles of silver, gold, copper, nickel, aluminum, nickel coated graphite, or combinations or alloys thereof. Alternatively or additionally, such a material may be a conductive open-cell foam, such as a Polyethylene foam plated with copper and nickel. Non-conductive fillers, such as glass fibers, may also be present.

Alternatively or additionally, the compliant shield may be partially conductive or exhibit resistive loss such that it would be considered a lossy material as described herein. Such a result may be achieved by filling all or portions of an elastomer, an open-cell foam, or other binder with different types or lesser amounts of conductive particles so as to provide a volume resistivity associated with the materials described herein as "lossy." In some embodiments a compliant shield may be die cut from a sheet of conductive or "lossy" compliant material having a suitable thickness, electrical, and other mechanical properties. In some embodiments, the compliant shield may have an adhesive backing such that it may stick to the plastic organizer and/or the mounting face of the connector. In some implementations, a compliant shield may be cast in a mold so as to have a desired pattern of openings to allow contact tails of the connector to pass therethrough. Alternatively or additionally, a sheet of compliant material may be cut, such as in a die, to provide a desired shape.

Figure 22:
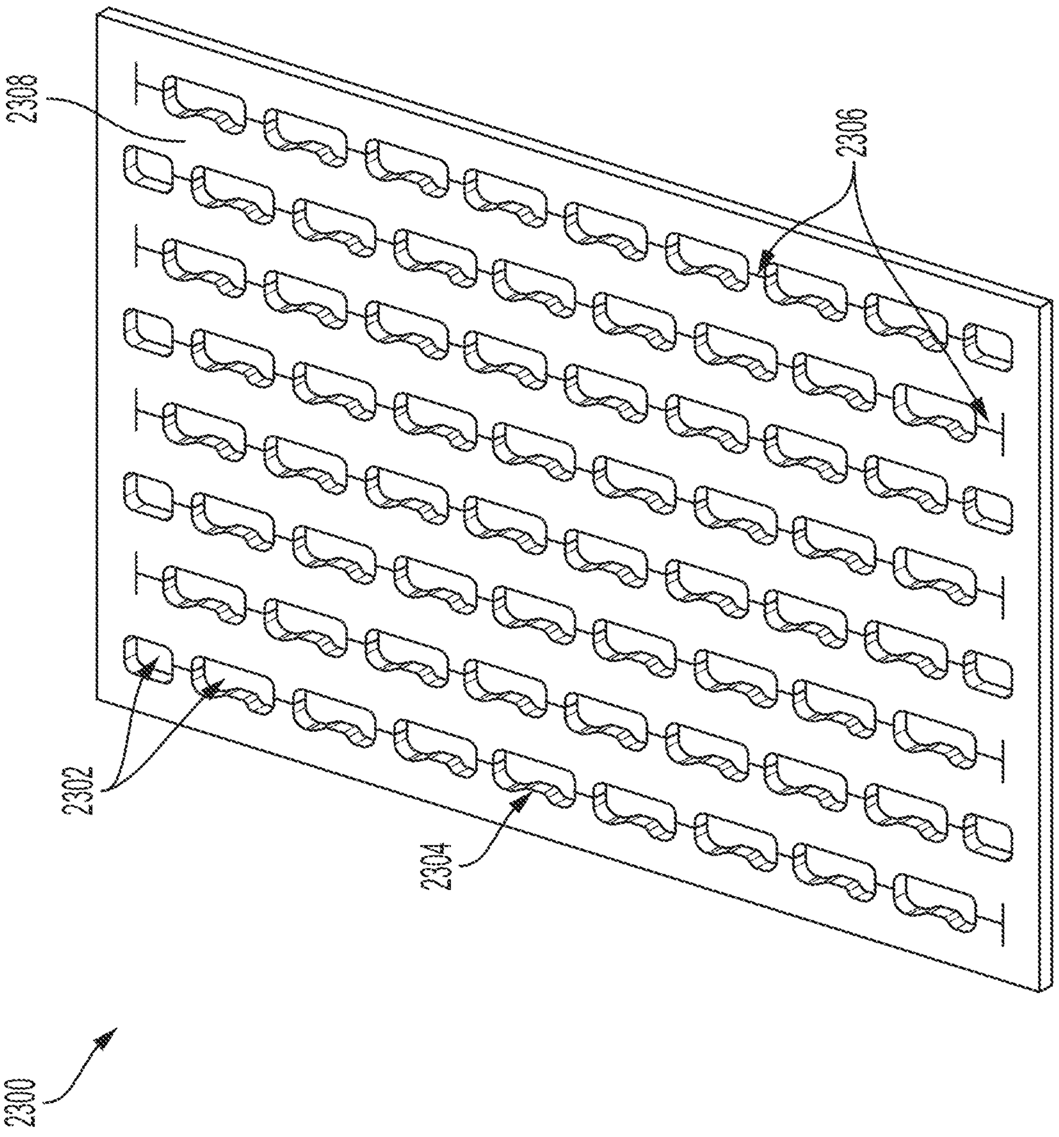
FIG. 22 is a perspective view of an alternative compliant shield, according to some embodiments.

FIG. 22 depicts a perspective view of an alternative compliant shield 2300 of the organizer assembly, according to some embodiments. Compliant shield 2300, for example, may be adhered to a plastic organizer with openings that enable contact tails to pass therethrough. Openings in compliant shield 2300 may align with some or all of the openings in the organizer for contact tails to pass therethrough. For example, openings 2302 may align with openings in the organizer through which tails of signal conductive elements pass. Conversely, where the compliant shield is to connect to structures of the connector, compliant shield 2300 may be shaped to make contact with those structures. Extensions 2304, extending towards such structures, may make connections. Slits 2306 may also be cut in compliant shield 2300 such that sides of the slit will press against a structure inserted through the slit.

Figure 23B:
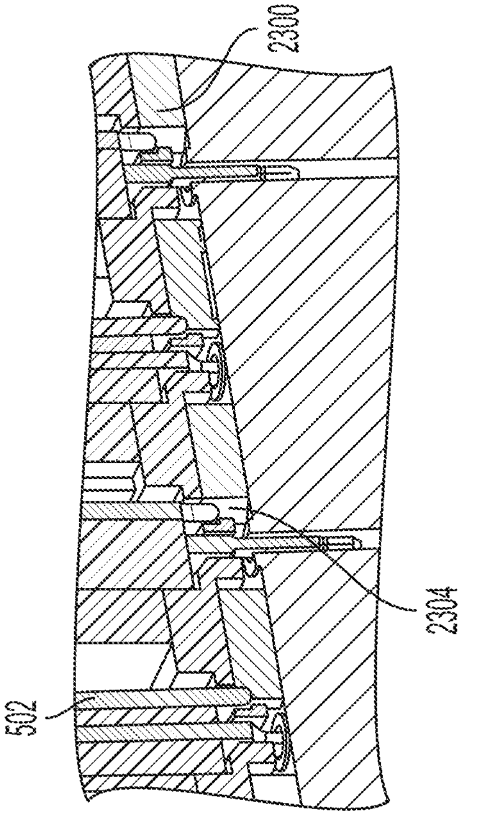
FIG. 23B is a cross-sectional view along line I-I in FIG. 23A, according to some embodiments.
Figure 23A:
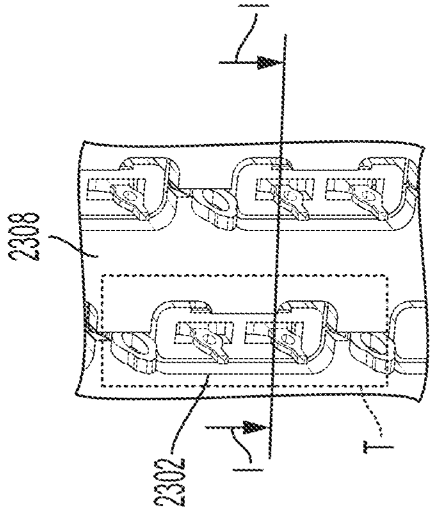
FIG. 23A is a perspective view of a mounting interface with the compliant shield of FIG. 22 and an insulative organizer, according to some embodiments.

FIG. 23A depicts an alternative perspective view of a portion of the mounting interface of a connector with compliant shield 2300 attached to an organizer, according to some embodiments.

FIG. 23B is a cross-sectional view of a portion of the mounting interface along line I-I in FIG. 23A, according to some embodiments. It should be appreciated that although FIG. 23A illustrates a portion of the mounting interface with two columns of contact tails, FIG. 23B shows a portion of four columns of contact tails by, for example, showing additional two columns adjacent to the two columns illustrated in FIG. 23A.

The compliant shield 2300 may include a conductive body 2308 and openings 2302 in the body 2308 configured for contact tails of signal conductive elements of leadframe assemblies to pass therethrough. The openings 2302 may be shaped to include projections 2304 extending into the openings 2302 from sides of the openings. The projections 2304 may be configured to make a connection with internal shields of the connector, such as by contacting IMLA shields 502 directly or contacting shielding interconnects 1752. The projections 2304 may be compressed when the compliant shield is attached to the mounting interface of the connector such that the projections 2304 press against those structures of the connector.

The openings 2302 may be disposed in columns, each configured to adapt to receive contact tails of a leadframe assembly. The compliant shield 2300 may include slits 2306 configured to receive ground contact tails and make contact with the ground contact tails passing through. The ground contact tails may be from individual ground conductive elements and/or contact tails extending from the internal shields of a connector. In some embodiments, at least a portion of the plurality of slits of the compliant shield extend in a direction that the columns extend.

In some embodiments, the compliant shield 2300 may be made from a sheet of an open-cell foam material by selectively cutting the sheet or otherwise removing material from the sheet to form openings 2302 and slits 2306.

It should be appreciated that although embodiments of compliant shields are illustrated at the mounting interface of a connector such as connector 200 assembled with IMLA assemblies with one or more IMLAs attached to a core member, the compliant shields may be used on other connectors, including for example, connectors without core members.

The inventors have recognized and appreciated that an internal shield of a connector may jog from a plane that a body of the internal shield extends when exiting the connector, for example, at the mounting interface. In some embodiments, an internal shield may jog away from columns of signal conductors and in a direction perpendicular to the column direction, which may be referred to as "first jogging," such that there are enough spacing to prevent inadvertent shorting between signal vias on a PCB configured to receive signal contact tails and ground vias on the PCB configured to receive ground contact tails extending from the internal shield (e.g., contact tails extending from projections 1016 in FIG. 10B, which are not shown in FIG. 10B but described as an alternative embodiment). In some embodiments, an internal shield may jog towards columns of signal conductors, which may be referred to as "second jogging," such that ground contact tails extending from the internal shield (e.g., ground mounting tails 1012 in FIG. 10B) are in line with the signal contact tails. The ground contact tails of the second jogging may be disposed between adjacent differential pairs of signal contact tails to reduce crosstalk.

The inventors have recognized and appreciated that the jogging lengthens a ground return path between internal shields of the connector and ground structures in the PCB, hence increasing an inductance associated with the ground return path. The higher inductance in the ground return path can cause or exacerbate ground-mode resonance.

The inventors have recognized and appreciated connectors designs that remove the first jogging of internal shields of connectors by, for example, removing ground contact tails that require the first jogging and electrically connecting the internal shields of the connectors to ground planes of a PCB through mounting interface structures (e.g., the organizer 210, compliant shields 1806, 1900, 2300).

The inventors have recognized and appreciated connectors designs that remove or reduce the second jogging of internal shields of connectors by, for example, having ground contact tails extending from the internal shields out of line with the signal contact tails. The inventors have also recognized and appreciated that crosstalk between adjacent in-column differential pairs of signal conductive elements may increase at the mounting interface for connectors without the second jogging. To reduce the crosstalk, in some embodiments, ground vias, which are not configured to receive the ground contact tails of the internal shields of the connectors, may be included in between the in-column differential pairs.

In some embodiments, an electrical connector includes a plurality of leadframe assemblies, each leadframe assembly comprising a leadframe housing, a plurality of signal conductive elements held by the leadframe housing and disposed in a column, each conductive element comprising a mating contact portion, a contact tail, and an intermediate portion extending between the mating contact portion and the contact tail, and a ground shield held by the leadframe housing and separate from the plurality of signal conductive elements by the leadframe housing; and a compliant shield comprising a plurality of openings configured for contact tails of the plurality of signal conductive elements to pass therethrough, a first plurality of contact beams curving toward respective ground shields of the plurality of leadframe assemblies and contacting the respective ground shields of the plurality of leadframe assemblies, and a second plurality of contact beams curving away from the respective ground shields of the plurality of leadframe assemblies and configured to contact a printed circuit board.

In some embodiments, contact beams of the first plurality extend in parallel to the columns of the plurality of signal conductive elements of the plurality of leadframe assemblies.

In some embodiments, the plurality of signal conductive elements comprises a plurality of signal differential pairs, the contact tails of each signal differential pair are edge-coupled along a respective column, and the contact tails of each signal differential pair have a contact beam of the first plurality on one side of the respective column and a contact beam of the second plurality on an opposite side of the respective column.

In some embodiments, the electrical connector includes an organizer comprising a plurality of openings configured for contact tails of the plurality of signal conductive elements of the plurality of leadframe assemblies to pass therethrough and a plurality of slots configured for projections of the ground shields of the plurality of leadframe assemblies to be inserted into, wherein the compliant shield is attached to the organizer, and the contact beams of the first plurality of the compliant shield contact respective projections of the ground shields of the plurality of leadframe assemblies in respective slots of the organizer.

In some embodiments, the contact beams of the second plurality of the compliant shield curve away from respective slots of the organizer.

In some embodiments, an electrical connector includes a plurality of leadframe assemblies, each leadframe assembly comprising a leadframe housing, a plurality of signal conductive elements held by the leadframe housing and disposed in a column, each conductive element comprising a mating contact portion, a contact tail, and an intermediate portion extending between the mating contact portion and the contact tail, and a ground shield held by the leadframe housing and separate from the plurality of signal conductive elements by the leadframe housing; and a compliant shield comprising a plurality of openings configured for contact tails of the plurality of signal conductive elements to pass therethrough, and a plurality of contact members each extending from a side of a respective opening and substantially perpendicular to a body of the compliant shield, the plurality of contact members contacting the ground shields of the plurality of leadframe assemblies.

In some embodiments, the contact members of the compliant shield contact the ground shields along lines.

In some embodiments, the compliant shield comprises a plurality of compliant beams disposed in columns between contact tails of the plurality of leadframes.

In some embodiments, the plurality of compliant beams are aligned with the plurality of openings configured for contact tails of the plurality of signal conductive elements to pass therethrough.

In some embodiments, the plurality of compliant beams have a chevron shape with a tip being bent out of a body of the compliant shield such that the compliant beams generate a counter force when pressed back towards the body of the compliant shield.

In some embodiments, an electrical connector includes a plurality of leadframe assemblies, each leadframe assembly comprising a leadframe housing, a plurality of signal conductive elements held by the leadframe housing and disposed in a column, each conductive element comprising a mating contact portion, a contact tail, and an intermediate portion extending between the mating contact portion and the contact tail, and a ground shield held by the leadframe housing and separate from the plurality of signal conductive elements by the leadframe housing; and a compliant shield comprising a conductive body made from a foam material, the compliant shield comprising a plurality of openings configured for contact tails of the plurality of signal conductive elements to pass therethrough, and a plurality of projections extending into respective openings and configured to contact respective ground shields of respective leadframe assemblies.

In some embodiments, the foam material is configured such that air is expelled from the foam material when a force is applied to the compliant shield.

In some embodiments, the plurality of projections of the compliant shield are compressed by respective ground shields of respective leadframe assemblies.

In some embodiments, a plurality of slits configured for ground contact tails to pass therethrough and make contact with the conductive body of the compliant shield.

In some embodiments, the plurality of openings of the compliant shield are disposed in a plurality of columns, and at least a portion of the plurality of slits of the compliant shield extend in a direction that the columns extend, and connect openings in a column of the plurality of columns.

In some embodiments, an electronic device includes a printed circuit board comprising a surface, a ground plane at an inner layer of the printed circuit board, and a plurality of shadow vias connecting to the ground plane; and an electrical connector mounted to the printed circuit, the connector comprising a face parallel with the surface, a plurality of columns of conductive elements extending through the face, and a plurality of internal shields extending parallel with the columns of conductive elements, the plurality of internal shields comprising portions exiting the connector straightly, the portions of the plurality of internal shields disposed above respective shadow vias and aligned to the respective shadow vias in a direction substantially perpendicular to the surface of the printed circuit board, wherein the portions of the internal shields of the connector are electrically connected to the ground plane of the printed circuit board through the respective shadow vias.

In some embodiments, the electrical connector comprises a compliant shield providing current flow paths between the portions of the internal shields of the connector and the respective shadow vias of the printed circuit board.

In some embodiments, the compliant shield presses against a first plurality of the portions of the internal shields of the connector in a repeating pattern of first locations.

In some embodiments, the shadow vias are located in a repeating pattern of second locations, with each of the second locations having the same positions relative to a respective first location.

In some embodiments, a printed circuit board includes a surface; a plurality of differential pairs of signal vias disposed in first columns; a ground plane at an inner layer of the printed circuit board; a first plurality of ground vias connecting to the ground plane, the first plurality of ground vias configured to receive ground contact tails of a mounting printed circuit board, the first plurality of ground vias disposed in second columns offset from the first columns; and a second plurality of ground vias connecting to the ground plane, the second plurality of ground vias disposed in third columns offset from the first columns, the third columns being offset from the second columns, the second plurality of ground vias disposed between adjacent differential pairs of signal vias in a same first column such that crosstalk between the adjacent differential pairs of signal vias in the same first column is reduced.

In some embodiments, the first plurality of ground vias have first diameters, the second plurality of ground vias have second diameters, and the second diameters are smaller than the first diameters.

In some embodiments, the second columns are offset from the first columns in a first direction, and the third columns are offset from the first columns in a second direction opposite the first direction.

In some embodiments, the second columns are offset from the first columns by a first distance, and the third columns are offset from the first columns by the first distance.

In some embodiments, the second columns are offset from the first columns by a first distance, the third columns are offset from the first columns by a second distance, and the second distance is smaller than the first distance.

Although details of specific configurations of conductive elements, housings, and shield members are described above, it should be appreciated that such details are provided solely for purposes of illustration, as the concepts disclosed herein are capable of other manners of implementation. In that respect, various connector designs described herein may be used in any suitable combination, as aspects of the present disclosure are not limited to the particular combinations shown in the drawings.

Having thus described several embodiments, it is to be appreciated various alterations, modifications, and improvements may readily occur to those skilled in the art. Such alterations, modifications, and improvements are intended to be within the spirit and scope of the invention. Accordingly, the foregoing description and drawings are by way of example only.

Various changes may be made to the illustrative structures shown and described herein. As a specific example of a possible variation, the connector may be configured for a frequency range of interest, which may depend on the operating parameters of the system in which such a connector is used, but may generally have an upper limit between about 15 GHz and 224 GHz, such as 25 GHz, 30 GHz, 40 GHz, 56 GHz, 112 GHz, or 224 GHz, although higher frequencies or lower frequencies may be of interest in some applications. Some connector designs may have frequency ranges of interest that span only a portion of this range, such as 1 to 10 GHz or 5 to 35 GHz or 56 to 112 GHz.

The operating frequency range for an interconnection system may be determined based on the range of frequencies that can pass through the interconnection with acceptable signal integrity. Signal integrity may be measured in terms of a number of criteria that depend on the application for which an interconnection system is designed. Some of these criteria may relate to the propagation of the signal along a single-ended signal path, a differential signal path, a hollow waveguide, or any other type of signal path. Two examples of such criteria are the attenuation of a signal along a signal path or the reflection of a signal from a signal path.

Other criteria may relate to interaction of multiple distinct signal paths. Such criteria may include, for example, near end cross talk, defined as the portion of a signal injected on one signal path at one end of the interconnection system that is measurable at any other signal path on the same end of the interconnection system. Another such criterion may be far end cross talk, defined as the portion of a signal injected on one signal path at one end of the interconnection system that is measurable at any other signal path on the other end of the interconnection system.

As specific examples, it could be required that signal path attenuation be no more than 3 dB power loss, reflected power ratio be no greater than −20 dB, and individual signal path to signal path crosstalk contributions be no greater than −50 dB. Because these characteristics are frequency dependent, the operating range of an interconnection system is defined as the range of frequencies over which the specified criteria are met.

Designs of an electrical connector are described herein that improve signal integrity for high frequency signals, such as at frequencies in the GHz range, including up to about 25 GHz or up to about 40 GHz, up to about 56 GHz or up to about 60 GHz or up to about 75 GHz or up to about 112 GHz or higher, while maintaining high density, such as with a spacing between adjacent mating contacts on the order of 3 mm or less, including center-to-center spacing between adjacent contacts in a column of between 1 mm and 2.5 mm or between 2 mm and 2.5 mm, for example. Spacing between columns of mating contact portions may be similar, although there is no requirement that the spacing between all mating contacts in a connector be the same.

Manufacturing techniques may also be varied. For example, embodiments are described in which the daughtercard connector 200 is formed by organizing a plurality of wafers onto a stiffener. It may be possible that an equivalent structure may be formed by inserting a plurality of shield pieces and signal receptacles into a molded housing.

Connector manufacturing techniques were described using specific connector configurations as examples. A header connector, suitable for mounting on a backplane, and a right angle connector, suitable for mounting on a daughter card to plug into the backplane at a right angle, was illustrated for example. The techniques described herein for forming mating and mounting interfaces of connectors are applicable to connectors in other configurations, such as backplane connectors, cable connectors, stacking connectors, mezzanine connectors, I/O connectors, chip sockets, etc.

In some embodiments, contact tails were illustrated as press fit "eye of the needle" compliant sections that are designed to fit within vias of printed circuit boards. However, other configurations may also be used, such as surface mount elements, solderable pins, etc., as aspects of the present disclosure are not limited to the use of any particular mechanism for attaching connectors to printed circuit boards.

The present disclosure is not limited to the details of construction or the arrangements of components set forth in the foregoing description and/or the drawings. Various embodiments are provided solely for purposes of illustration, and the concepts described herein are capable of being practiced or carried out in other ways. Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

What is claimed is:

1. A cable assembly for a cable connector, the assembly comprising:

a subassembly comprising a subassembly housing, and a plurality of conductive elements held by the subassembly housing and disposed in a column, each conductive element comprising a mating end, a mounting end opposite the mating end, and an intermediate portion extending between the mating end and the mounting end, the mounting ends of the plurality of conductive elements comprising signal cable ends and ground ends;

a plurality of cables, each cable comprising a pair of wires and a cable shield disposed around the pair of wires, the pair of wires being attached to respective signal cable ends of the plurality of conductive elements; and a conductive hood comprising a first hood portion and a second hood portion, wherein:

the first hood portion is attached to the second hood portion with ground ends of the plurality of conductive elements electrically and mechanically connected therebetween; and the plurality of cables pass through openings in the conductive hood with the conductive hood making an electrical connection with the cable shields of the plurality of cables.

2. The cable assembly of claim 1, further comprising:

a subassembly shield attached to the subassembly housing, wherein the subassembly shield is electrically connected to the ground ends of the plurality of conductive elements and/or the conductive hood.

3. The cable assembly of claim 2, wherein the subassembly shield comprises:

a body extending parallel to the column of conductive elements; and one or more tabs extending from the body and bent towards the column of conductive elements and being configured to make electrical connection with the conductive hood.

4. The cable assembly of claim 3, wherein the one or more tabs each comprises a contact portion configured to make contact with the conductive hood.

5. The cable assembly of claim 2, further comprising lossy material holding the subassembly shield to the subassembly housing.

6. The cable assembly of claim 1, wherein:

for each of the plurality of cables:

the pair of wires extend beyond the cable shield towards an end of the cable;

the cable further comprises a jacket disposed around the cable shield; and the cable shield extends beyond the jacket towards the respective mounting ends.

7. The cable assembly of claim 1, wherein the first and second portions of the conductive hood comprise posts passing through openings in the ground ends from opposite directions.

8. The cable assembly of claim 1, wherein the openings of the conductive hood are shaped and positioned to compress the cables passing through the openings.

9. The cable assembly of claim 8, further comprising an insulative overmold over at least portions of the conductive hood and the plurality of cables passing through the openings in the conductive hood.

10. The cable assembly of claim 1, wherein the cable shields of the plurality of cables are electrically coupled to each other through the conductive hood.

11. A subassembly for a cable connector, the subassembly comprising:

a core member comprising a body and a mating portion extending from the body, the body and mating portion comprising insulative material, the mating portion further comprising lossy material;

a first subassembly comprising a first subassembly housing, and a first plurality of conductive elements held by the first subassembly housing and disposed in a first column, each conductive element comprising a mating end, a mounting end opposite the mating end, and an intermediate portion extending between the mating end and the mounting end, wherein the first plurality of conductive elements comprise ground conductors and signal conductors; and a first plurality of cables comprising wires terminated to the mounting ends of the signal conductors of the first plurality of conductive elements;

a first overmold covering a portion of the first plurality of cables and a portion of the first subassembly;

a second subassembly comprising a second subassembly housing, and a second plurality of conductive elements held by the second subassembly housing and disposed in a second column, each conductive element comprising a mating end, a mounting end opposite the mating end, and an intermediate portion extending between the mating end and the mounting end, wherein the second plurality of conductive elements comprise ground conductors and signal conductors;

a second plurality of cables comprising wires terminated to the mounting ends of the signal conductors of the second plurality of conductive elements; and a second overmold covering a portion of the second plurality of cables and a portion of the second subassembly, wherein:

the first subassembly is attached to a first side of the core member with the mating ends of the first plurality of conductive elements adjacent the mating portion of the core member;

the second subassembly is attached to a second side of the core member with the mating ends of the second plurality of conductive elements adjacent the mating portion of the core member; and the first overmold and the second overmold comprise complimentary, interlocking features.

12. The subassembly of claim 11, wherein:

the first subassembly further comprises a first subassembly shield on a first side of the first subassembly housing and a second subassembly shield on a second side of the first subassembly housing;

the second subassembly further comprises a third subassembly shield on a first side of the first subassembly housing and a fourth subassembly shield on a second side of the second subassembly housing.

13. A cable connector comprising:

a housing comprising a cavity and a plurality of walls surrounding the cavity; and a plurality of cable assemblies held in the cavity of the housing, each cable assembly comprising:

a subassembly comprising a subassembly housing, and a plurality of conductive elements held by the subassembly housing and disposed in a column, each conductive element comprising a mating end, a mounting end opposite the mating end, and an intermediate portion extending between the mating end and the mounting end, the mounting ends of the plurality of conductive elements comprising signal cable ends and ground ends;

a plurality of cables, each cable comprising a pair of wires and a cable shield disposed around the pair of wires, the pair of wires being attached to respective signal cable ends of the plurality of conductive elements; and a conductive hood comprising a first hood portion and a second hood portion, wherein:

the ground ends of the plurality of conductive elements comprise holes;

the first hood portion and/or the second hood portion comprise posts;

the first hood portion is attached to the second hood portion with the posts extending through the holes; and the conductive hood comprises a cavity between the first hood portion and the second hood portion with attachments between the pairs of wires of the plurality of cables and the respective signal cable ends of the plurality of conductive elements disposed within the cavity.

14. The cable connector of claim 13, wherein the plurality of the walls of the housing comprise features retaining the plurality of cable assemblies.

15. The cable connector of claim 13, wherein:

the plurality of cable assemblies each further comprises a core member comprising a body and a mating portion extending from the body, the body and mating portion comprising insulative material, the mating portion further comprising lossy material; and the subassembly is attached to a first side of the core member such that the ground ends are coupled to each other through the lossy material.

16. The cable connector of claim 15, wherein:

the subassembly comprises lossy material; and a subassembly shield is retained to the subassembly by the lossy material.

17. The cable connector of claim 16, wherein:

the subassembly comprises a ground plate separate from the plurality of conductive elements by the subassembly housing, and the ground plate is retained to the subassembly housing by the lossy material.

18. The cable connector of claim 15, wherein:

the subassembly is a first subassembly;

each cable assembly comprises a second subassembly comprising a subassembly housing, and a plurality of conductive elements held by the subassembly housing and disposed in a column, each conductive element comprising a mating end, a mounting end opposite the mating end, and an intermediate portion extending between the mating end and the mounting end, the cable ends of the plurality of conductive elements comprising signal cable ends and ground ends; and the second subassembly is attached to a second side of the core member, the second side being opposite to the first side, such that the ground ends of the second subassembly are coupled to the ground ends of the first subassembly through the lossy material of the core member.

19. The cable connector of claim 18, wherein:

the first and second subassemblies each comprises a lossy material bar and a ground plate retained to respective subassembly housing by respective lossy material bar, and the ground plates of the first and second subassemblies are electrically coupled to each other through the lossy material bars of the first and second subassemblies.

20. The cable connector of claim 18, wherein:

the ground ends of the plurality of conductive elements of the first and second subassemblies are electrically coupled to each other through the lossy material of the core member.

* * * * *